United States Patent
Malone et al.

(10) Patent No.: US 12,155,315 B2
(45) Date of Patent: Nov. 26, 2024

(54) PROGRAMMABLE DC-DC DRIVER SYSTEM

(71) Applicant: ABL IP HOLDING LLC, Conyers, GA (US)

(72) Inventors: Gregory Malone, Sterling, VA (US); Sean P. White, Sterling, VA (US); Januk Aggarwal, Alexandria, VA (US); David P. Ramer, Reston, VA (US)

(73) Assignee: ABL IP HOLDING INC, Conyers, GA (US)

( * ) Notice: Subject to any disclaimer, the term of this patent is extended or adjusted under 35 U.S.C. 154(b) by 50 days.

(21) Appl. No.: 18/090,011

(22) Filed: Dec. 28, 2022

(65) Prior Publication Data

US 2023/0198418 A1 Jun. 22, 2023

Related U.S. Application Data

(63) Continuation of application No. 17/173,567, filed on Feb. 11, 2021, now Pat. No. 11,575,328.
(Continued)

(51) Int. Cl.
*H02M 3/335* (2006.01)
*H02J 7/00* (2006.01)
(Continued)

(52) U.S. Cl.
CPC ......... *H02M 3/33592* (2013.01); *H02J 7/007* (2013.01); *H02M 3/1584* (2013.01);
(Continued)

(58) Field of Classification Search
CPC ........... H02M 3/1584; H02M 3/33584; H02M 3/33592; H05B 45/3725; H05B 45/375;
(Continued)

(56) References Cited

U.S. PATENT DOCUMENTS 8,456,867 B1  6/2013 Karlsson et al.
8,587,956 B2  11/2013 Choutov et al.
(Continued)

FOREIGN PATENT DOCUMENTS

EP    3367552 A1    8/2018

OTHER PUBLICATIONS

Bandyopadhyay et al., "90.6% Efficient 11MHz 22W LED Driver Using GaN FETs and Burst-Mode Controller with 0.96 Power Factor," 2013 IEEE Intl. Solid-State Circuits Conference, Digest of Technical Papers (Feb. 2013), http://hdl.handle.net/1721.1/95919, 4 pages.
(Continued)

*Primary Examiner* — Hal Kaplan
(74) *Attorney, Agent, or Firm* — Buchanan Ingersoll & Rooney PC

(57) ABSTRACT

For a programmable direct current (DC)-DC converter application, a driver system includes a switched mode power circuit for providing a DC power signal to an electrical load and a control block. Control block includes interfaces coupled to receive at least one input signal from a low voltage region of the switched mode power circuit and to provide at least one control signal to the low voltage region. Control block configures the switched mode power circuit to provide the DC power signal having at least one power parameter within a tolerance of a power configuration setting value of the electrical load. Control block responds to the at least one input signal from the low voltage region to adjust operation of the low voltage region via the at least one control signal. Low voltage region can include a plurality of switched converter circuits.

20 Claims, 23 Drawing Sheets

Related U.S. Application Data

(60) Provisional application No. 62/978,964, filed on Feb. 20, 2020.

(51) Int. Cl.
  *H02M 3/158* (2006.01)
  *H05B 45/375* (2020.01)
  *H05B 45/382* (2020.01)
  *H05B 47/18* (2020.01)

(52) U.S. Cl.
  CPC ...... *H02M 3/33584* (2013.01); *H05B 45/375* (2020.01); *H05B 45/382* (2020.01); *H05B 47/18* (2020.01); *H02J 2207/20* (2020.01)

(58) Field of Classification Search
  CPC ....... H05B 45/382; H05B 47/18; H02J 7/007; H02J 2207/20
  USPC .......................................................... 307/24
  See application file for complete search history.

(56) References Cited

U.S. PATENT DOCUMENTS

| | | | |
|---|---|---|---|
| 9,887,616 B2* | 2/2018 | Bai | ........................ H02M 7/219 |
| 2011/0193491 A1 | 8/2011 | Choutov et al. | |
| 2017/0005565 A1 | 1/2017 | Bai et al. | |

OTHER PUBLICATIONS

Faraci et al., "High Efficiency and Power Density GaN-Based LED Driver," 2016 IEEE Applied Power Electronics Conference and Exposition (APEC), Long Beach, CA, 2016, pp. 838-842.

Infineon Product Brief, "GaN EiceDRIVER™ family, Single-channel isolated gale driver ICs for high voltage GaN switches," 2018 Infineon Technologies AG, 9500 Villach, Austria, www.infineon.com/gan-eicedriver, 2 pages.

Non Final Office Action for Application No. 17/150,175, mailed Apr. 28, 2022, 23 pages.

Notice of Allowance for U.S. Appl. No. 17/171,301, mailed Nov. 12, 2021, 12 pages.

Pervaiz et al., "GaN-Based High-Power-Density Electrolytic-Free Universal Input LED Driver," 2017 IEEE Energy Conversion Congress and Exposition (ECCE), Cincinnati, OH, 2017, pp. 3676-3683.

Wikipedia, "Switched-mode power supply," Wikipedia, The Free Encyclopedia, Oct. 31, 2021, Web: Nov. 3, 2021, 19 pages.

Wikipedia, "Wide-bandgap semiconductor," last edited on Dec. 22, 2020, https://en.wikipedia.org/wiki/Wide-bandgap_semiconductor, 7 pages.

Entire patent prosecution history of U.S. Appl. No. 17/173,567, filed Feb. 11, 2021, entitled, "Programmable DC-DC Driver System.".

* cited by examiner

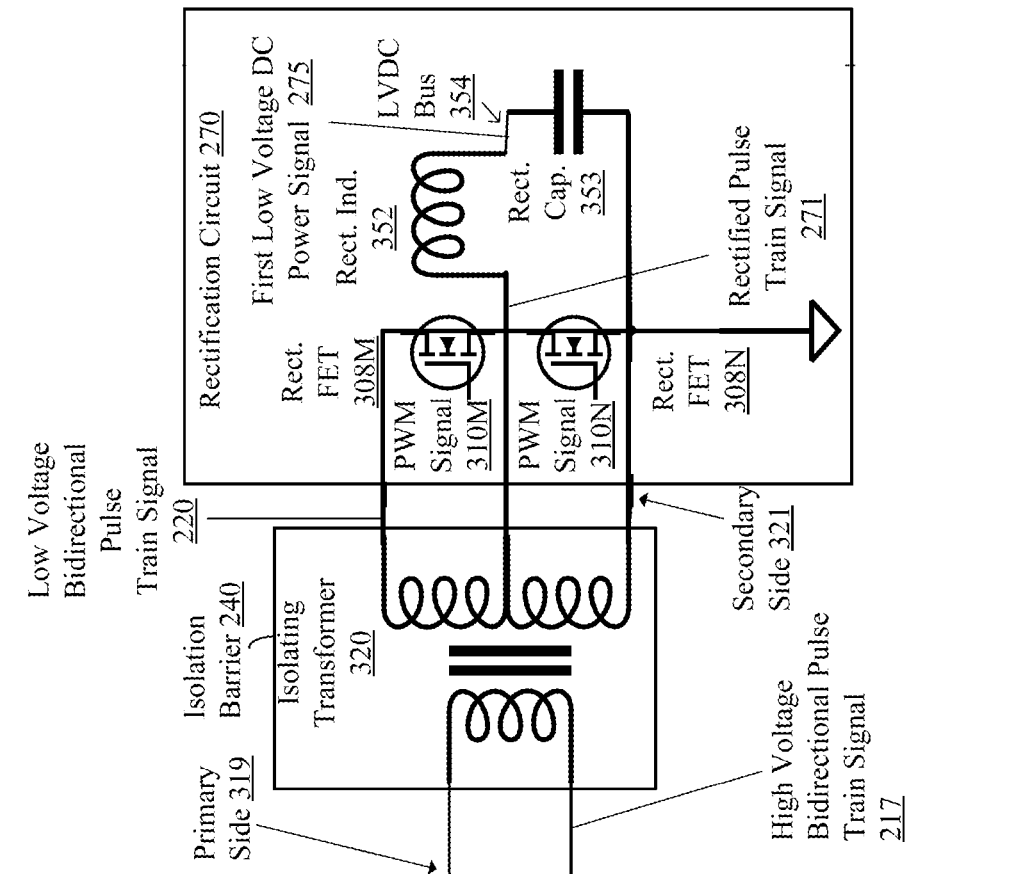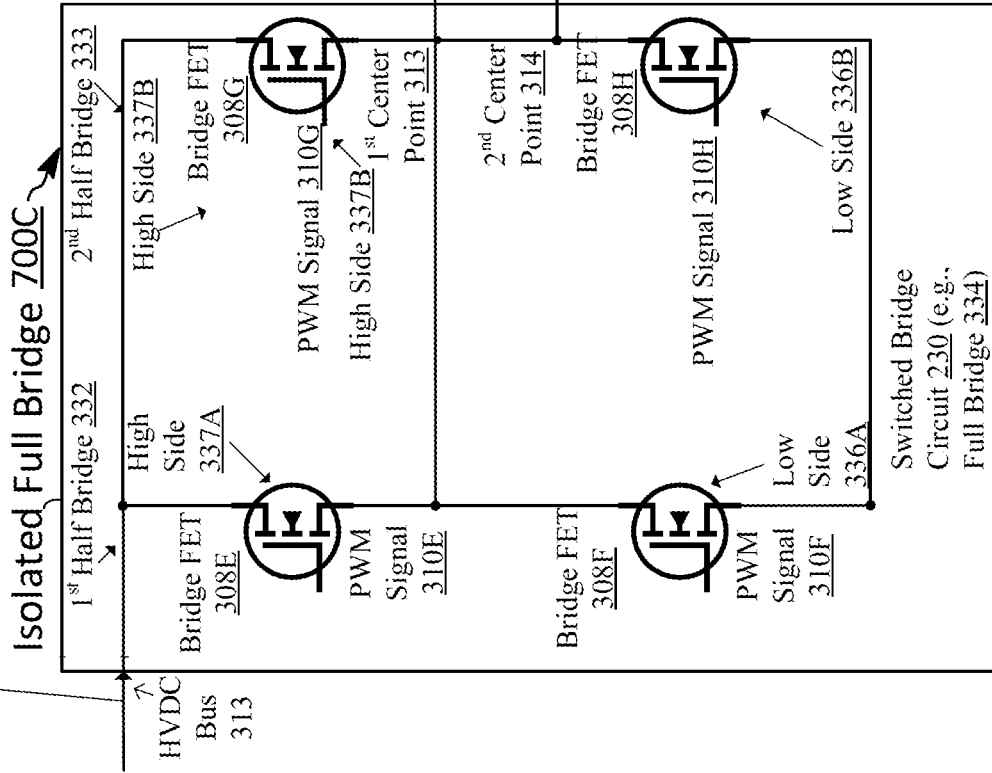
FIG. 7C

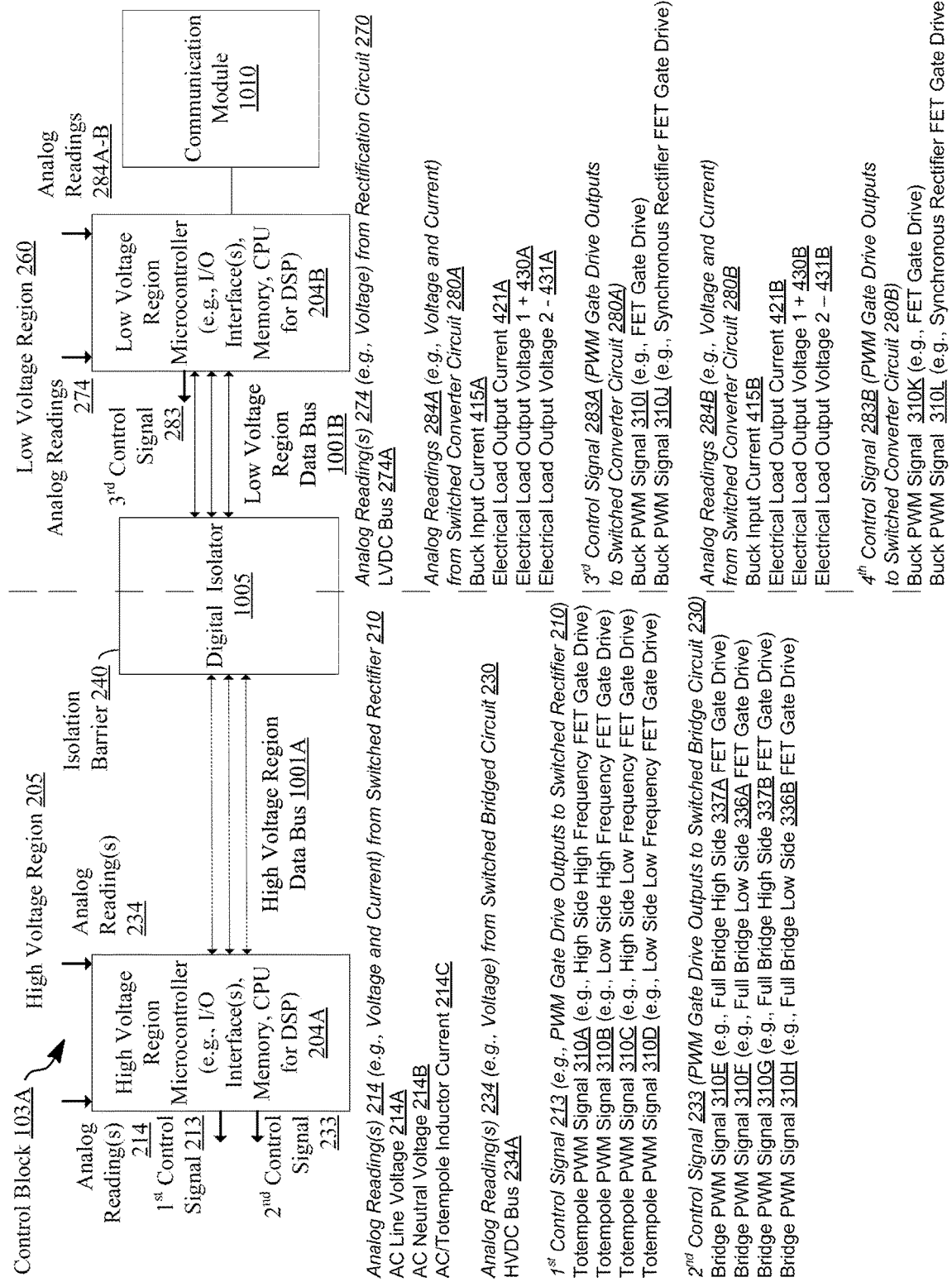

PROGRAMMABLE DC-DC DRIVER SYSTEM

CROSS REFERENCE TO RELATED APPLICATIONS

This application is a continuation of U.S. patent application Ser. No. 17/173,567, filed Feb. 11, 2021, the entire disclosure of which is incorporated herein by reference. U.S. patent application Ser. No. 17/173,567 claims priority to U.S. Provisional Application No. 62/978,964, filed Feb. 20, 2020, the entire disclosure of which is incorporated herein by reference.

TECHNICAL FIELD

The present subject matter relates to a programmable direct current to direct current (DC-DC) driver system with a flexible architecture that is compatible and optimizable for various types of electrical loads, e.g., a luminaire, a sensor device, a battery, an optical/electrical transducer, etc.

BACKGROUND

Electrically powered artificial lighting for general illumination has become ubiquitous in modern society. Electrical lighting equipment is commonly deployed, for example, in homes, buildings of commercial and other enterprise establishments, as well as in various outdoor settings.

Traditional luminaires can be turned ON and OFF, and in some cases may be dimmed, usually in response to user activation of a relatively simple input device, such as a light switch. Often, traditional luminaires are controlled individually or as relatively small groups at separate locations. Each of the light sources in a luminaires are driven ON and OFF or dimmed by a driver circuit, e.g., for a light emitting diode (LED) light source, or a ballast, e.g. for a fluorescent light source.

Unfortunately, the driver circuit is typically produced in different variants depending on the type of electrical load that is controlled. In the case of an LED light source, for example, the driver circuit typically only supports a single control protocol, such as a constant current configuration for the LED light source. Sensors, such as occupancy or daylight harvesting sensors, typically require an entirely different type of driver circuit that supports a constant voltage configuration. Emergency luminaires continuously emit emergency illumination lighting at an emergency illumination levels, for example at a minimum of 1.0 foot candles (fc) for a 90 minute period. Such emergency luminaires require yet another entirely different type of driver circuit.

Typically, a driver circuit will include a high voltage region and a low voltage region. The driver circuit is generally utilized to control another circuit or electrical load, such as the light source of the luminaire. The driver circuit regulates current flowing through the driver circuit to the electrical load, in this case the light source of the luminaire. The driver circuit is application specific—the high voltage region and the low voltage region of the driver circuit are typically controlled separately—making the driver circuit inherently inflexible by design.

Because the driver circuit is typically customized for one specific application (e.g., LED light source, sensor, emergency luminaire, etc.), the separation between the high voltage region and the low voltage region is not problematic. There are minimal optimization issues, such as efficiency losses, between the high voltage region and the low voltage region, because the driver circuit is custom built for the specific type of electrical load, such as a specific National Electric Code (NEC) class 2 output device. Thus, the driver circuit is typically incompatible with a different type of electrical load than it was designed for. Even if the driver circuit were somehow compatible with a different type of electrical load than it was designed for (and assuming there are no safety issues, e.g., Underwriter Laboratories (UL) requirements were met), there would still be lingering optimization issues.

A driver system is needed to overcome these and other limitations in the art.

SUMMARY

In an example programmable DC-DC converter application, a driver system includes a switched mode power circuit for providing a DC power signal to an electrical load. The switched mode power circuit includes a low voltage region. The driver system further includes a control block coupled to control operations of the switched mode power circuit. The control block includes at least one microcontroller having a processor, a memory, and interfaces coupled to the low voltage region. The interfaces are coupled to receive at least one real-time input signal from the low voltage region and to provide at least one control signal to the low voltage region.

The at least one microcontroller includes programming stored in the memory for execution by the processor. Execution of the programming by the processor configures the driver system to implement the following functions, including functions to control operation of the low voltage region. First, the driver system configures the switched mode power circuit to provide the DC power signal having at least one power parameter within a tolerance of a power configuration setting value of the electrical load. Second, the driver system responds to the at least one real-time input signal from the low voltage region to adjust operation of the low voltage region via the at least one control signal.

Additional objects, advantages and novel features of the examples will be set forth in part in the description, which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 7C depicts an isolated full-bridge like that of FIG. 7A, but also allows bidirectionality by replacing rectification diodes with rectification FETs.

FIG. 10 illustrates a first control block design of the multi-stage driver system.

DETAILED DESCRIPTION

Figure 1A:
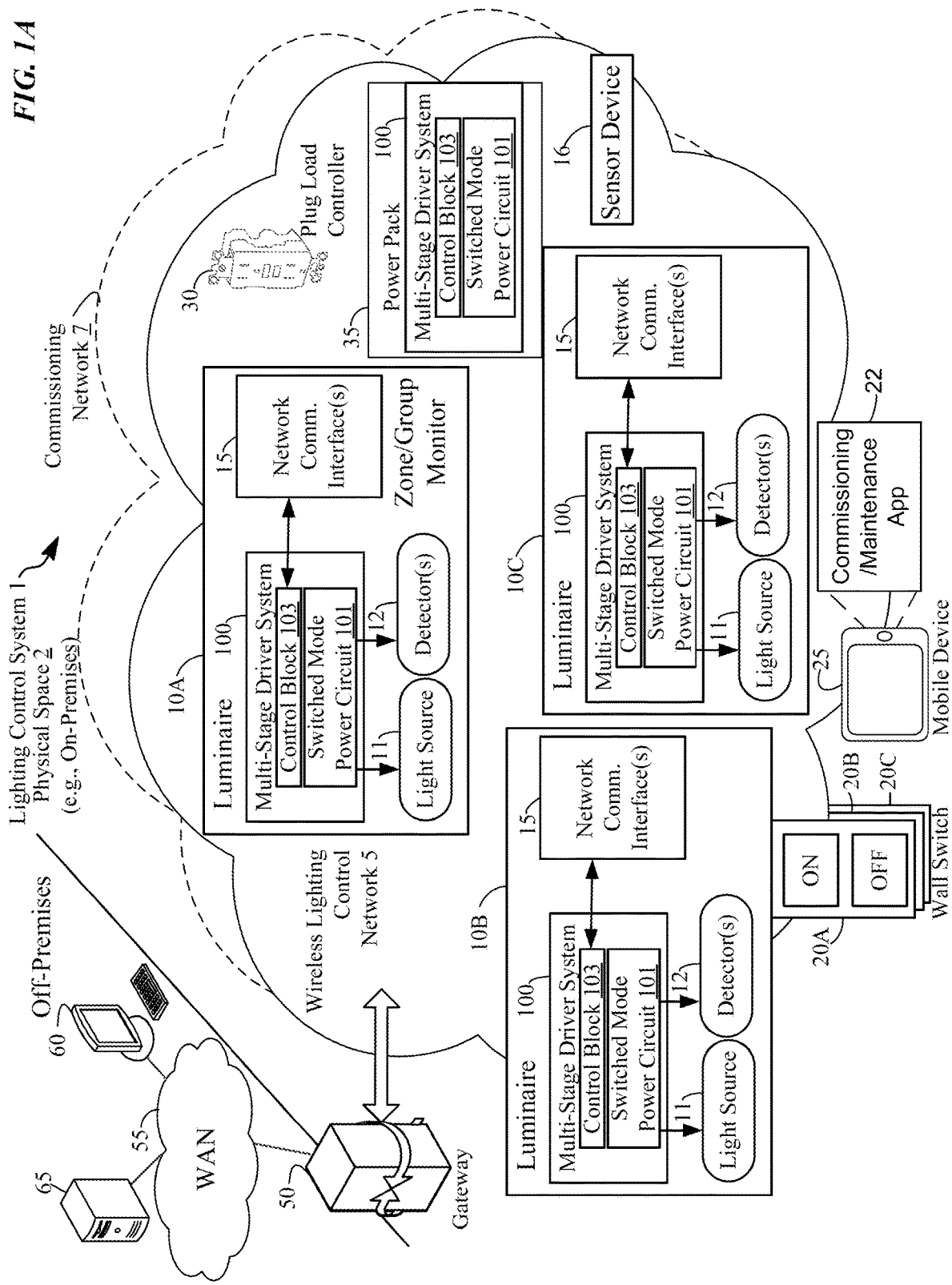
FIG. 1A is a high-level functional block diagram of an example of a lighting control system of networks and devices, including luminaires (e.g., light fixtures) with a multi-stage driver system.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Although the discussion herein is focused on light fixture type luminaires that have a fixed position in a space, it should be understood that other types of luminaires can be used/sensed in lieu of light fixtures, such as lamps. The term "luminaire" as used herein, is intended to encompass essentially any type of device, e.g., a light fixture or a lamp, that processes energy to generate or supply artificial light, for example, for general illumination of a space intended for use of or occupancy or observation, typically by a living organism that can take advantage of or be affected in some desired manner by the light emitted from the device. However, a luminaire may provide light for use by automated equipment, such as sensors/monitors, robots, etc. that may occupy or observe the illuminated space, instead of or in addition to light provided for an organism. However, it is also possible that one or more luminaries in or on a particular premises have other lighting purposes, such as signage for an entrance or to indicate an exit. In most examples, the luminaire(s) illuminate a space of a premises to a level useful for a human in or passing through the space, e.g. general illumination of a room or corridor in a building or of an outdoor space such as a street, sidewalk, parking lot or performance venue. The actual source of illumination light in or supplying the light for a luminaire may be any type of artificial light emitting device, several examples of which are included in the discussions below.

The "luminaire" can include other elements such as electronics and/or support structure, to operate and/or install the particular luminaire implementation. Such electronics hardware, for example, may include some or all of the appropriate driver(s) for the illumination light source, any associated control processor or alternative higher level control circuitry, and/or data communication interface(s). As noted, the lighting component(s) are located into an integral unit, such as a light fixture or lamp implementation of the luminaire. The electronics for driving and/or controlling the lighting component(s) may be incorporated within the luminaire or located separately and coupled by appropriate means to the light source component(s).

The term "lighting control system" or "lighting system" as used herein, is intended to encompass essentially any type of system that either includes a number of such luminaires coupled together for data communication and/or luminaire(s) coupled together for data communication with one or more control devices, such as wall switches, control panels, remote controls, central lighting or building control systems, servers, etc.

The illumination light output of a luminaire, for example, may have an intensity and/or other characteristic(s) that satisfy an industry acceptable performance standard for a general lighting application. The performance standard may vary for different uses or applications of the illuminated space, for example, as between residential, office, manufacturing, warehouse, or retail spaces. Any luminaire, however, may be controlled in response to commands received with the network technology of the lighting system, e.g. to turn the source ON/OFF, to dim the light intensity of the output, to adjust or tune color of the light output (for a luminaire having a variable color source), etc.

Terms such as "artificial lighting" or "illumination lighting" as used herein, are intended to encompass essentially any type of lighting in which a luminaire produces light by processing of electrical power to generate the light. A luminaire for artificial lighting or illumination lighting, for example, may take the form of a lamp, light fixture, or other luminaire that incorporates a light source, where the light source by itself contains no intelligence or communication capability, such as one or more LEDs or the like, or a lamp (e.g. "regular light bulbs") of any suitable type.

Illumination light output from the light source of the luminaire may carry information, such as a code (e.g. to identify the luminaire or its location) or downstream transmission of communication signaling and/or user data. The light based data transmission may involve modulation or otherwise adjusting parameters (e.g. intensity, color characteristic or distribution) of the illumination light output of the light source of the light source of the luminaire.

Terms such as "lighting device" or "lighting apparatus," as used herein, are intended to encompass essentially any combination of an example of a luminaire discussed herein with other elements such as electronics and/or support structure, to operate and/or install the particular luminaire implementation. Such electronics hardware, for example, may include some or all of the appropriate driver(s) for the illumination light source, any associated control processor or alternative higher level control circuitry, and/or data communication interface(s). The electronics for driving and/or controlling the lighting component(s) may be incorporated within the luminaire or located separately and coupled by appropriate means to the light source component(s).

The term "coupled" as used herein refers to any logical, optical, physical or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate or carry the light or signals.

The orientations of the lighting device, luminaire 10, sensor device 16, associated components and/or any complete devices incorporating the multi-stage driver system 100 such as shown in any of the drawings, are given by way of example only, for illustration and discussion purposes. In operation, any complete device including an electrical load 290A-N (e.g., light source 11, detector(s) 12, etc.) and the multi-stage driver system 100 may be oriented in any other direction suitable to the particular application. For example, the luminaires 10A-C or lighting device may be oriented for an up light or side light or any other orientation. Also, to the extent used herein, any directional term, such as lateral, longitudinal, left, right, up, down, upper, lower, top, bottom, and side, are used by way of example only, and are not limiting as to direction or orientation of any optic or component of an optic constructed as otherwise described herein.

Reference now is made in detail to the examples illustrated in the accompanying drawings and discussed below.

Figure 1B:
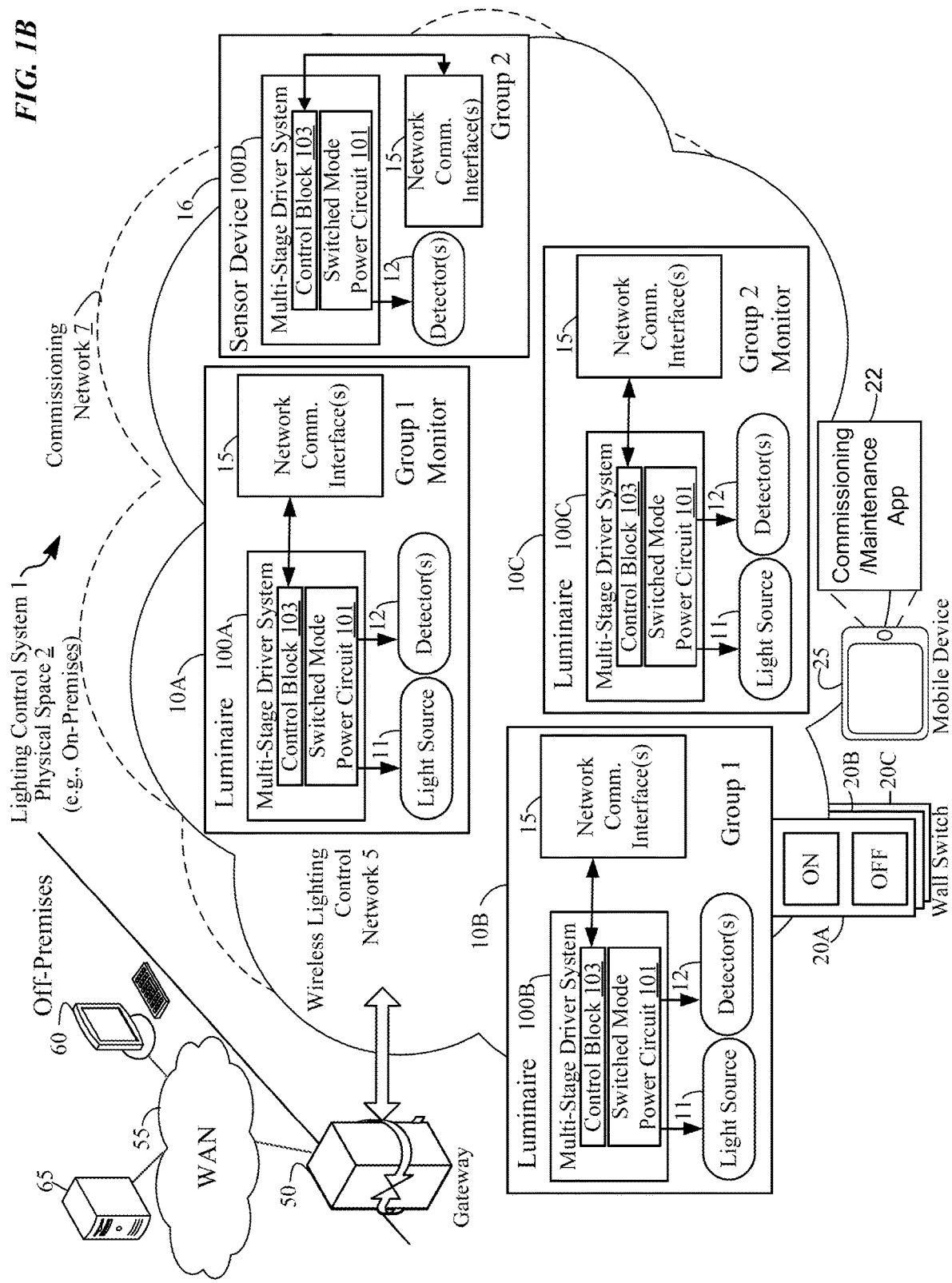
FIG. 1B is similar to FIG. 1A, but further shows a standalone sensor device; and illustrates exemplary lighting control groups for controlling a light source control setting of the light source of the luminaires via the wireless lighting control network.

FIG. 1A is a high-level functional block diagram of an example of a lighting control system 1 of networks and devices, including luminaires 10A-C (e.g., light fixtures) with a multi-stage driver system 100. In the example, the luminaires 10A-C may operate in accordance with different types of driver circuit protocols supported by the multi-stage driver system 100, for example, the driver circuit protocols may be a constant current for a light source 11 or a constant voltage for detector(s) 12. Lighting control system 1 further includes a set of wall switches 20A-C for controlling a light source control setting of a light source 11 of the luminaires 10A-C via the wireless lighting control network 5. As used herein, the light source control setting controls the light source 11, including, for example, by turning the light source 11 on/off, dimming up/down, setting a scene (e.g., a predetermined light setting), and can be based on sensor trip events for the detector(s) 12. FIG. 1A further depicts a plug load controller 30 and a power pack 35. FIG. 1B is similar to FIG. 1A, but further shows a standalone sensor device 16; and illustrates exemplary lighting control groups for controlling the light source control setting of the light source 11 of the luminaires 10A-C via the wireless lighting control network 5.

An installation of the lighting control system 1 in a physical space 2 on-premises (e.g., interior to a building or exterior) is comprised of one or more lighting control groups each operating independently of one another. One or more lighting control groups may exist in the wireless lighting control network 5. Each lighting control group will have a group monitor, and this is shown in FIG. 1B, where luminaire 10A is designated as the group 1 monitor and luminaire 10C is designated as the group 2 monitor.

For purposes of communication and control, each luminaire 10A-C is treated as single addressable device that can be configured to operate as a member of one or more lighting control groups or zones in communication via a wireless lighting control network 5. Detector(s) 12, such as daylight, occupancy, and audio sensors can be embedded in luminaires 10A-C, standalone sensor device 16, wall switches 20A-C, plug load controller 30, or power pack 35, to enable controls for occupancy and dimming. Lighting control system 1 may be designed for indoor commercial/residential space or an outdoor space. Lighting control system 1 further includes a mobile device 25 with a commissioning/maintenance application 22 to commission the luminaires 10A-C, sensor device 16, wall switches 20A-C, plug load controller 30, and power pack 35 for transmission and reception of light source control settings via the wireless lighting control network 5.

Light source 11 includes electrical-to-optical transducers, such as various light emitters, although the emitted light may be in the visible spectrum or in other wavelength ranges. Suitable light generation sources include various conventional lamps, such as incandescent; solid-state devices, e.g., one or more light emitting diodes (LEDs) of various types, such as planar LEDs, micro LEDs, micro organic LEDs, LEDs on gallium nitride (GaN) substrates, micro nanowire or nanorod LEDs, photo pumped quantum dot (QD) LEDs, micro plasmonic LED, micro resonant-cavity (RC) LEDs, and micro photonic crystal LEDs; as well as other sources such as micro super luminescent Diodes (SLD) and micro laser diodes. Of course, these light generation technologies are given by way of non-limiting examples, and other light generation technologies may be used. For example, it should be understood that non-micro versions of the foregoing light generation sources can be used.

A lamp or "light bulb" is an example of a single light source 11. An LED light engine may use a single output for a single source but typically combines light from multiple LED type emitters within the single light engine. Light source 11 can include light emitting diodes (LEDs) that emit red, green, and blue (RGB) light or tunable white light. Many types of light source(s) 11 provide an illumination light output that generally appears uniform to an observer, although there may be some color or intensity striations, e.g., along an edge of a combined light output. For purposes of the present examples, however, the appearance of the light source output may not be strictly uniform across the output area or aperture of the source. For example, although the source may use individual emitters or groups of individual emitters to produce the light generated by the overall source; depending on the arrangement of the emitters and any associated mixer or diffuser, the light output may be relatively uniform across the aperture or may appear pixelated to an observer viewing the output aperture. The individual emitters or groups of emitters may be separately controllable, for example to control intensity or color characteristics of the source output.

As shown, each luminaire 10A-C includes a light source 11, network communication (comm.) interface(s) 15, and a multi-stage driver system 100 that is coupled to the light source 11 and the network communication interface(s) 15. Multi-stage driver system 100 includes a switched mode power circuit 101 and a control block 103. Switched mode power circuit 101 is coupled to the light source 11 and the detector(s) 12. Control block 103 is coupled to the network communication interface(s) 15. As shown in the example of FIG. 1B, a first multi-stage driver system 100A of a first luminaire 10A operates in accordance with a LEDcode protocol between 0-5 V, which employs a one-wire universal asynchronous receiver/transmitter (UART) protocol. A second multi-stage driver system 100B of a second luminaire 10B operates in accordance with 0-10V dimming protocol, for example, utilizing pulse width modulation (PWM). A third multi-stage driver system 100C of a third luminaire 10C includes operates in accordance with digital addressable lighting interface (DALI) protocol between 0-24 V. Alternatively, the third multi-stage driver system 100C of the third luminaire 10C can operate in accordance with digital multiplex signal (DMX) protocol. A fourth multi-stage driver system 100D of a sensor device 10B is further shown in FIG. 1B.

Multi-stage driver system 100 is coupled to the light source 11 and/or the detector(s) 12 and drive the light source 11 and/or the detector(s) 12 by regulating the power to the light source 11 and the detector(s) 12. For example, multi-stage driver system 100 provides a constant quantity or power (e.g., DC power output) to the light source 11 as its electrical properties change with temperature, for example. Multi-stage driver system 100 has a universal architecture, which, for example, allows flexibility to enable the multi-stage driver system 100 to operate, for example, as a constant-voltage driver and constant-current driver. Multi-stage driver system 100 may have many channels (e.g., switched converter circuits 280A-C of FIG. 2) for separate control of various type of electrical load(s) 290A-N (see FIG. 2), such as light source(s) 11, including different LEDs or LED arrays; and detector(s) 12. As will be further described below, multi-stage driver system 100 can further include an alternating current (AC) or direct current (DC) current source or voltage source, a regulator, an amplifier (such as a linear amplifier or switching amplifier), a buck, boost, or buck/boost converter, or any other similar type of circuit or component. Multi-stage driver system 100 can output a variable voltage or current to the light source 11 and/or the detector(s) 12 that may include a DC offset, such that its average value is nonzero.

As shown in FIGS. 1A-B, luminaires 10A-C, wall switches 20A-C, sensor device 16, plug load controller 30, and power pack 35 communicate control over a 900 MHz (sub-GHz) wireless lighting control network 5 and include network communication interface(s) 15. Accordingly, each of these devices can include a first radio transceiver 15A (see FIGS. 12A-B and 13A-B) to communicate in the sub-GHz range of a first wireless communication band of the wireless lighting control network 5. A variety of controls are transmitted over wireless lighting control network 5, including, for example, to turn lights on/off, dim up/down, set scene (e.g., a predetermined light setting), and sensor trip events from detector(s) 12. In a first example, each luminaire 10A-C, standalone sensor device 16, wall switch 20A-C, plug load controller 30, and power pack 35 is also equipped with a second near range Bluetooth Low Energy (BLE) radio transceiver 15B (see FIGS. 12A-B and 13A-B) that communicates over wireless commissioning network 7 for purposes commissioning and maintenance the wireless lighting control system 1, however no light source control settings pass over the wireless commissioning network 7. This second transceiver 15B (see FIGS. 12A-B and 13A-B) can be a two gigahertz or higher band radio transceiver to communicate in a two GHz or higher range of a second wireless communication band of the wireless commissioning network 7. The respective frequencies of the two different wireless communication bands differ by at least a factor of two (2) (e.g., 900 MHz and 2.4 GHz; 2.4 GHz and 5 GHz; 900 MHz and 5 GHz). In a second example, wireless lighting control network 5 and commissioning network 7 are combined, such that both commissioning/maintenance and lighting controls pass over the GHz range wireless communication band (e.g., 2.4 GHz BLE). In the second example, each of luminaires 10A-C, wall switches 20A-C, sensor device 16, plug load controller 30, and power pack 35 are only equipped with a near range Bluetooth Low Energy (BLE) radio 15B (see FIGS. 12A-B and 13A-B). Alternatively or additionally, the lighting control network 5 and/or commissioning network 7 can be wired networks (e.g., Ethernet).

Plug load controller 30 plugs into existing AC wall outlets, for example, and allows existing wired lighting devices, such as table lamps or floor lamps that plug into a wall outlet, to operate in the lighting control system 1. The plug load controller 30 instantiates the table lamp or floor lamp by allowing for commissioning and maintenance operations and processes wireless lighting controls in order to the allow the lighting device to operate in the lighting control system 1. The plug load controller 30 can also be the AC receptacle itself.

Power pack 35 retrofits with existing wired light fixtures. The power pack 35 instantiates the wired light fixture by allowing for commissioning and maintenance operations and processes wireless lighting controls in order to allow the lighting device to operate in the wireless lighting control system 1. Both plug load controller 30 and power pack 35 can include the same or similar circuitry, hardware, and software as luminaires 10A-C and sensor device 16.

The lighting control system 1 is provisioned with a mobile device 25 that includes a commissioning/maintenance application 22 for commissioning and maintenance functions of the lighting control system 1. For example, mobile device 25 enables mobile commissioning, configuration, and maintenance functions and can be a PDA or smartphone type of device with human interfacing mechanisms sufficient to perform clear and uncluttered user directed operations. Mobile device 25 runs mobile type applications on iOS7, Android KitKat, and Windows 10 operating systems and commissioning/maintenance application 22 to support commissioning.

Web enabled (cloud) services for facilitating commissioning and maintenance activities is also provided by mobile device 25. The commissioning/maintenance application 22 of mobile commissioning device 25 interfaces with the cloud services to acquire installation and configuration information for upload to luminaires 10A-C, sensor device 16, wall switches 20A-C, etc. The installation and configuration information is sent by mobile device 25 to the gateway 50. The gateway 50 engages in communication through the wide area network (WAN) 55, such as the Internet, for example, with various off-premises computing devices 60, 65.

Lighting control system 1 can leverage existing sensor and fixture control capabilities of Acuity Brands Lighting's commercially available nLight® wired product through firmware reuse. In general, Acuity Brands Lighting's nLight® wired product provides the lighting control applications. However, the illustrated lighting control system 1 includes a communications backbone and includes model transport, network, media access control (MAC) physical layer (PHY) functions. The sub-GHz communications of the wireless lighting control network 5 features are built on a near 802.15.4 MAC and PHY implantation with network and transport features architected for special purpose control and air time optimizations to limit chatter. The lighting control system 1 can be deployed in standalone or integrated environments. Lighting control system 1 can be an integrated deployment, or a deployment of standalone groups with no gateway 50. One or more groups of lighting control system 1 may operate independently of one another with no backhaul connections to other networks.

Lighting control system 1 may comprise a mix and match of various indoor systems, wired lighting systems (nLight® wired), emergency, and outdoor (dark to light) products that are networked together to form a collaborative and unified lighting solution. Additional control devices and lighting fixtures, gateway(s) 50 for backhaul connection, time sync control, data collection and management capabilities, and interoperation with the Acuity Brands Lighting's commercially available SensorView® product may also be provided.

As shown in FIG. 1B, control, configuration, and maintenance operations of the lighting control system 1 involve networked collaboration between the luminaires 10A-C, sensor device 16, wall switches 20A-C, etc. and that comprise a lighting control group. An installation is comprised of one or more lighting control groups each operating independently of one another. One or more lighting control groups may exist in the wireless lighting control network 5. Each lighting control group will have a group monitor, and this is shown in FIG. 1B where there a two groups and each group has a monitor.

Groups are formed during commissioning of the lighting control system 1 where all members of the group are connected together over wireless lighting control network 5, which in our example is a sub-GHz subnetwork defined by an RF channel and a lighting control group identifier. The luminaires 10A-C, sensor device 16, wall switches 20A-C, plug load controller 30, and power pack 35 subscribe to channels and only listen for/react to messages on the RF channel with the identifier (ID) of the subscribed channel that designates the lighting control group that the luminaire 10A-C, sensor device 16, wall switch 20A-C, etc. are members of. For example, the devices subscribe to a multicast group as identified by the lighting control group identifier and only react to messages on the RF channel of the lighting control group. In general, lighting control groups do not share RF channels and thus form their own RF subnetwork, however with only 12 available channels some overlap is inevitable. A group can be further divided to address control to specific control zones within the group defined by a control zone identifier. Zone communications are managed as addressable features at run time. Up to 16 independent zones of control are available for each group and each group can support up to 128 addressable elements (luminaires 10A-C, sensor device 16, wall switches 20A-C, plug load controller 30, power pack 35).

Further description of the wall switches 20A-C, plug load controller 30, the power pack 35, commissioning over the wireless commissioning network 7, and communications of the wireless lighting control network 5 is found in U.S. Pat. No. 9,820,361, issued Nov. 14, 2017, titled "Wireless Lighting Control System," to applicant ABL IP Holding, LLC, the contents of which is incorporated by reference for all purposes in its entirety as if fully set forth herein. Further description of a wireless lighting control system with lighting control groups is found in U.S. Pat. No. 9,883,570, issued on Jan. 30, 2018, titled "Protocol for Lighting Control via a Wireless Network," to applicant ABL IP Holding, LLC, the contents of which is incorporated by reference for all purposes in its entirety as if fully set forth herein.

Figure 2:
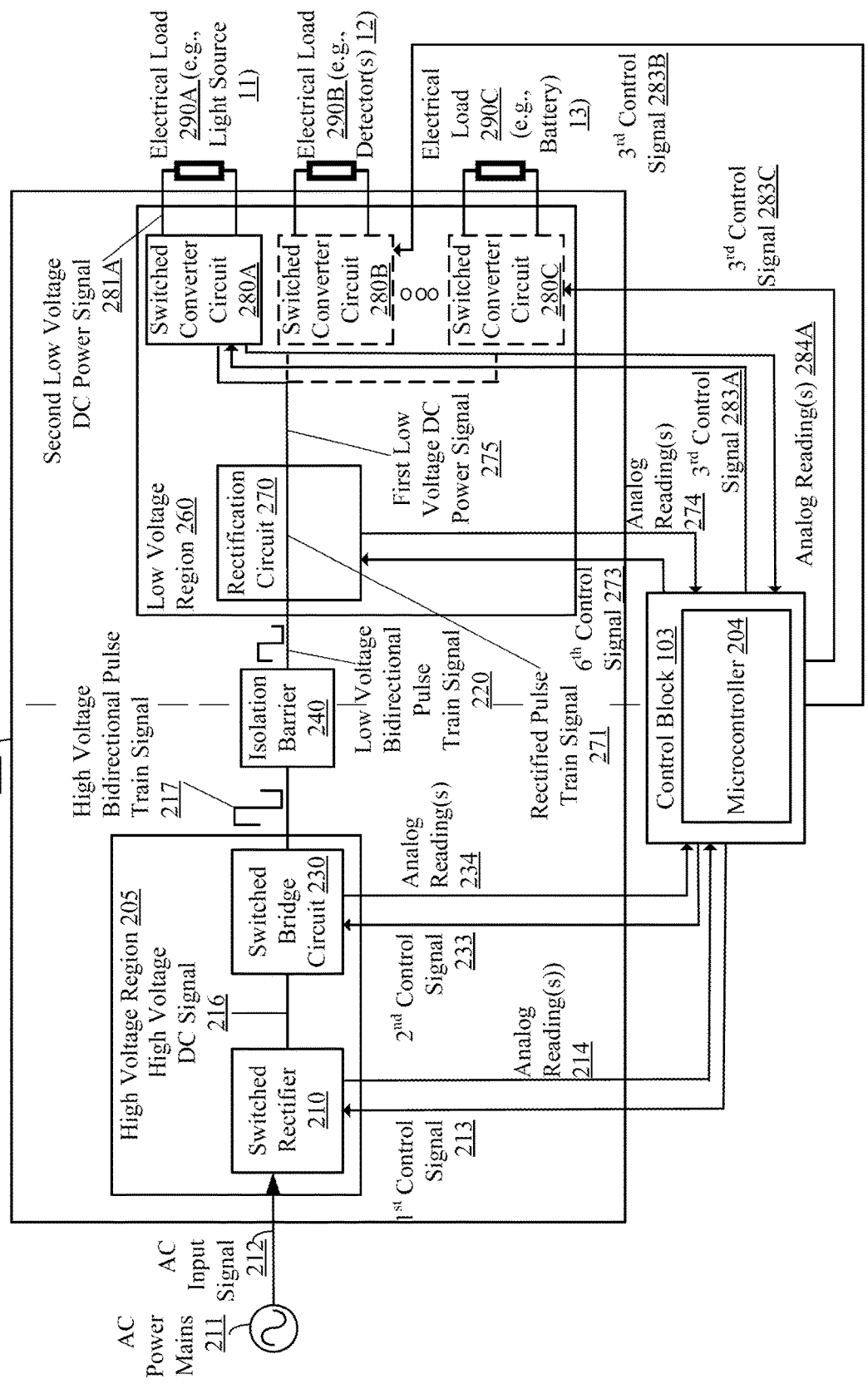
FIG. 2 is a high-level architecture of the example multi-stage driver system that includes a switched mode power circuit and a control block.

FIG. 2 is a high-level architecture block diagram of an example multi-stage driver system 100 that includes a switched mode power circuit 101 and a control block 103. Switched mode power circuit 101 is for providing power to an electrical load 290A. Control block 103 includes at least one microcontroller 204 coupled to control operations of the switched mode power circuit 101. It should be noted that a digital signal processor (DSP) or field-programmable gate array (FPGA) could be suitable replacements for the microcontroller 204, as long as the analog reading(s) 214, 234, 274, 284 (e.g., analog signals) can be correlated to the resulting control signals 213, 233, 273, 283A-C (e.g., digital pulse width modulation (PWM) signals).

Switched mode power circuit 101 includes a high voltage region 205, a low voltage region 260, and an isolation barrier 240. High voltage region 205 of the switched mode power circuit 101 can include multiple stages, such as a switched rectifier 210 and a switched bridge circuit 230. The switched rectifier 210 is to receive an alternating current (AC) signal 212 from an AC power mains 211 and a first control signal 213 from the control block 103. Switched rectifier 210 is configured to output a high voltage direct current (DC) signal 216 of a value based on the AC input signal 212 and the first control signal 213. The first control signal 213 is further described in FIG. 10-11.

Switched mode power circuit 101 further includes the switched bridge circuit 230 coupled to receive the high voltage DC signal 216 of the switched rectifier 210 and a second control signal 233 from the control block 103. Switched bridge circuit 230 is configured to produce a high voltage bidirectional pulse train signal 217 for output to the isolation barrier 240. The high voltage bidirectional pulse train signal 217 can be based on the high voltage DC signal 216 and the second control signal 233. As described herein, a "pulse train" can be a periodic or non-periodic waveform that is square, triangular, sinusoidal, partially sinusoidal, or a combination thereof.

Low voltage region 260 of the switched mode power circuit 101 can include multiple stages, such as a rectification circuit 270 and at least one switched converter circuit 280A. The rectification circuit 270 is coupled to the isolation barrier 240 to receive a low voltage bidirectional pulse train signal 220 from the isolation barrier 240. Rectification circuit 270 receives the low voltage bidirectional pulse train signal 220 from the isolation barrier 240 and rectifies the low voltage bidirectional pulse train signal 220 to a rectified pulse train signal 271. Rectification circuit 270 smoothes the rectified pulse train signal 271 to a first low voltage DC power signal 275 of a first DC level. Optionally, rectification circuit 270 can be coupled to receive a sixth control signal 273 from the control block 103 and to produce the first low voltage DC power signal 275 of the first DC level based on the the low voltage bidirectional pulse train signal 220 and the sixth control signal 273.

Low voltage region 260 further includes the at least one switched converter circuit 280A coupled to the first low voltage DC power signal 275 of the rectification circuit 270 and to receive a third control signal 283A from the control block 103. The at least one switched converter circuit 280A is configured to convert the first low voltage DC power signal 275 to a second low voltage DC power signal 281A of a second level suitable for driving the electrical load 290A. For example, suitability of the second level can be based on the first low voltage DC power signal 275 and the third control signal 283. In FIG. 2, the switched mode power circuit 101 includes three switched converter circuits 280A-C for controlling different types of electrical loads 290A-C. Hence, the first switched converter circuit 280A is coupled to the first low voltage DC power signal 275 of the rectification circuit 270 and to receive a third control signal 283A from the control block 103. A second switched converter circuit 280B is coupled to the first low voltage DC power signal 275 of the rectification circuit 270 and to receive a third control signal 283B from the control block 103. A third switched converter circuit 280C is coupled to the first low voltage DC power signal 275 of the rectification circuit 270 and to receive a third control signal 283C from the control block 103 to charge a third electrical load 290C (e.g., battery 13). However, a number of the switcher converter circuits 280A-N can be fewer or greater than three and varies depending on the number of electrical loads 290A-N being controlled by the multi-stage driver system 100.

Each of switched converter circuits 280A-C is coupled the first low voltage DC power signal 275 of the rectification circuit 270 and to receive a respective third control signal 281A-C from the control block 103. Each of the switched converter circuits 280A-C is configured to convert the first low voltage DC power signal 275 to a respective second low voltage DC power signal 281A-C of a respective second level suitable for driving a respective electrical load 290A-C. The second low voltage DC power signals 281A-C can be different channels configured with a different constant current configuration for separate control of different types of light source(s) 11 or a different constant voltage configuration for separate control of different types of detector(s) 12, for example.

In the example of FIG. 2, electrical load 290A includes the light source 11 and a first converter circuit 280A of the multi-stage driver system 100 is coupled to the light source 11 and drives the light source 11 with the second low voltage DC power signal 281A, for example, by providing a constant quantity (e.g., current) or power to light source 11, for example. Electrical load 290B includes detector(s) 12 and a second converter circuit 180B of the multi-stage driver system 100 is coupled to the detector(s) 12 to drive the detector(s) 12 with the second low voltage DC power signal 281B, for example, by providing a constant quantity (e.g., voltage) or power to detector(s) 12. The detector(s) 12 can be a daylight sensor, an occupancy sensor, an audio sensor, a temperature sensor, or other environmental sensor.

As shown in FIG. 2, the control block 103 receives feedback of various real-time control input signals, which include, for example, the analog reading(s) 214, 234, 274, and 284A-C, from the switched power mode circuit 101. Analog reading(s) 214 and 234 can include current and voltage readings from the high voltage region 205 and analog reading(s) 274 and 284A-C can include current and voltage readings the low voltage region 260. In the example of FIG. 2, control block 103 receives as input a first set of analog reading(s) 214 from the switched rectifier 210, a second set of analog reading(s) 234 from the switched bridge circuit 230, and a third set of analog reading(s) 284A from the switched converter circuit 280A. Control block 103 can also receive respective third sets of analog reading(s) 284B-C from respective switched converter circuits 280B-C; and an optional fourth set of analog reading(s) from the 274 rectification circuit 270.

Microcontroller 204 includes input/output (I/O) interface(s), such as I/O peripherals, analog-to-digital to converters (ADCs), and digital-to-analog converters (DACs), to convert the analog reading(s) 214, 234, 274, 284A-C from the analog domain into the digital domain and vice versa. After conversion by the I/O interface(s) (e.g., via ADC), the digital representation of the analog reading(s) 214, 234, 274, 284A-C are digitally processed (e.g., interpreted) by firmware/software executed by a processor of the microcontroller 204 and digital control signals are generated. The control signal(s) 213, 233, 273, 283A-C (e.g., PWM gate drive outputs 310A . . . N) to control FETs 308A . . . N can be generated utilizing, for example, at least three different techniques. First, an I/O peripheral internal or external to the microcontroller 204 can generate the control signal(s) 213, 233, 273, 283A-C. Second, a general purpose input/output (GP I/O) interface of the microcontroller 204 changes the control signal(s) 213, 233, 273, 283A-C based on a signal from the processor of the microcontroller 204. Third, a software control loop changes the control signal(s) 213, 233, 273, 283A-C from low to high. In yet another example, the I/O interface(s) of the microcontroller 204 then convert (e.g., via DAC), the digital control signals that are in the digital domain into control signals 213, 233, 283A-C for the switched mode power circuit 101. In some examples, the analog reading(s) 274 received from the rectification circuit 270 are similarly processed and digital control signals for the rectification circuit 270 are similarly generated by the microcontroller 204. The digital control signals to control the rectification circuit 270 are similarly fed through the I/O interface(s), for example, to create control signal(s) 213, 233, 273, 283A-C (not shown) to control field effect transistors (FETs) 308x of the rectification circuit 270.

Based on the feedback of the real-time control input signals (e.g., analog reading(s) 214, 234, 274, 284A-C), the control block 103 adjusts operation of the switched mode power circuit 101, including the high voltage region 205 and the low voltage region 260. The operation adjustment includes performance (e.g., efficiency) optimization of the switched mode power circuit 101, for example by programming (e.g., configuring) the switched mode power circuit 101 by adjusting control signals 213, 233, and 283A-C. Such operation adjustments can propagate across both the high voltage region 205 and the low voltage region 260 by responding to the real-time input signal(s) (e.g., analog reading(s) 214, 234, 274, 284A-C) with at least one control signal 213, 233, 283A-C to the high voltage region 205 and the low voltage region 260.

Figure 3:
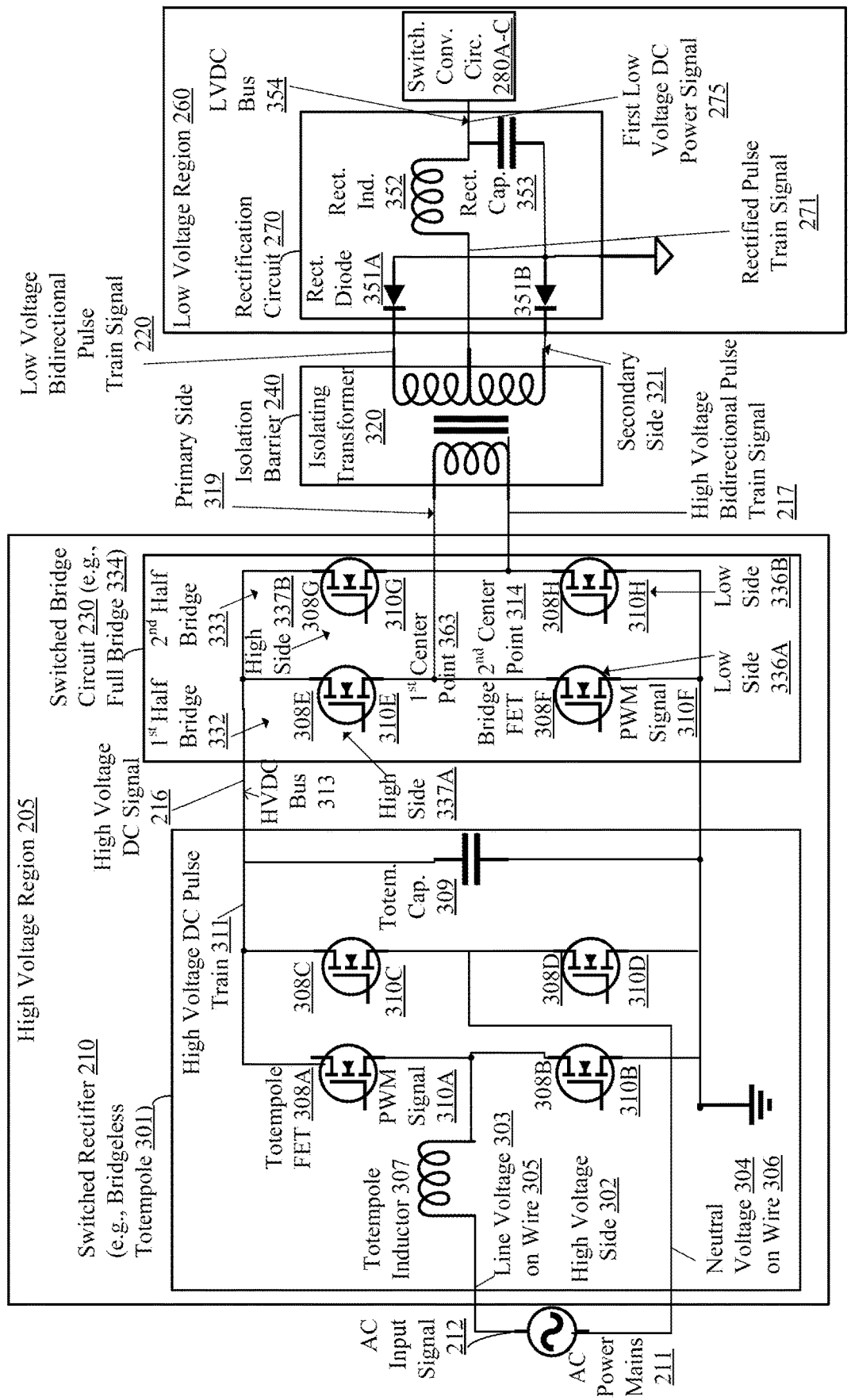
FIG. 3 is a block diagram of the high voltage region, the isolation barrier, and the rectification circuit of the low voltage region of the switched mode power circuit.

FIG. 3 is a block diagram of the high voltage region 205, the isolation barrier 240, and the rectification circuit 270 of the low voltage region 260 of the switched mode power circuit 101. As shown, the switched rectifier 210 includes an AC line voltage wire 305 on a high voltage side 302 and an AC neutral voltage wire 306 on the high voltage side 302 to receive the AC input signal 212. The AC line voltage wire 305 carries an AC line voltage 303 of the AC input signal 212. The AC neutral voltage wire 306 carries an AC neutral voltage 304 of the AC input signal 212.

Figure 4:
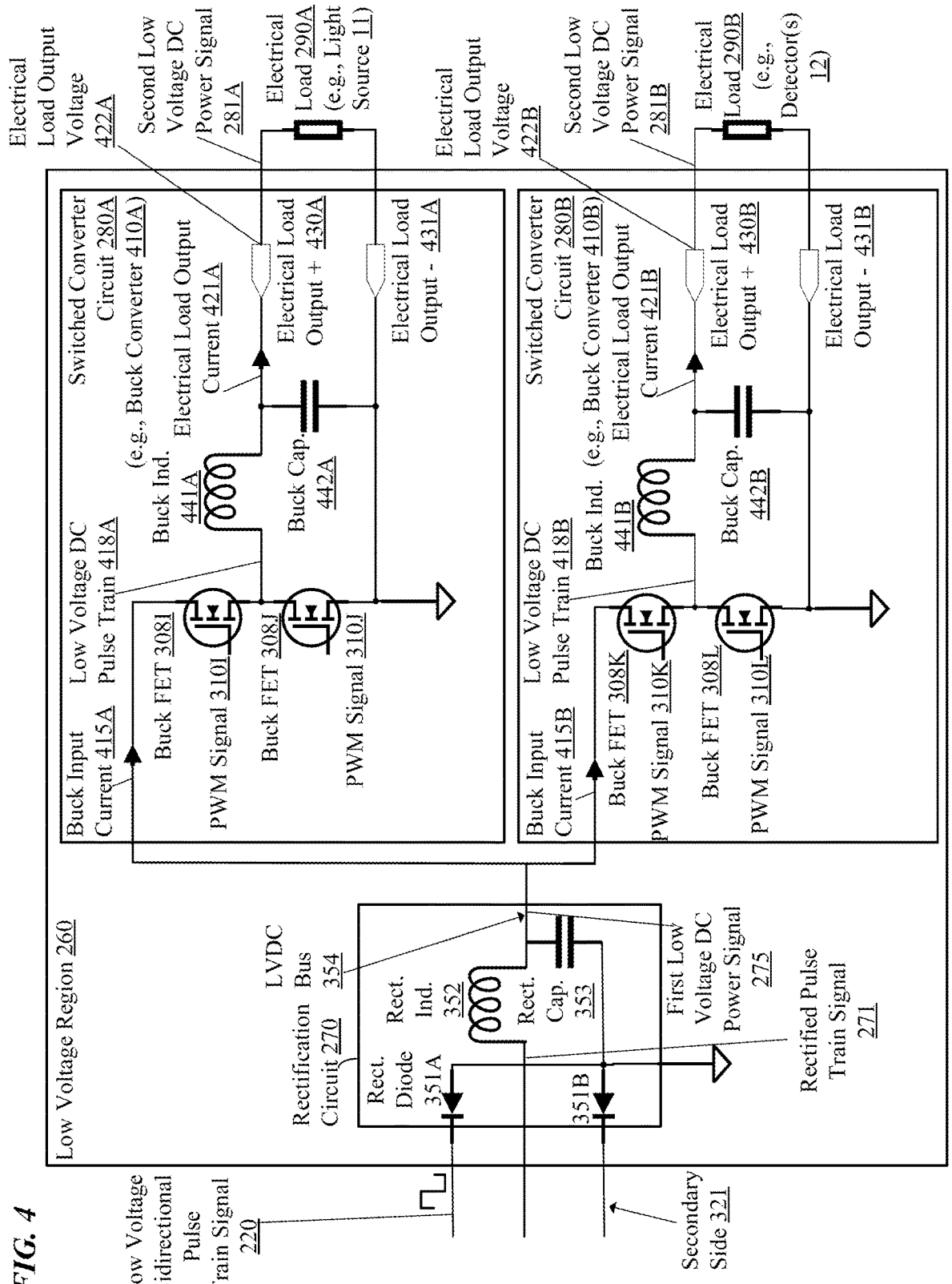
FIG. 4 is a block diagram of the low voltage region, including the rectification circuit and switched converter circuit.

In FIG. 3, the example topology of the switched rectifier 210 includes a bridgeless totempole 301 that includes at least four field effect transistors (FETs) 308A-D. The example switched bridge circuit 230 includes a full-bridge 334 that includes at least four FETs 308E-G. In FIG. 4, at least one switched converter circuit 280A includes a buck converter 410A that includes at least two FETs 308I-J. Two switched converter circuits 280A-B are actually shown in FIG. 4, each of which includes a respective buck converter 410A-B that has respective FETs 308I-J and 308K-L. Although all of the FETs 308x of the various stages are labeled with same reference numeral 308x, it should be understood that not all of the FETs 308x need to be the same model/type of FET. For example the FETs 308I-J and 308K-L of the respective switched converter circuits 280A-B are lower voltage rated FETs than the totempole FETs 308A-D of the switched rectifier 210 and the bridge FETs 308E-H of the switched bridge circuit 230.

FETs 308A-L can include wide-bandgap FETs, silicon FETs, or a combination thereof. A bandgap is the difference in energy between the valence band and the conduction band of a solid material (such as an insulator or semiconductor) that consists of the range of energy values forbidden to electrons in the material. Wide-bandgap semiconductors (also known as WBG semiconductors or WBGSs) are semiconductor materials that have a relatively large bandgap compared to conventional semiconductors. Conventional semiconductors like silicon have a bandgap in the range of 1-1.5 electron volts (eV), whereas wide-bandgap materials have bandgaps in the range of 2-4 eV. Accordingly, "wide-bandgap FETs" have a bandgap in a range of two (2) to four (4) electron volts (eV).

Returning to FIG. 3, switched rectifier 210 includes a bridgeless totempole 301 that generally includes at least two totempole field effect transistors (FETs) 308A-B, a totempole inductor 307, and a totempole capacitor 309. The bridgeless totempole 301 eliminates the need for a bridge rectifier, performs power factor correction, and boosts input (e.g., allows for use of a smaller storage capacitor 309 and use of universal voltage). The specific bridgeless totempole 301 of FIG. 3 includes at least four totempole FETs 308A-B, where the two additional FETs 308C-D are for active rectification of the AC input signal 212, which is further in shown in FIG. 5A. However, in the example of FIG. 5B, the bridgeless totempole 301 includes at least two diodes 502A-B, where the at least two diodes 502A-B are for passive rectification of the AC input signal 212.

In the example, the AC input signal 212 is about 120 Volts (V) AC root mean square (RMS). The exact detection of the value of the AC input signal 212 occurs in the microcontroller 204 of the control block 103 via digital controls. Switched rectifier 210 outputs a high voltage DC signal 212 that is from about 170 to 250 V for DC input to the switched bridge circuit 230. Typically, the high voltage DC signal 212 to the switched bridge circuit 230 is greater than 170V DC (assuming a peak voltage of a 120 VAC RMS is received as the AC input signal 212) because of the operation of the switched rectifier 210, the output is higher than the input. In other examples, with a 24 VAC RMS as the AC input signal 212, the switched rectifier 210 can output 34 VDC to 250 VDC as the high voltage DC signal 212 to the switched bridge circuit 230.

The at least two totempole FETs 308A-B are switched based on pulse width modulation (PWM) to adjust a respective totempole duty cycle of the at least two totempole FETs 308A-B. The at least one microcontroller 204 (e.g., a high voltage region microcontroller 204A of FIG. 10) outputs a respective totempole PWM signal 310A-B to each of the at least two totempole FETs 308A-B to switch the at least two totempole FETs 308A-B to adjust the respective totempole duty cycle. The at least two totempole FETs 308A-B output a high voltage DC pulse train 311 from the AC input signal 212 based on the adjusted respective totempole duty cycle. The totempole capacitor 309 smooths the high voltage DC pulse train 311 of the at least two totempole FETs 310A-B into the high voltage DC signal 216 and stores energy throughout an AC cycle. In the specific example of FIG. 3, the at least one microcontroller 204 (e.g., a high voltage region microcontroller 204A of FIG. 10) outputs a respective totempole PWM signal 310A-D to each of the four totempole FETs 308A-D to switch the four totempole FETs 308A-D to adjust the respective totempole duty cycle.

Figure 5A:
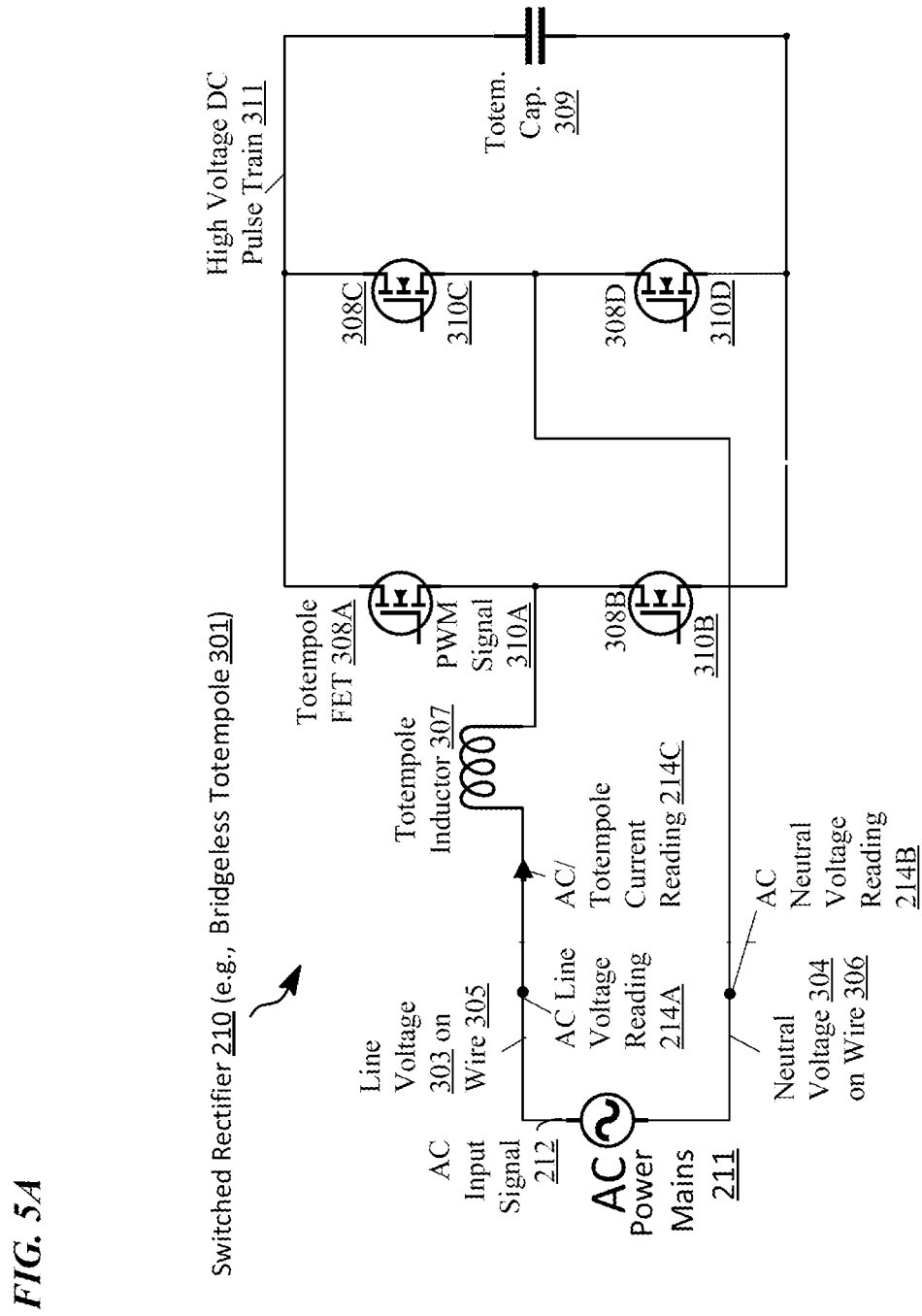
FIG. 5A depicts a first design of a bridgeless totempole of a switched rectifier.
Figure 5B:
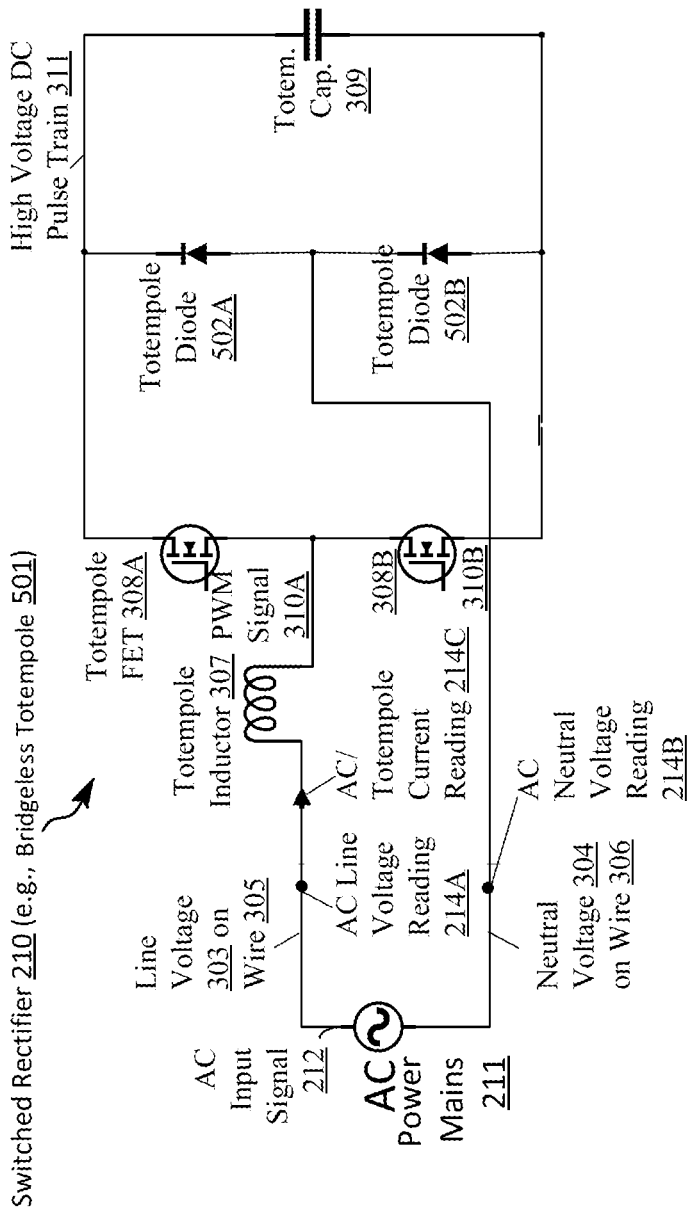
FIG. 5B depicts a second design of a bridgeless totempole of the switched rectifier.
Figure 11:
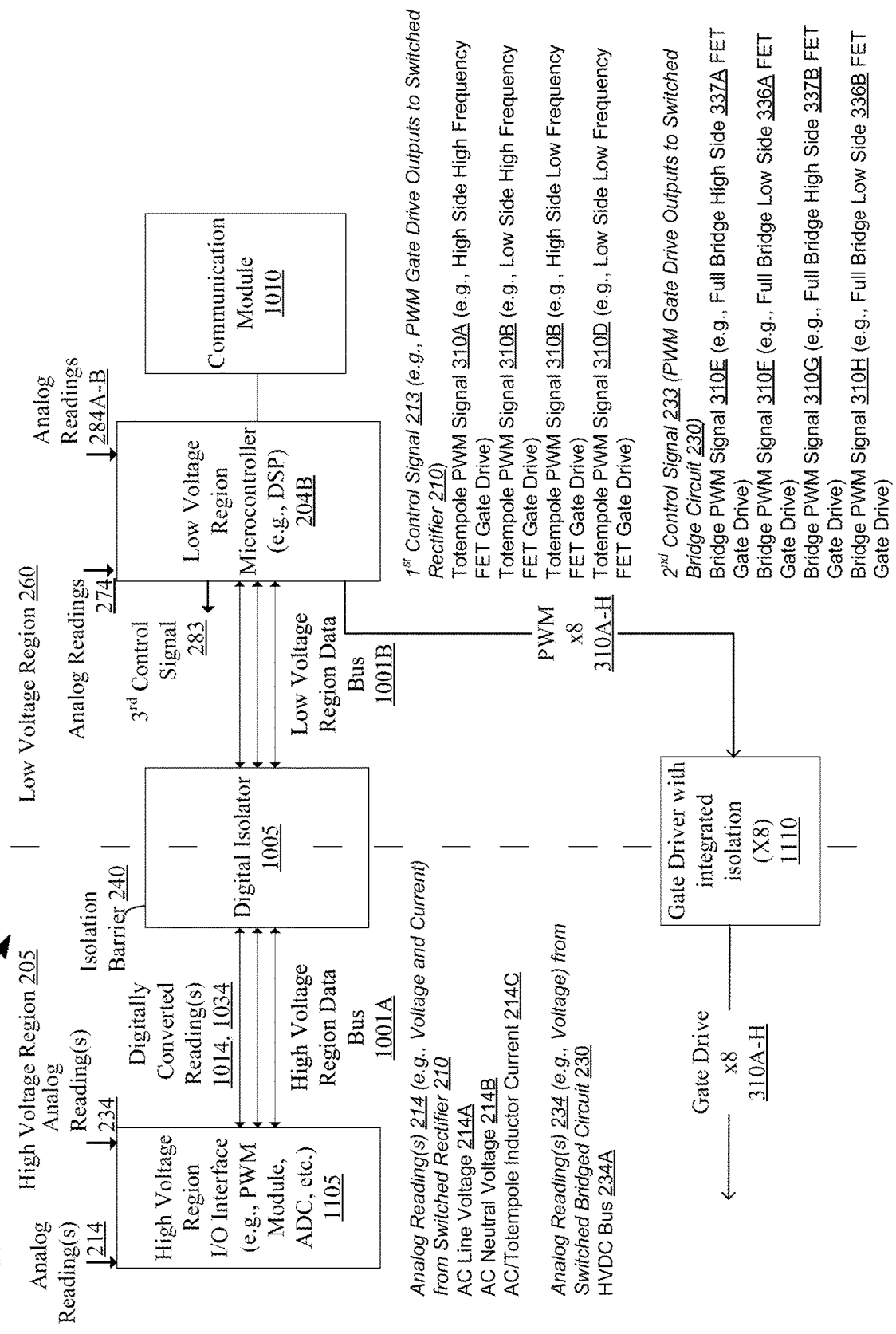
FIG. 11 illustrates a second control block design of the multi-stage driver system.

The at least two totempole FETs 308A-B are split into a low side and a high side. The at least one microcontroller 204 (e.g., a high voltage region microcontroller 204A of FIG. 10) outputs the respective totempole PWM signal 310A-B to each of the at least two totempole FETs 308A-B to alternatively switch the low side and the high side to output the high voltage DC pulse train 311. In the example of FIG. 3, the at least one microcontroller 204 (e.g., a high voltage region microcontroller 204A of FIG. 10) outputs the respective totempole PWM signal 310A-D to each of the four totempole FETs 308A-D to alternatively switch the low side and the high side to output the high voltage DC pulse train 311. More specifically, the totempole FETs 308A-B (vertically aligned in FIG. 3) are alternatively driven on/off by totempole PWM signals 310A-B, respectively. Totempole FETs 308C-D (vertically aligned in FIG. 3) are alternatively driven on/off by totempole PWM signals 310C-D, respectively. First control signal 213 for the four totempole FETs 308A-D design of bridgeless totempole 301 are shown in FIGS. 5A, 10, and 11. Alternatively, as shown in FIG. 5B, two diodes 502A-B can be used in lieu of totempole FETs 308C-D, in which case the two diodes 502A-B passively allow current to flow in only one direction.

Isolation barrier 240 includes an isolating transformer 320 coupled between the high voltage region 205 and the low voltage region 260 for galvanic isolation and to output the low voltage bidirectional pulse train signal 220. Isolating transformer 320 includes a primary side 319 and a secondary side 321. The high voltage bidirectional pulse train signal 217 is inputted into the primary side 319 of the isolating transformer 320. The low voltage bidirectional pulse train signal 220 is outputted from the secondary side 321. Rectification circuit 270 is connected to the secondary side 321 of the isolating transformer 320. As shown, the isolating transformer 320 is center tapped to allow for a full wave rectifier, but a single tap transformer can be utilized for half wave rectification.

Switched bridge circuit 230 generally includes a first half-bridge that includes a first set of two bridge field effect transistors (FETs) 308E-F in a half-bridge configuration. A first center point 363 of the first half-bridge 332 is connected to the primary side 319 of the isolating transformer 320. In the example of FIG. 3, switched bridge circuit 230 includes a full-bridge 334 that further includes a second half-bridge 333 having a second set of two bridge FETs 308G-H in the half-bridge configuration. A second center point 314 of the second half-bridge 333 is connected to the primary side 319 of the isolating transformer 320.

More generally, the full-bridge 334 includes at least four bridge field effect transistors (FETs) in a bridge configuration of two half-bridges 332, 333. A respective center point 363, 314 of each of the two half-bridges 332, 333 is tapped across the primary side 319. Full-bridge 334 converts the high voltage DC signal 216 to the high voltage bidirectional pulse train 217. Full-bridge 334 includes a high voltage DC (HVDC) bus 313 to carry the high voltage DC signal 216 received from the switched rectifier 210. The at least four bridge FETs 310E-H are switched based on pulse width modulation (PWM) to adjust a respective bridge duty cycle of the at least four bridge FETs 310E-H.

The at least one microcontroller 204 (e.g., a high voltage region microcontroller 204A of FIG. 10) outputs a respective bridge PWM signal 310E-H to each of the at least four bridge FETs 308E-H to switch the at least four bridge FETs 308E-H to adjust the respective bridge duty cycle. The isolating transformer 320 converts the high voltage bidirectional pulse train signal 217 into the low voltage bidirectional pulse train signal 220 outputted from the secondary side 321 based on the adjusted respective bridge duty cycle.

In the example of FIG. 3, the bridge FETs 308E and 308H (diagonal to each other in FIG. 3) are simultaneously driven on/off by bridge PWM signals 310E and 310H, respectively. Bridge FETs 310F and 310G (diagonal to each other in FIG. 3) are simultaneously driven on/off by totempole PWM signal 310F and 310G, respectively. In other words, each of the two-half bridges 332, 333 has a respective low side 336A-B and a respective high side 337A-B. The at least one microcontroller 204 (e.g., a high voltage region microcontroller 204A of FIG. 10) outputs the respective bridge PWM signal 310E-H to each of the at least four bridge FETs 308E-H to switch the respective high side 337A of a first half-bridge 332 on simultaneously with the respective low side 336B of a second half-bridge 333 and/or to apply an offset between switching the respective high side 337A and the respective low side 336B on/off. Similarly, the at least one microcontroller 204 (e.g., a high voltage region microcontroller 204A of FIG. 10) outputs the respective bridge PWM signal 310E-H to each of the at least four bridge FETs 308E-H to switch the respective low side 336A of the first half-bridge 332 on simultaneously with the respective high side 337B of the second half-bridge 333 and/or to apply an offset between switching the respective low side 336A and the respective high side 337B on/off. All four bridge FETs 308E-H can be controlled independently in certain applications, for example, to allow slight variations of the control scheme to improve efficiency. For example, as noted, the control scheme can be modified to apply an offset between switching the at least four bridge FETs 308E-H on/off.

Figure 7A:
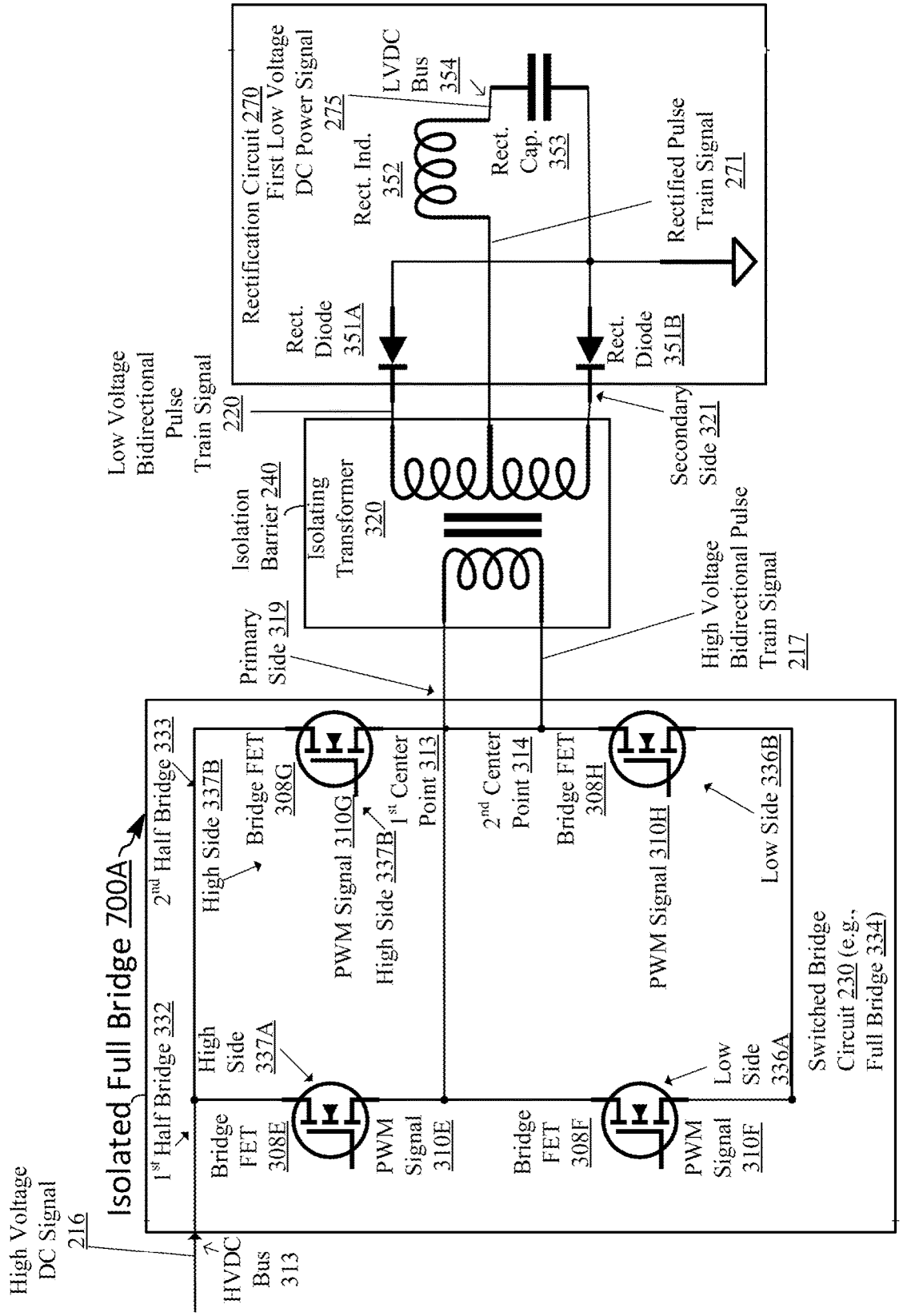
FIG. 7A depicts an isolated full-bridge design like that of FIGS. 3-4 formed of a switched bridge circuit, isolation barrier, and rectification circuit.
Figure 7B:
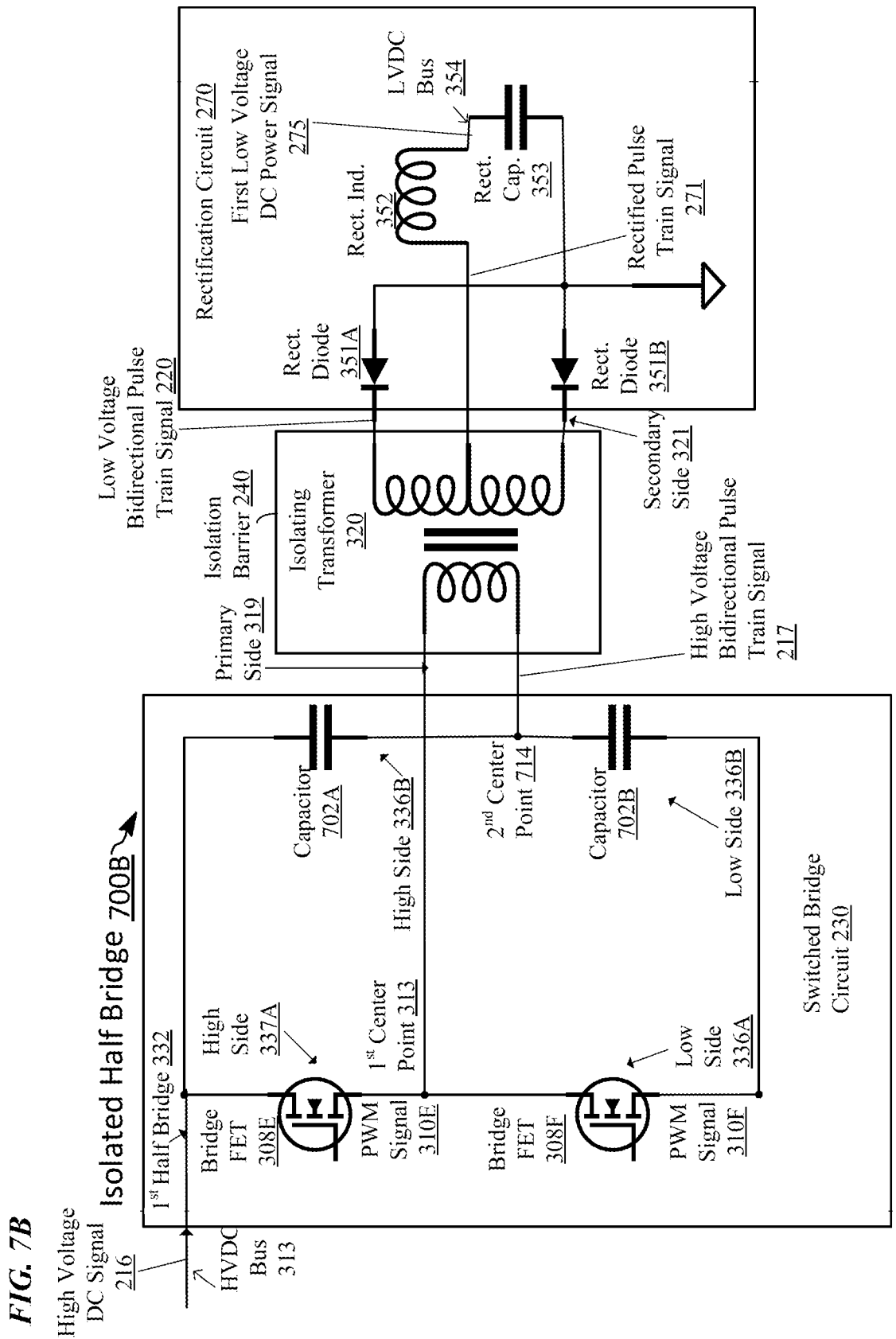
FIG. 7B depicts an isolated half bridge design formed of the switched bridge circuit, isolation barrier, and rectification circuit.

Alternatively, as shown in FIG. 7B, the switched bridge circuit 230 can further include two capacitors 702A-B that are used in lieu of bridge FETs 308G-H. As shown in FIG. 7B, a second center point 714 of the two capacitors 702A-B is connected to the primary side 319 of the isolating transformer 320. In this case, the capacitors 702A-B provide a fixed voltage of ½*HVDC to the second center point 714. The isolated half bridge 700B still provides a high voltage bidirectional square wave, just with half the amplitude of the isolated full bridge 700A.

Generally, rectification circuit 270 includes at least one diode 351A to rectify the low voltage bidirectional pulse train signal 220 from the isolation barrier 240 to the rectified pulse train signal 271. In the example of FIG. 3, the rectification circuit 270 includes two didoes 351A-B to rectify the low voltage bidirectional pulse train signal 220 from the isolation barrier 240 to the rectified pulse train signal 271. The rectification circuit 270 includes an inductor 352 and a capacitor 353 to smooth the rectified pulse train signal 271 to the first low voltage DC power signal 275. The rectification circuit 270 includes a low voltage DC bus 354 to carry the first low voltage DC power signal 275 from the rectification circuit 270.

FIG. 4 is a block diagram of the low voltage region 260 including the rectification circuit 270 and at least one switched converter circuit 280A. The at least one switched converter circuit 280A includes a buck converter 410A. The buck converter 410A includes at least one buck field effect transistor (FET) 308I coupled to the low voltage DC bus 354. The buck converter 410A produces a second low voltage DC power signal 281A suitable for driving the electrical load 290A from the first low voltage DC power signal 275. In the example of FIG. 4, the buck converter 290A actually includes at least two buck FETs 308I-J coupled to the low voltage DC bus 354. The at least two buck FETs 308I-J are switched based on pulse width modulation (PWM) to adjust a respective buck duty cycle of the at least two buck FETs 308I-J.

As shown, the low voltage region 260 can include a plurality of switched converter circuits 280A-B. Each switched converter circuit 280A-B includes a respective buck converter 410A-B. In FIG. 4, a first buck converter 410A converts the first low voltage DC power signal 275 to a constant current (e.g., for a light source 11). A second buck converter 410B converts the first low voltage DC power signal 275 to a constant voltage (e.g., for detector(s) 12). Hence, two switched converter circuits 280A-B are shown in FIG. 4.

Buck converters 410A-B drop the bus voltage, shown as the first low voltage DC power signal 275 carried on the low voltage DC bus 354. Buck converter 410A may regulate the electrical load output voltage 422A to drive the electrical load 290A. Buck converters 410A-B can regulate the output current (e.g., electrical load output current 421A-B). For example, buck converter 410A regulates the electrical load output current 421A to a constant current configuration to drive the electrical load 290A that is an LED type of light source 11. For example, buck converter 410B regulates the electrical load output voltage 422B to a constant voltage configuration to drive the electrical load 290B that is a detector 12 (e.g., sensor). Buck converters 410A-B use low side FETs 308J and 308L for synchronous rectification, which improves efficiency. The number of buck converters 410A-N is only limited by the I/O interfaces (e.g., I/O peripherals) of the microcontroller 204 in the control block 103 and resources.

Each switched converter circuit 280A-B includes a respective buck converter 410A-B that includes two respective buck FETs 308I-J and 308K-L for driving a respective electrical load 290A-B. The respective buck converter 410A-B produces a respective second low voltage DC power signal 281A-B suitable for driving a respective electrical load 290A-B from the first low voltage DC power signal 275. Each respective buck converter 410A-B includes at least two buck respective FETs 308I-J, 308K-L coupled to the low voltage DC bus 354. The at least two respective buck FETs 308I-J, 308K-L are switched based on pulse width modulation (PWM) to adjust a respective buck duty cycle of the at least two respective buck FETs 308I-J, 308K-L.

The at least one microcontroller 204 (e.g., a low voltage region microcontroller 204B of FIG. 10) outputs a respective buck PWM signal 310I-J to each of the at least two buck FETs 308I-J of buck converter 410A to independently switch on/off the at least two buck FETs 308I-J to adjust the respective buck duty cycle. The at least two buck FETs 308I-J output a low voltage DC pulse train 418A from the first low voltage DC power signal 275 based on the adjusted respective buck duty cycle of the at least two buck FETs 308I-J. The buck converter 410A includes an inductor 441A and a capacitor 442A to smooth the low voltage DC pulse train 418A to the second low voltage DC power signal 281A. The second low voltage DC power signal 281A includes a constant current. The electrical load 290A includes a light source.

Similarly, the at least one microcontroller 204 (e.g., a low voltage region microcontroller 204B of FIG. 10) outputs a respective buck PWM signal 310K-L to each of the at least two buck FETs 308K-L of buck converter 410B to independently switch on/off the at least two buck FETs 308K-L to adjust the respective buck duty cycle. The at least two buck FETs 308K-L output a respective low voltage DC pulse train 418B from the first low voltage DC power signal 275 based on the adjusted respective buck duty cycle of the at least two buck FETs 308K-L. The buck converter 410B includes an inductor 441B and a capacitor 442B to smooth the respective low voltage DC pulse train 418B to a respective second low voltage DC power signal 281B. The second low voltage DC power signal 281B includes a constant voltage. The electrical load 290B includes detector(s) 12 (e.g., a sensor).

In FIGS. 2-4, control block 103 outputs a first control signal 213 to the switched rectifier 210, a second control signal 233 to the switched bridge circuit 230, and a third control signal 283A to the switched converter circuit 280A. If there is more than one switcher converter circuit 280-C, the control block 103 outputs a respective third control signal 283A-C to each respective switched converter circuit 280-C. The control signals 213, 233, and 283A-C outputted from the control block 103 are fed into the switched mode power circuit 101 to switch the FETs 308A-L of the high voltage region 205 and the low voltage region 260. First control signal 213 includes a pulse width modulation (PWM) gate drive output 310A-D to each of the totempole FETs 308A-D of the switched rectifier 210. Second control signal 233 includes a PWM gate drive output 310E-H to each of the bridge FETs 308E-H of the switched bridge circuit 230. Third control signal 283A for switched converter circuit 280A includes a PWM gate drive output 310I-J to each of the buck FETs 308I-J of the switched converter circuit 280A. Third control signal 283B for switched converter circuit 280B includes a pulse width modulation (PWM) gate drive output 310K-L to each of the buck FETs 308K-L of the switched converter circuit 280B.

By adjusting a duty cycle of the FETs 308A-L via the control signals 213, 233, 283A-C, the performance can be optimized by minimizing power losses in the high voltage region 205 and the low voltage region 260 while maintaining at least one power parameter of a DC power signal within a tolerance of a power configuration settling value of the electrical load 290A-C. The power parameter and corresponding configuration setting value relate to general overall configuration, e.g. power (W, watts), voltage (V, volts), current (A, amps), constant voltage or current configuration, etc. Tolerance value means that the parameter need not be absolutely the same as the configuration setting value, just kept within some suitable range, e.g. ±5% or ±10% of the setting value. For example, for luminaires 10A-C, the corresponding configuration setting value for the power parameter is a value suitable for driving a light emitting diode (LED) light source 11 of the luminaire 10A-C. In one example, if the second low voltage DC power signal 281A only need to be 60 volts (V) for the light source 11, then the high voltage DC signal 216 is set to 250 V by controlling the totempole FETs 308A-D of the switched rectifier 210 via respective PWM signals 310A-D.

For example, controlling the PWM gate drive outputs 310A-L allows tuning of the high voltage DC pulse train 311, high voltage DC signal 216, high voltage bidirectional pulse train signal 217, low voltage bidirectional pulse train signal 220, rectified pulse train signal 271, first low voltage DC power signal 275, and second low voltage DC power signal 281A-B. Controlling the PWM gate drive outputs 310A-L also enables the switched mode power circuit 101 to be configurable for different applications or electrical load(s) 290A-N, for example, to maintain a constant current configuration (e.g., for powering an LED type of light source 11) or a constant voltage configuration (e.g., for powering detector(s) 12). Controlling the PWM gate drive outputs 310A-L also enables other configurable applications of the switched mode power circuit 101, including visual light communication (VLC), emergency lighting (e.g., bidirectional converter for battery charging—buck and battery input source—boost conversion), etc. For example, in emergency lighting, the bidirectional converter (e.g., switched converter circuit 280A) can be used as a buck converter while charging the battery in one direction and as a boost converter while drawing power from the battery in an opposite direction.

Each of the wide-bandgap FETs 310A-L shown in FIGS. 3-4 can include a gallium nitride (GaN) FET, silicon carbide (SiC) FET, or any suitable wide-bandgap material. Silicon FETs can be used where suitable and can include a bandgap of 1-2 eV. GaN FETs, which have a wide-bandgap are inherently smaller than silicon FETs, which do not have wide-bandgap. A design operating at the target frequency bands of the switched mode power circuit 101 ranging from 300 kilohertz (kHz) to 30 megahertz (MHz) can be built using silicon FETs, but the switching losses may be too large and make an inefficient switched mode power circuit 101, resulting in unacceptable power losses, which also increases heatsink requirements of the multi-stage driver system 100.

Wide-bandgap FETs have higher breakdown voltages, which enables smaller FET devices to be built. Accordingly, a multi-stage driver system 100 built with wide-bandgap FETs is smaller in size compared to a multi-stage driver system 100 built with silicon FETs. Moreover, when totempole FETs 308A-D of the switched bridge circuit 210, bridge FETs 308E-H of the switched bridge circuit 230, and buck FETs 308I-L of the converter circuits 280A-B are wide-bandgap FETs, efficient switching at higher frequencies is attained. The wide-bandgap FETs ability to efficiently switch at high frequencies, allows reduction of the size of passive components (e.g., inductors 307, 352, 441A-B and capacitors 308, 353, 442A-B) of the switched rectifier 210, isolating transformer 320, rectification circuit 270, and the switched converter circuits 280A-B. The reduction in size of the passive components reduces the overall physical size of the switched mode power circuit 101. The increased switching frequency (and therefore smaller passive components) of the buck supply allow for better/faster modulation of the output, i.e., faster data rates for visual light communication (VLC). Moreover, if the at least two buck FETs 310I-J, 310K-L of the buck converters 410A-B include wide-bandgap FETs, the following additional advantages can be obtained.

Hard switching (not resonant) eases control requirements of the switched mode power circuit 101. The target frequency bands of the switched mode power circuit 101 may range from 300 kilohertz (kHz) to 30 megahertz (MHz), for example, which is ideal for size reduction and performance of FETs 308A-L and controls. The reduced size of the switched mode power circuit 101 results in high power density, reduces the size of passive components (e.eg, inductors, capacitors, transformers) and reduces parasitics with the passive components. For example, the switched converter circuit 280A can be less than 0.8 inches squared of board space and provide greater than 5,000 Watts of power per inch cubed. This allows for higher speed modulation of DC outputs, but may require more granular switching control. There are tradeoffs in reducing the size of components versus having a larger output current/voltage ripple. Large output voltage ripple can cause unintentional PWM of the light source 11 (e.g., LED) due to the forward voltage (Vf) requirements of LEDs or diodes in general. The layout considerations may be more stringent due to high derivative of the voltage (dv/dt) and derivative of the current (di/dt) in short periods of time. The electromagnetic interference (EMI), board layout of the switched mode power circuit 101, and shielding should be considered a factor in designing the switched mode power circuit 101, for example, unshielded inductor/transformers and other passive components are smaller, which decreases size of the board layout, but generates more radiated EMI.

FIG. 5A depicts a first design of a bridgeless totempole 301 of the switched rectifier 210. Analog readings 214A-C from the first bridgeless totempole 301 (e.g., and a set of first control signal(s) 213 (e.g., PWM signals 310A-D) for the first bridgeless totempole 301 are shown. In some examples, an analog reading 214D of the high voltage DC signal 216 of the HVDC bus 313 can also be taken from the switched rectifier 210 for operation of the bridgeless totempole 301. This analog reading 214D is separately labeled with reference numeral 234A when taken from the switched bridge circuit 230. First bridgeless totempole 301 of FIG. 5A includes at least four totempole FETs 308A-D, where the two additional FETs 308C-D are for active rectification of the AC input signal 212, which is further shown in FIG. 5A. Although not shown in FIGS. 5A-B, analog reading 234A of the high voltage DC signal 216 on the HVDC bus 313 may be utilized to control operation of the switched rectifier 210 (e.g., bridgeless totempole 301, 501).

Figure 6A:
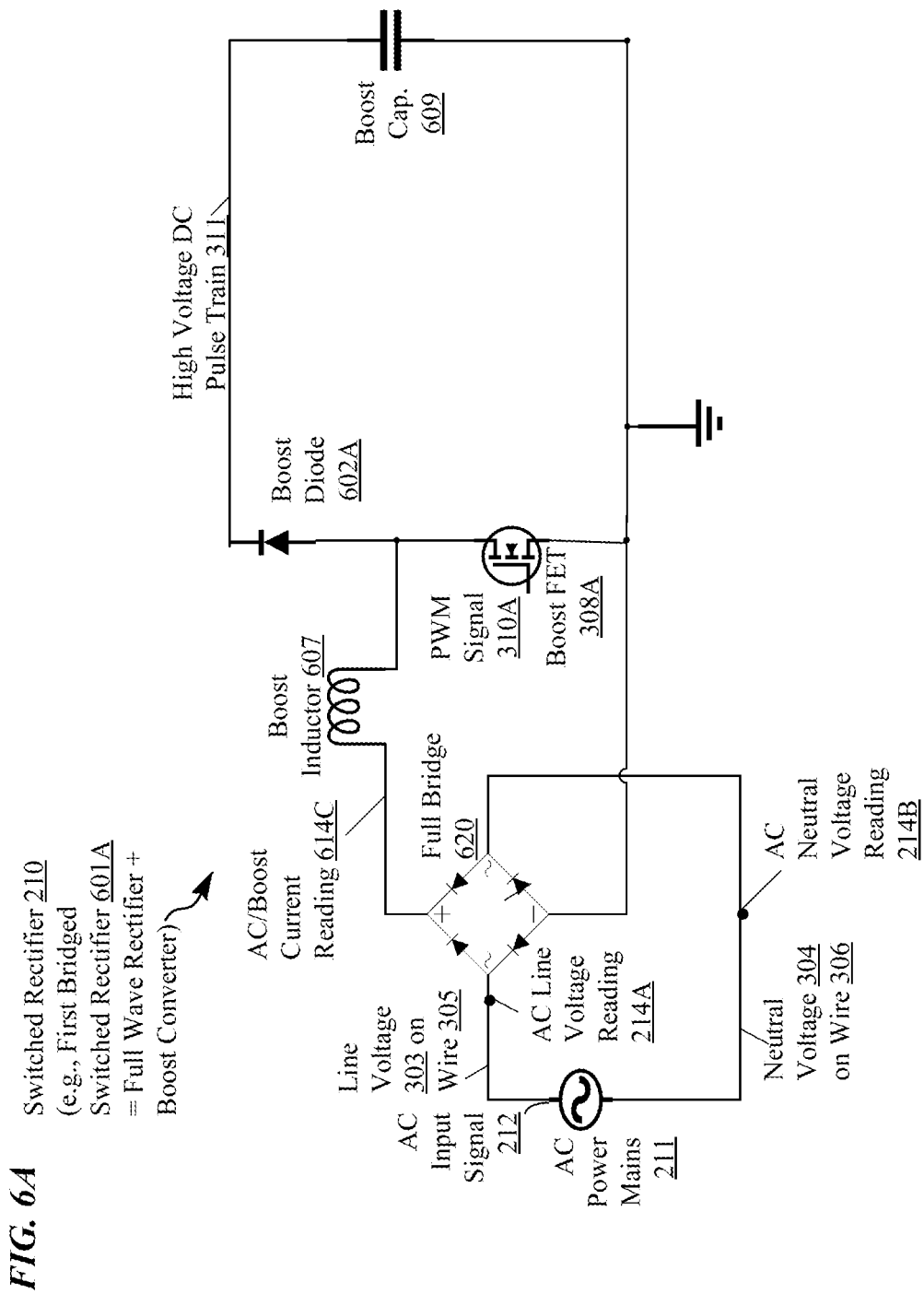
FIG. 6A depicts a first bridged switched rectifier design of the switched rectifier.
Figure 6B:
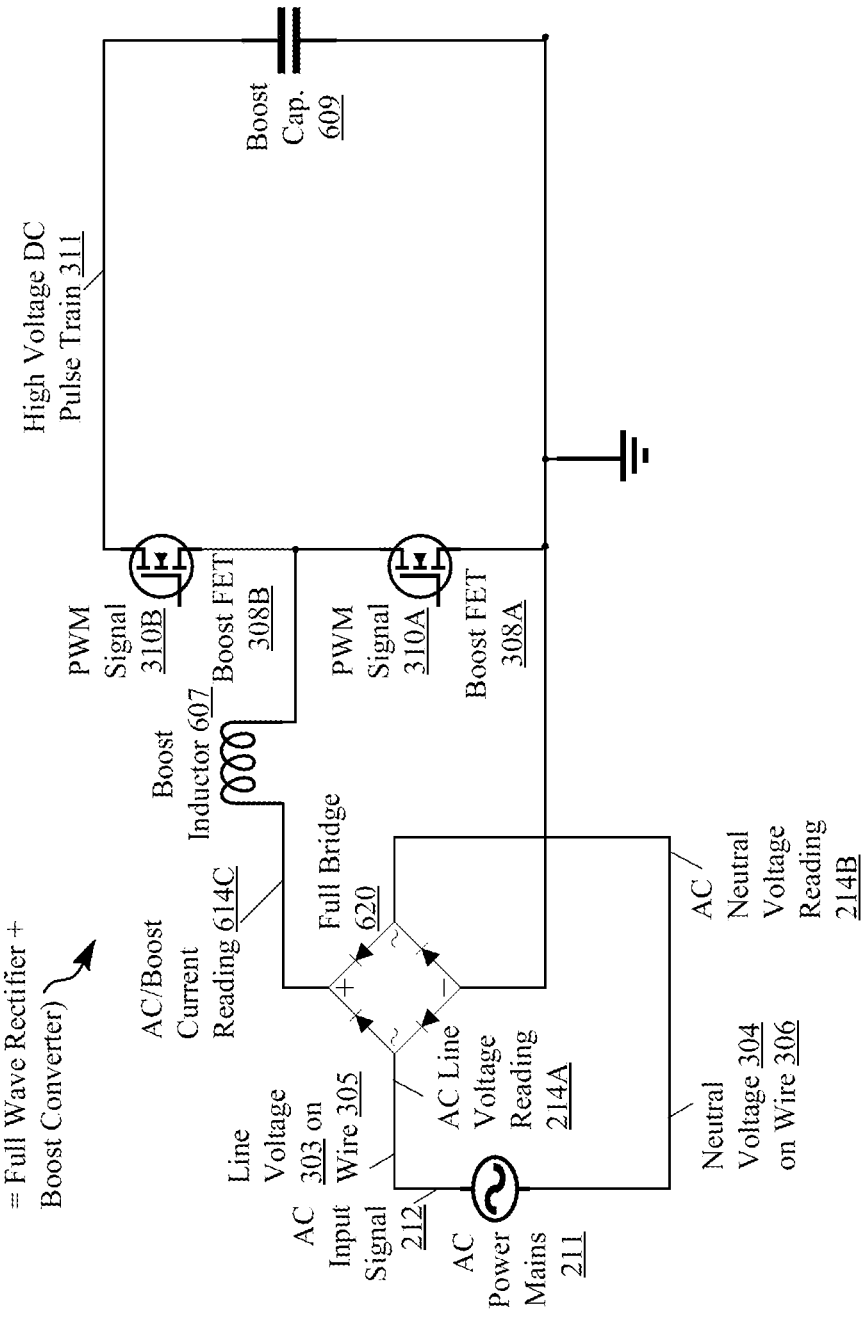
FIG. 6B depicts a second bridged switched rectifier design of the switched rectifier.

In FIGS. 5A-B and 6A-B, analog reading(s) 214 from the switched rectifier 210 include an AC line voltage reading 214A of the AC line voltage 303 on the AC line voltage wire 305. Analog reading(s) 214 from the switched rectifier 210 further include an AC neutral reading 214B of the AC neutral voltage 304 on the AC neutral voltage wire 305. In FIGS. 5A-B, analog reading(s) 214 from the switched rectifier 210 can further include an AC/totempole current reading 214C of the totempole inductor 307. In FIGS. 6A-B, analog reading(s) 214 from the switched rectifier 210 can further include an AC/boost current reading 614C of the boost inductor 607. In the example of FIG. 5A, the totempole FETs 308C-D of the bridgeless totempole 301 can include low speed synchronous FETs, although other types of FETs as described herein can be utilized. Synchronous FETs are low frequency FETs, for example, in the switched rectifier 210 that are switching at a relatively low speed frequency, such as 60 Hz. However, in other stages, synchronous FETs can be switched on the order kHz frequency depending on the implementation.

In FIG. 5A, the first control signal(s) 213 for the first bridgeless totempole 301 design of switched rectifier 210 include the totempole PWM signals 310A-D for respectively switching totempole FETs 308A-D to adjust a respective duty cycle. Specifically, totempole PWM signals 310A-D include: a totempole high side high frequency FET gate drive 310A for totempole FET 308A, totempole low side high frequency FET gate drive 310B for for totempole FET 308B, totempole high side low frequency FET gate drive 310C for totempole FET 308C, and totempole low side low frequency FET gate drive 310D for totempole FET 308D.

FIG. 5B depicts a second design of a bridgeless totempole 501 of the switched rectifier 210. Analog readings 214A-C from the second bridgeless totempole 501 and a set of first control signal(s) 213 (e.g., PWM signals 310A-B) for the second bridgeless totempole 501 are shown. Second bridgeless totempole 501 includes at least two diodes 502A-B, where the at least two diodes 502A-B are for passive rectification of the AC input signal 212. The two diodes 502A-B can be used in lieu of synchronous totempole FETs 308C-D of FIG. 5A, in which case the two diodes 502A-B passively allow current to flow in only one direction.

In the example of FIG. 5B, the totempole FETs 308A-B can include FETs like FIG. 5A, although other types of FETs as described herein can be utilized. However, the second bridgeless totempole 501 design of the switched rectifier 210 utilizes diodes 502A-B instead of the synchronous totempole FETs 308C-D. Compared to the first bridgeless totempole 301, the cons of the second bridgeless totempole 501 design is a loss of efficiency and ability to make the switched rectifier 210 bidirectional. However, the pros of the second bridgeless totempole 501 is lower cost and ease of control.

In FIG. 5B, the first control signal(s) 213 for the second bridgeless totempole 501 design of switched rectifier 210 include the totempole PWM signals 310A-B for respectively switching totempole FETs 308A-B to adjust a respective duty cycle. Specifically, totempole PWM signals 310A-B include: a totempole high side high frequency FET gate drive 310A for totempole FET 308A, and totempole low side high frequency FET gate drive 310B for totempole FET 308B. Totempole diodes 502A-B are passively controlled.

FIG. 6A depicts a first bridged switched rectifier 601A design of the switched rectifier 210. Analog readings 214A-C from the first bridged switched rectifier 601A and a set of first control signal(s) 213 (e.g., PWM signal 310A) for the first bridged switched rectifier 601A are further shown. Although not shown in FIGS. 6A-B, analog reading 234A of the high voltage DC signal 216 on the HVDC bus 313 may be utilized to control operation of the switched rectifier 601A-B. This first bridged switched rectifier 601A is different from the bridgeless totempole 301, 501 of FIGS. 5A-B because the first bridged switched rectifier 601A includes a diode full bridge 620. Switched rectifier 511 further includes a single boost diode 602A and a single boost FET 308A. The diode full bridge 620 is a full wave rectifier. The boost inductor 607 and boost capacitor 609 are a boost converter with the boost diode 602A.

In the example of FIG. 6A, the boost FET 308A can be a synchronous FET like FIG. 5A, although other types of FETs as described herein can be utilized. Compared to the bridgeless totempole 301, the cons of the first bridged switched rectifier 601A design is a loss of efficiency and ability to make the switched rectifier 210 bidirectional. However, the pros of the first bridged switched rectifier 601A is lower cost and ease of control.

In FIG. 6A, the first control signal(s) 213 for the first bridged switched rectifier 601A includes the boost PWM signal 310A for switching boost FET 308A to adjust a respective duty cycle. Specifically, totempole PWM signal 310A includes: a totempole low side high frequency FET gate drive 310A for boost FET 308A.

FIG. 6B depicts a second bridged switched rectifier 601B design of the switched rectifier 210; however, the addition to FIG. 6A is the high side synchronous FET 308B in lieu of boost diode 602A. Analog readings 214A-C from the second bridged switched rectifier 601B and a set of first control signal(s) 213 (e.g., PWM signals 310A-B) for the second bridged switched rectifier 601B are further shown. This second bridged switched rectifier 601B is different from the bridegeless totempole 301, 501 of FIGS. 5A-B because the second bridged switched rectifier 601B includes a diode full bridge 620. Switched rectifier 511 further includes two totempole FETs 308A-B. The diode full bridge 620 is a full wave rectifier. The boost inductor 607 and boost capacitor 609 are a boost converter with the boost FETs 308A-B.

In the example of FIG. 6B, the boost FETs 308A-B can include a synchronous FET like FIG. 5A, although other types of FETs as described herein can be utilized. Compared to the first bridgeless totempole 301, the cons of the second bridged switched rectifier 601B design is a loss of efficiency and ability to make the switched rectifier 210 bidirectional. However, the pros of the second bridged switched rectifier 601B is lower cost and ease of control. Compared to first bridged switched rectifier 601A of FIG. 6A, the second bridged switched rectifier 601B of FIG. 6B has an improvement in efficiency but is still less efficient than the bridgeless totempole 301 of FIG. 5A and the bridgeless totempole 501 of FIG. 5B.

In FIG. 6B, the first control signal(s) 213 for the second bridged switched rectifier 601B include the boost PWM signals 310A-B for respectively switching boost FETs 308A-B to adjust a respective duty cycle. Specifically, boost PWM signals 310A-B include: a totempole low side high frequency FET gate drive 310A for boost FET 308A, and totempole high side high frequency FET gate drive 310B for boost FET 308B.

FIG. 7A depicts an isolated full-bridge 700A design like that of FIGS. 3-4 formed of the switched bridge circuit 230, isolation barrier 240, and rectification circuit 270. Isolated full-bridge 700A includes the switched bridge circuit 230 with the full bridge 334, isolation barrier 240, and rectification circuit 270. The isolated full-bridge 700A provides isolation between the AC input signal 212 of the AC power mains 211 and respective second low voltage DC power signal 281-B to respective electrical load 290A-B (e.g., NEC class 2 output devices). The isolated full-bridge 700A also minimizes voltage strain on the FETs 308A-L and is better suited for high frequency switching, particularly, if the FETs 308A-L are wide-bandgap FETs (e.g., GaN based). Compared to the isolated half bridge 700B of FIG. 7B and the flyback converter 800 of FIG. 8, the isolated full-bridge 700A has the highest efficiency and control capability. The isolated full-bridge 700A also allows bidirectionality with the substitution of rectification FETs 308M-N in lieu of rectification diodes 351A-B as shown in FIG. 7C.

In FIGS. 7A-C and 8, analog readings 234 (not shown) from the switched bridge circuit 230, including HVDC signal 216 and high voltage bidirectional pulse train signal 217, and a set of second control signal(s) 233 (e.g., PWM signals 310E-H respectively) for the switched bridge circuit 230 are shown. Also shown in FIGS. 7A-B are analog readings 274 from the rectification circuit 270, including of the low voltage bidirectional pulse train signal 220, rectified pulse train signal 271, and first low voltage DC power signal 275.

FIG. 7B depicts an isolated half bridge 700B design formed of the switched bridge circuit 230, isolation barrier 240, and rectification circuit 270. Isolated half bridge 700B includes the switched bridge circuit 230 with just the first half bridge 332 (without the second half bridge 333), isolation barrier 240, and rectification circuit 270. As shown in FIG. 7B, the switched bridge circuit 230 of the isolated half bridge 700B further include two capacitors 702A-B that are used in lieu of bridge FETs 308G-H. As further shown in FIG. 7B, a second center point 714 of the two capacitors 702A-B is connected to the primary side 319 of the isolating transformer 320. In this case, the capacitors 702A-B provide a fixed voltage of ½*HVDC to the second center point 714. The isolated half bridge 700B still provides a high voltage bidirectional square wave, just with half the amplitude of the isolated full bridge 700A.

FIG. 7C depicts and isolated full-bridge 700C like that of FIG. 7A, but also allows bidirectionality by replacing rectification diodes 351A-B with rectification FETs 310M-N. In the example of FIG. 7C, the sixth control signal(s) 373 include PWM signals 310M-N to drive the rectification FETs 308M-N. The PWM signals 310M-N from the control block 103 are for respectively switching the totempole FETs 308M-N to adjust a respective duty cycle.

Isolated half bridge 700B provides isolation between the AC input signal 212 of the AC power mains 211 and respective second low voltage DC power signal 281-B to respective electrical load 290A-B (e.g., NEC class 2 output devices). Compared to the isolated full-bridge 700A of FIG. 7A, the isolated half bridge 700B is less expensive, but has a reduced amount of control. Because the bridge FETSs 308G-H are replaced with capacitors 702A-B, the isolated half bridge 700B does not enable bidirectionality.

Figure 8:
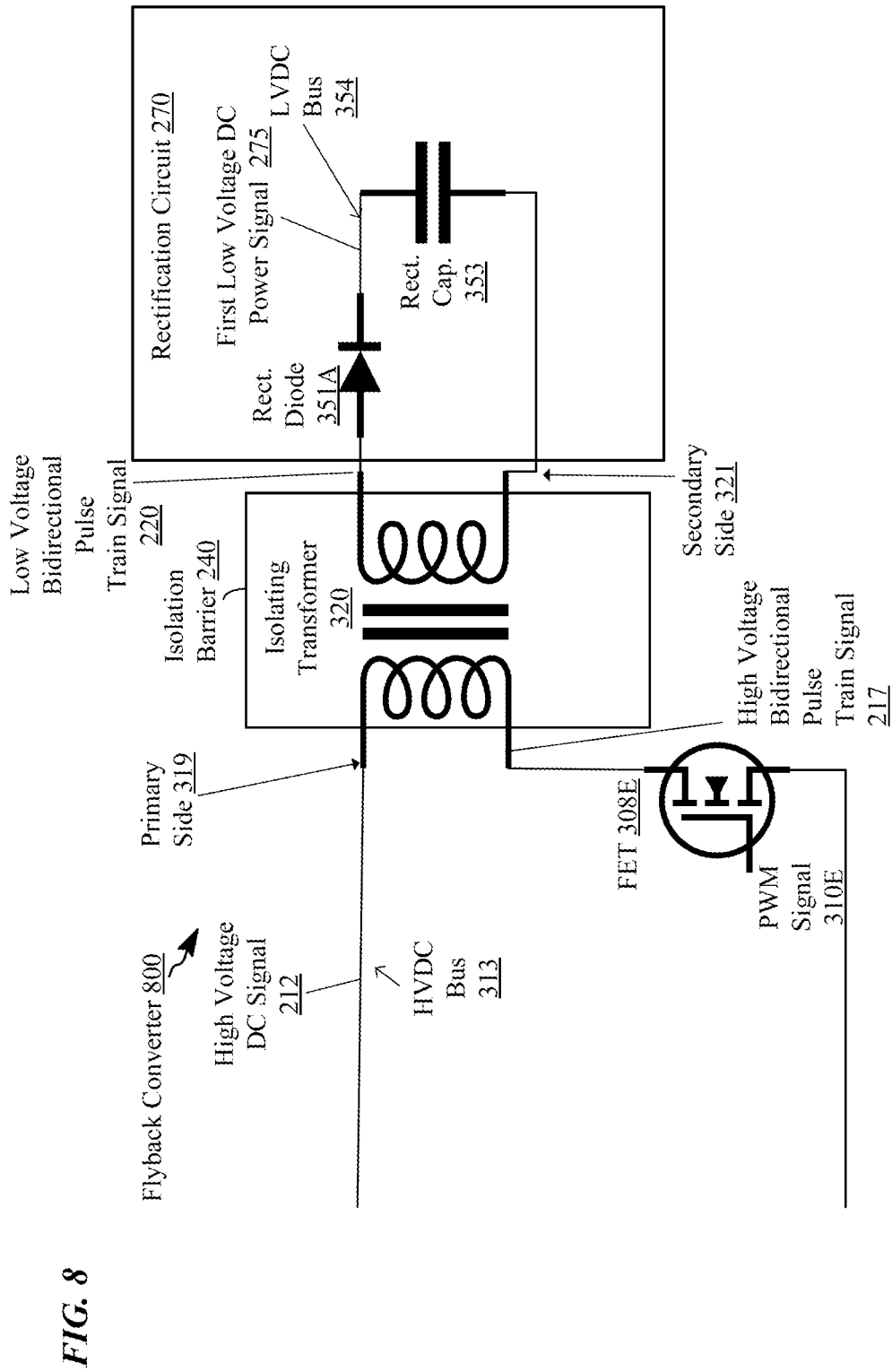
FIG. 8 depicts a flyback converter design formed of the switched bridge circuit, isolation barrier, and rectification circuit.

FIG. 8 depicts a flyback converter 800 design that is an alternative to the switched bridge circuit 230. Flyback converter 800 includes the isolation barrier 240 and rectification circuit 270. As shown in FIG. 8, the flyback converter 800 includes a single FET 308E. FET 308E is connected to the primary side 319 of the isolating transformer 320. Rectification circuit 270 can include a single rectification diode 351A and a rectification capacitor 353.

Flyback converter 800 provides isolation between the AC input signal 212 of the AC power mains 211 and respective second low voltage DC power signal 281-B to respective electrical load 290A-B (e.g., NEC class 2 output devices). Compared to the isolated full-bridge 700A of FIG. 7A and isolated half bridge 700B of FIG. 7B, the flyback converter 800 is the least expensive with the lowest part count and cost, but has the lowest efficiency. Flyback converter 800 is not bidirectional.

Figure 9A:
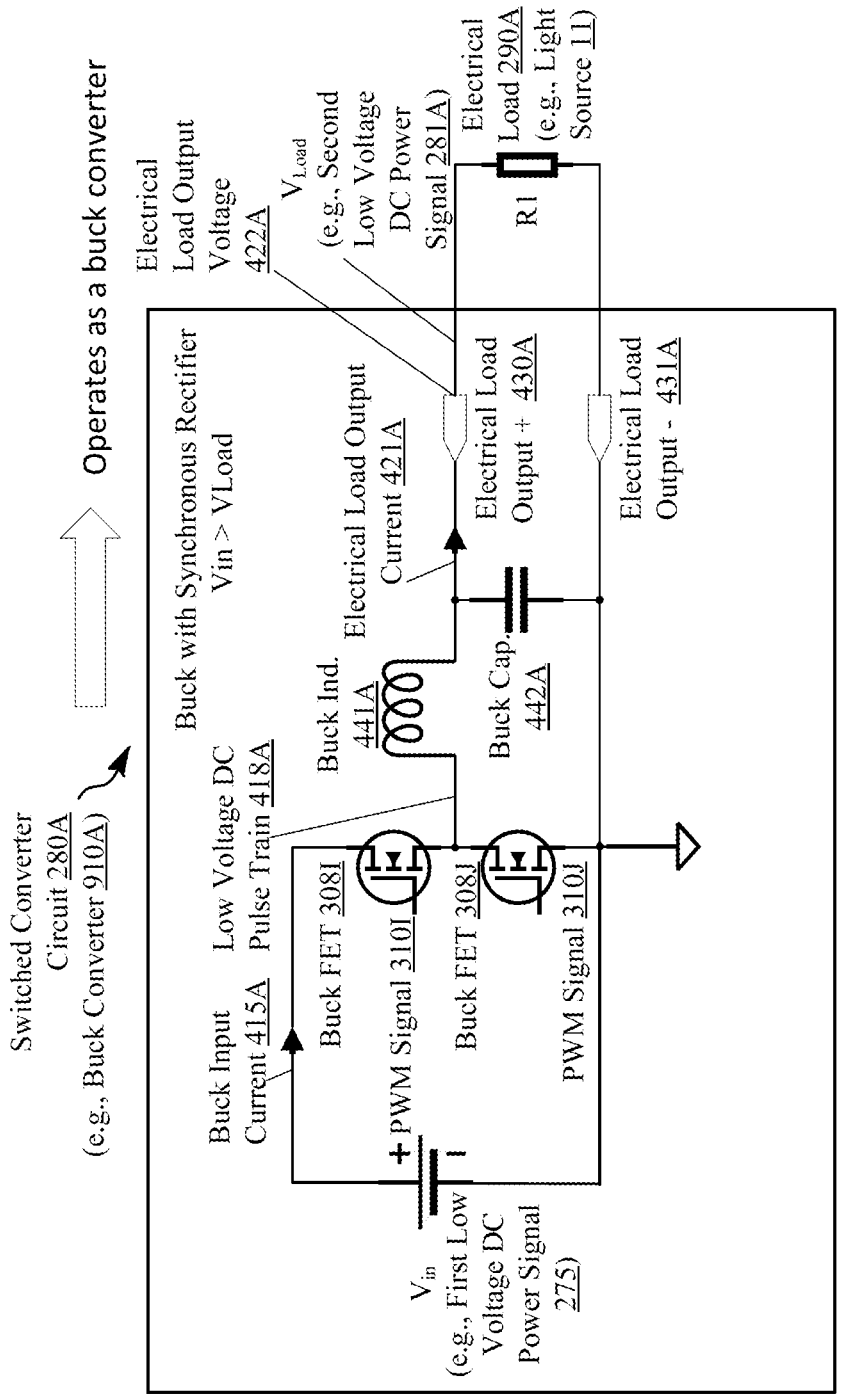
FIGS. 9A-B illustrate the bidirectional converter architecture of the switched converter circuit (e.g., a buck converter in FIG. 9A and a boost converter in FIG. 9B).
Figure 9B:
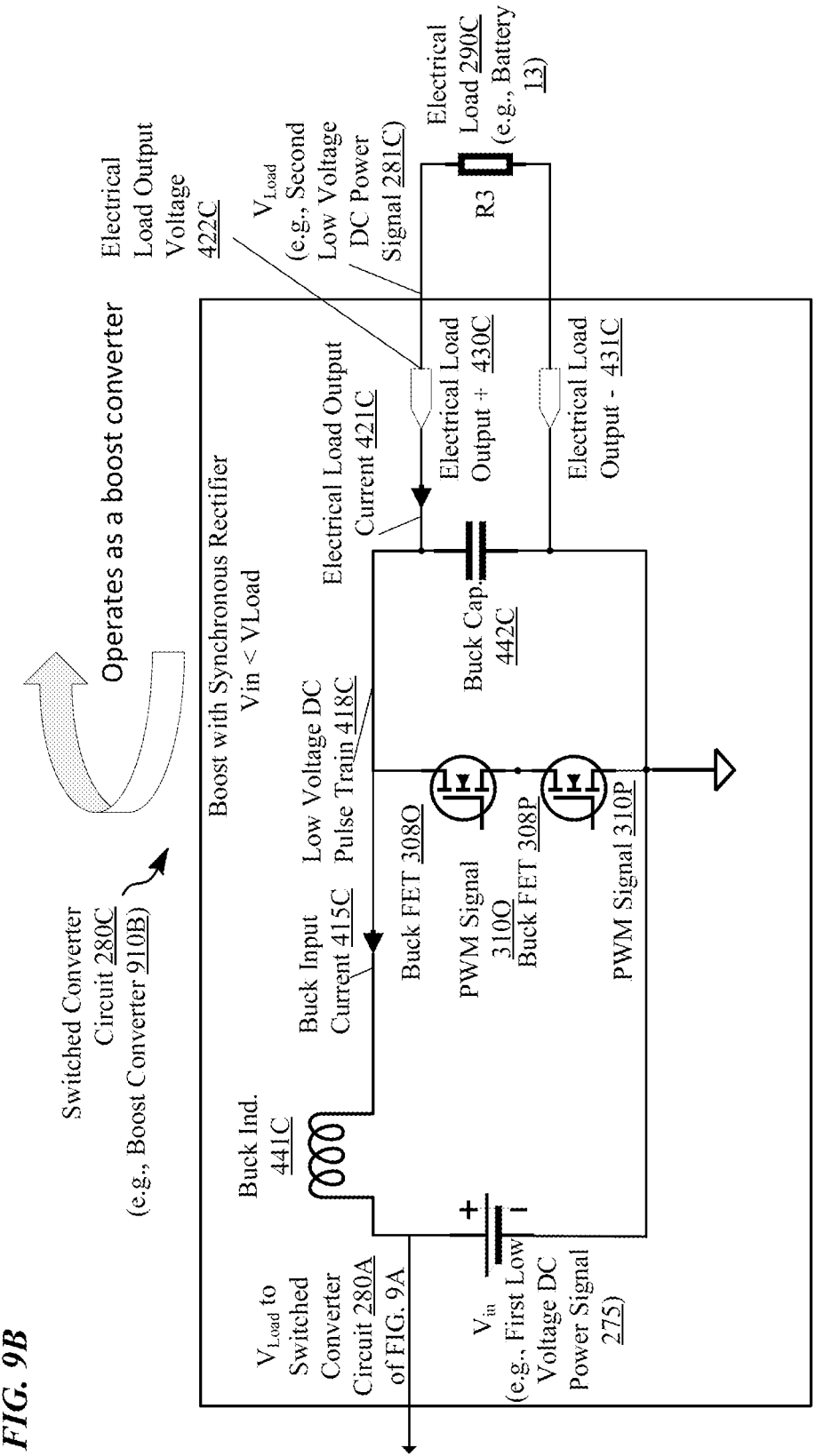

FIGS. 9A-B illustrate the bidirectional converter architecture of the switched converter circuit 280A and switched converter circuit 280C, respectively. Although the switched converter circuit 280A is a bidirectional converter, the switched converter circuit 280A can be a buck converter as in FIG. 9A and in the reverse direction the switched converter circuit 280C can be a boost converter as in FIG. 9B. In FIG. 9A, the switched converter circuit 280A behaves as a buck converter 910A with a synchronous rectifier when the voltage input ($V_{in}$) is greater than the load voltage ($V_{Load}$) of the light source 11. As shown, in FIG. 9B, the switched converter circuit 280C behaves as a boost converter 910B with a synchronous rectifier when the voltage input ($V_{in}$) is less than the load voltage ($V_{Load}$) of the battery 13. In the examples, the voltage input ($V_{in}$) is the first low voltage DC power signal 275 outputted from the rectification circuit 270. The load voltage ($V_{Load}$) is the second low voltage DC power signal 281A in FIG. 9A and the second low voltage DC power signal 281C in FIG. 9B.

As shown in FIG. 9B, the bidirectional converter (e.g., power source from a battery 13) is enabled by the low side buck FET 308P of the switched converter circuit 280C.

Switched converter circuit 280C is structurally similar to switched converter circuit 280A and includes buck FETs 3080-P controlled by respective PWM signals 3100-P. However, when sourcing power from the electrical load 290C (battery 13), the low side buck FET 308P controlled by PWM signal 310P becomes the primary switching element of a boost converter 910B as opposed to a buck converter 910A when $V_{in} < V_{Load}$ (of the battery 13). For example, this enables emergency lighting operation of the electrical load 290A, such as light source 11 (e.g., LEDs), controlled by the switched converter circuit 280A when the first low voltage DC power signal 275 is lower than the battery voltage ($V_{Load}$). In another example, the low side buck FET 308P can be replaced with a diode, but this prevents the boost converter 910B mode. The boost converter 910 includes buck FETs 3080-P, a buck inductor 441C, and a buck capacitor 442C. An electrical load output 421, shown as electrical load output voltage 422C and electrical load output current, is produced by the battery 13, as electrical load output voltage 1+ (positive) 430C and electrical load output voltage 2− (negative) 431C.

FIG. 10 illustrates a first control block 103A design of the multi-stage driver system 100. In FIG. 10, the control block 103 includes a high voltage region microcontroller 204A to control operations of the high voltage region 205, and a low voltage region microcontroller 204B to control operations of the low voltage region 260. The isolation barrier 240 includes a digital isolator 1005 to provide communication between the high voltage region microcontroller 204A and the low voltage region microcontroller 204B. The communication can be bidirectional between the low voltage region microcontroller 204B and the high voltage region microcontroller 204A. The communication can be unidirectional from the low voltage region microcontroller 204B to the high voltage region microcontroller 204A. The communication can be unidirectional from the high voltage region microcontroller 204A to the low voltage region microcontroller 204B. As shown in FIG. 10, there are two microcontrollers 204A-B, one on each side of the isolation barrier 240. The digital isolator 1005 includes a digital data interface (e.g., serial data interface, parallel data interface, level-shifted data interface, etc.) passed through. Data can be passed to the high voltage region microcontroller 204A from a communication module 1010 (e.g., network communication interface 15) via the low voltage region microcontroller 204B. Digital isolator 1005 can be a capacitive isolator, optical isolator, or any other suitable technology.

As shown, the high voltage region microcontroller 204A is coupled to the digital isolator 1005 via a high voltage region data bus 1001A for communication. Low voltage region microcontroller 204B is coupled to the digital isolator 1005 via a low voltage region data bus 1001B for communication. High voltage region microcontroller 204A and low voltage region microcontroller 204B include a respective I/O interface(s), a respective memory, a respective processor (CPU), and a respective serial port coupled to the digital isolator 1005 for communication over respective data bus 1001A-B. These components of the high voltage region microcontroller 204A and low voltage region microcontroller 204B are coupled by a system bus (e.g., connective wire(s)) linking all the components together. The respective I/O interface(s) include I/O peripherals, such as PWM modules (e.g., PWM generator circuits), analog peripherals, communication peripherals, analog-to-digital converters (ADCs) and digital-to-analog converters (DAC). Control signals 213, 233, 372, 283-B, such as PWM signals 310A-L, can be generated using the PWM module, DAC, and/or a general-purpose I/O interface (GPIO). In one example, ADCs may convert analog signals from the switched mode power circuit 101 into digital signals for the processor. DACs convert digital signals from the processor into analog signals for the switched mode power circuit 101. I/O peripherals are the interface for the respective processor of the high voltage region microcontroller 204A and the low voltage region microcontroller 204B to the high voltage region 205 and the low voltage region 260, respectively. ADCs can be a direct-conversion ADC, parallel comparator ADC, counter type ADC, servo tracking ADC, successive approximation ADC, integration ADC, delta-encoded ADC, pipelined ADC, etc. ADC (and other peripherals) can be a separate integrated chip from the high voltage region microcontroller 204A and the low voltage region microcontroller 204B that transfers the data to the high voltage region microcontroller 204A and the low voltage region microcontroller 204B via digital communications.

I/O interface(s) of the high voltage region microcontroller 204A receive analog reading(s) 214, 234 and send those analog reading(s) 214, 234 as digital data to the respective processor. The respective processor of the high voltage region microcontroller 204A sends the necessary first and second control signals 213, 233, for example, as digital instructions to the I/O interface(s), which are converted to the analog domain and applied to the high voltage region 205 of the switched mode power circuit 101. I/O interface(s) of the low voltage region microcontroller 204B receive analog reading(s) 284A-B and send those analog reading(s) 284A-B as binary data to the respective processor. The respective processor of the low voltage region microcontroller 204B sends the necessary third control signals 283A-B, for example, as digital instructions to the I/O interface(s), which are converted to the analog domain and applied to the low voltage region 205 of the switched mode power circuit 101.

More specifically, the ADCs of the respective I/O interface(s) for high voltage region microcontroller 204A convert an analog input signal (e.g., analog reading(s) 214, 234) through a mathematical function into a digital output signal (digital voltage or current value) for processing by the respective processor of the high voltage region microcontroller 204A. In the example of FIG. 10, the analog reading(s) 214 (e.g., voltage and current) from switched rectifier 210 include AC line voltage 214A, AC neutral voltage 214B, and AC/totempole inductor current 214C of totempole inductor 307. Analog reading(s) 234 (e.g., voltage) from switched bridge circuit 230 includes the HVDC bus 234A, which corresponds to the high voltage DC signal 216.

ADCs of the respective I/O interface(s) for the low voltage region microcontroller 204B convert an analog input signal (e.g., analog reading(s) 274, 284A-B) through a mathematical function into a digital output signal (digital voltage or current value) for processing by the respective processor of the low voltage region microcontroller 204B. In the example of FIG. 10, the analog reading(s) 274 (e.g., voltage) from rectification circuit 270 include the LVDC bus 274A, which corresponds to the first low voltage DC power signal 275. Analog readings 284A (e.g., voltage and current) from switched converter circuit 280A include buck input current 415A, electrical load output current 421A, electrical load output voltage 1+ (positive) 430A, and electrical load output voltage 2− (negative) 431A. Analog readings 284B (e.g., voltage and current) from switched converter circuit 280B include buck input current 415B, electrical load output current 421B, electrical load output voltage 1+ (positive) 430B, and electrical load output voltage 2− (negative) 431B.

In a first example, PWM module(s) (e.g., timing-based PWM generator circuits) of the control block 103 (e.g., in high voltage region microcontroller 204A or as a separate integrated chip) generates control signals 213, 233, such as PWM signals 310A-H. In a second example, DACs for high voltage region microcontroller 204A convert a digital input signal (e.g., first control signal 213 and second control signal 233) through a mathematical function into an analog output signal (e.g., PWM gate drive output) for the high voltage region 205. As noted above, the first control signal 213 and second control signal 233 are in response to processing of the analog reading(s) 214, 234 from the high voltage region 205 by the respective processor of the high voltage region microcontroller 204A. More specifically, the first control signal 213 (e.g., PWM gate drive outputs to switched rectifier 210) includes: totempole PWM signal 310A (e.g., high side high frequency FET gate drive), totempole PWM signal 310B (e.g., low side high frequency FET gate drive), totempole PWM signal 310C (e.g., high side low frequency FET gate drive), and totempole PWM signal 310D (e.g., low side low frequency FET gate drive). Second control signal 233 (PWM gate drive outputs to switched bridge circuit 230) includes: bridge PWM signal 310E (e.g., full bridge high side 337A FET gate drive), bridge PWM signal 310F (e.g., full bridge low side 336A FET gate drive), bridge PWM signal 310G (e.g., full bridge high side 337B FET gate drive), and bridge PWM signal 310H (e.g., full bridge low side 336B FET gate drive).

In a first example, PWM module(s) (timing-based PGM generator circuits) of the control block 103 (e.g., in low voltage region microcontroller 204B or as a separate integrated chip) generates control signals 273, 283-B, such as PWM signals 310I-N. In a second example, DACs for low voltage region microcontroller 204B convert a digital input signal (e.g., third control signal 283A-B) through a mathematical function into an analog output signal (e.g., PWM gate drive output) for the low voltage region 260. As noted above, the respective third control signals 283A-B are in response to processing of the respective analog reading(s) 284A-C from the low voltage region 260 by the respective processor of the low voltage region microcontroller 204B. More specifically, third control signal 283A (PWM gate drive outputs to switched converter circuit 280A) include buck PWM signal 310I (e.g., FET gate drive), buck PWM signal 310J (e.g., synchronous rectifier FET gate drive). Fourth control signal 283B (PWM gate drive outputs to switched converter circuit 280B) includes buck PWM signal 310K (e.g., FET gate drive) and buck PWM signal 310L (e.g., synchronous rectifier FET gate drive). Optional sixth control signal 273 may be generated if the rectification circuit 270 includes rectification FETs 310M-N in response to processing of the respective analog reading(s) 274 (e.g., LVDC bus 274A) from the low voltage region 260 by the respective processor of the low voltage region microcontroller 204B.

Following is an example of the utilizing the multi-stage driver system 100 to enable a respective light source 11 (e.g., of various electrical load(s) 290A-N) to be driven with different driver circuit protocols. Digital control settings (e.g. for a respective driver circuit protocol) are contained within the respective memory of the low voltage region microcontroller 204B that is coupled to the communication module 1010. Each driver circuit protocol results in a unique digital voltage value. For example, using a voltage lookup table stored in the respective memory of the low voltage region microcontroller 204B, the respective processor of the low voltage region microcontroller 204B determines an optimized second low voltage DC power signal 281A-N suitable for driving the respective light source 11 and adjusts respective PWM signals 310A-L for FETs 310A-L of the high voltage region 205 and the low voltage region 260. Where suitable, digital control settings (e.g. for a respective driver circuit protocol) can also be achieved by calculating values on the fly based on an algorithm or mathematical function.

FIG. 11 illustrates a second control block 103B design of the multi-stage driver system 100. Low voltage region microcontroller 204B receives the analog readings 274, 284A-B from the low voltage region 260 and processes the analog readings 274, 284A-B to produce the respective third control signals 283A-B for the respective switched converter circuits 280A-B in the same manner as FIG. 10.

The second control block 103B is similar to the first control block design; however, the high voltage region microcontroller 204A is replaced with just a high voltage region I/O interface 1105 (e.g., which includes ADC, DAC, etc.). High voltage region I/O interface 1105 converts the analog reading(s) 214 and 234 from the analog domain into the digital domain (e.g., via ADC) and passes the digitally converted reading(s) 1014, 1034 through the digital isolator 1005 for digital signal processing to the low voltage region microcontroller 204B.

High voltage region I/O interface 1105 is coupled to the digital isolator 1005 via a high voltage region data bus 1001A. The digitally converted reading(s) 1014, 1034 are communicated to the digital isolator 1005 from the high voltage region I/O interface 1105 over the high voltage region data bus 1001A. Low voltage region microcontroller 204B is coupled to the digital isolator 1005 via a low voltage region data bus 1001B to receive the digitally converted reading(s) 1014, 1034 of the high voltage region 205 through the high voltage region I/O interface 1105. In addition, the third control signal 283 for the low voltage region 260 is generated by the low voltage region microcontroller 204B (e.g., based on digitally converted reading(s) 1014, 1034).

As further shown, the first control signal 213 and second control signal 233 are generated by the low voltage region microcontroller 204B, for example, in response to the digitally converted reading(s) 1014, 1034, in a manner that is analogous to that described in FIG. 10. However, the first control signal 213 (e.g., PWM signals 310A-D) and second control signal 233 (e.g., PWM signals 310E-H) are then fed through a gate driver with integrated isolation 1110. The first and second signals 213, 233 produced by the gate driver 1110 are then applied to the totempole FETs 308A-D and bridge FETs 308E-F. Alternatively, first and second signals 213, 233 can be communicated to the digital isolator 1005 over the low voltage region data bus 1001B. Digital isolator 1005 can then communicate the first and second signals 213, 233 to the high voltage region I/O interface 1105 over the high voltage region data bus 1001A, which are converted from the digital domain to the analog domain by the high voltage region I/O interface 1105 (e.g., via DAC) and applied to the high voltage region 205.

In a reverse example of FIG. 11 (not shown), the low voltage region microcontroller 204B can be replaced with just a low voltage region I/O interface. Low voltage region I/O interface then converts the analog reading(s) 284A-B from the analog domain into the digital domain and passes the digitally converted readings through the digital isolator 1005 over the low voltage region data bus 1001B for digital signal processing to the high voltage region microcontroller 204A. High voltage region microcontroller generates the third control signal 283 and passes the third control signal 283 back for application to the low voltage region 260. High voltage region microcontroller 204A would also receive the analog readings 214, 234 from the high voltage region 260 to produce the first and second control signals 213, 233 in the same manner described in FIG. 10.

Figure 12A:
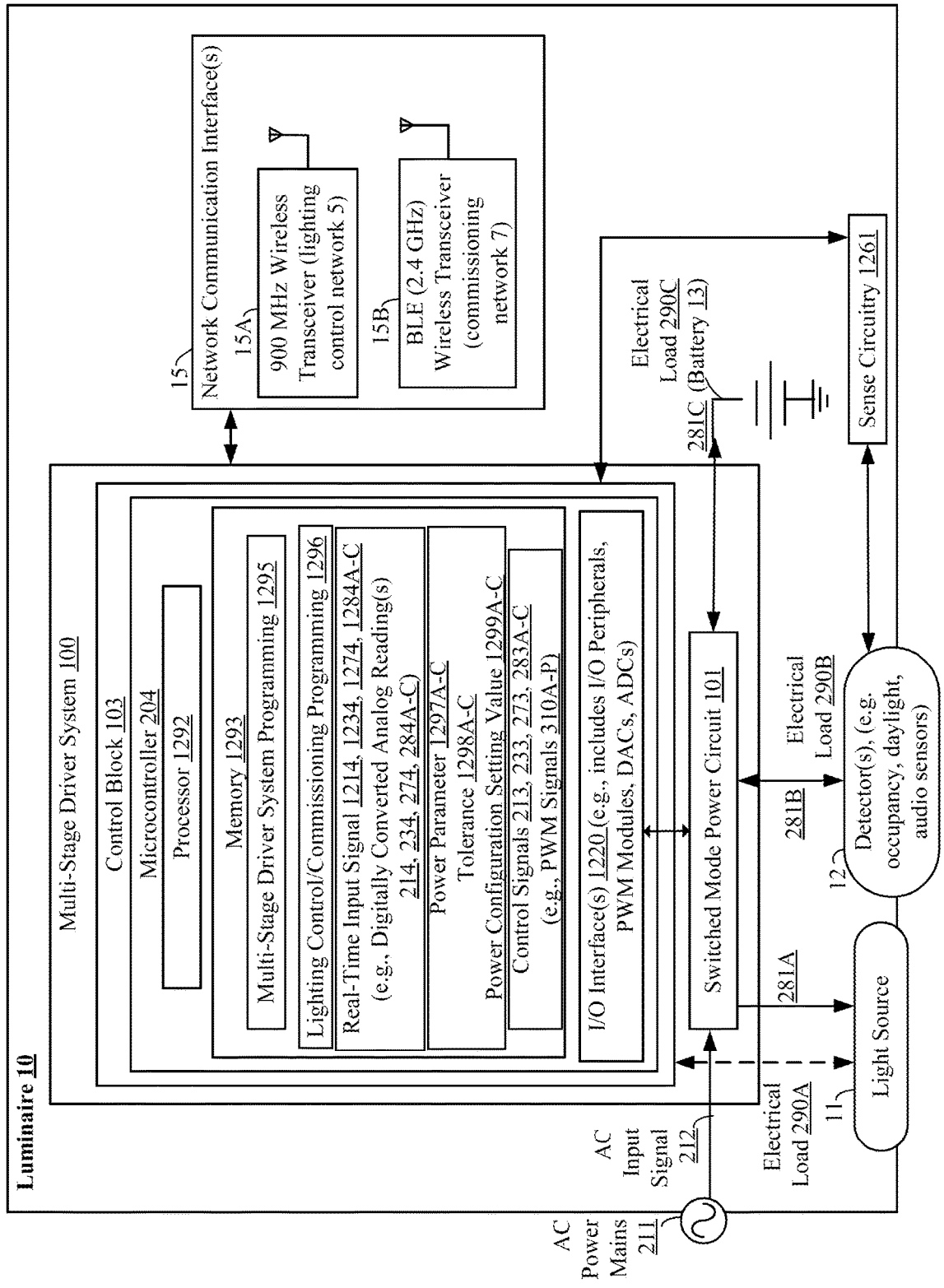
FIG. 12A is a block diagram of a luminaire that communicates via the lighting control system of FIGS. 1A-B and is supported by the multi-stage driver system to ensure compatibility with various types of electrical load(s), such as light source(s), detector(s), and a battery.

FIG. 12A is a block diagram of a luminaire 10 that communicates via the lighting control system of FIGS. 1A-B and is supported by the multi-stage driver system 100 to ensure compatibility with various types of electrical load(s) 290A-C, such as light source(s) 11, detector(s) 12, and a battery 13. Luminaire 10 can be an integrated light fixture that generally includes a multi-stage driver system 100 that is powered by a power source. Multi-stage driver system 100 receives power from the power source, such as the depicted AC power mains 211. In some examples, the power source may be a battery, solar panel, or any other AC or DC source. AC power mains 211 supplies power and ground voltages to the multi-stage driver system 100, which in turn powers the electrical load(s) 290A-C (e.g., light source 11, detector(s) 12, and battery 13), network communication interface(s) 15, etc. to provide reliable operation of the various circuitry of the luminaire 10. Battery 13 can be a power input in boost mode of the switched mode power circuit 101 by operating in a reverse direction for the emergency lighting application of the boost converter 910B of FIG. 9B to supply power to the light source 11 when the line power source (e.g., AC power mains 211) is unavailable.

As noted, multi-stage driver circuit system 100 converts an input power signal (e.g., AC input signal 212) into a respective second low voltage DC power signal 281A for driving the light source 11 and a respective second low voltage DC power signal 281B for driving the detector(s) 12. Multi-stage driver circuit system 100 stabilizes the output voltage and/or current to be unaffected by changes in the input voltage and loading. In the example, the multi-stage driver circuit system 100 connects to the AC power mains 211 to receive the AC input signal 212. The connection to the AC power mains 211 may be direct or indirect through intervening electrical components, so long as the switched mode power circuit 101 is electrically connected to the AC power mains 211. As shown, the control block 103 includes at least one microcontroller 204 or microcontroller unit (MCU), which is an on-board controller. A typical microcontroller includes a processor, memory and input/output (I/O) interface(s) on a single chip. Light source 11 is also coupled to the switched mode power circuit 101 to be driven by the switched mode power circuit 101 adjust a light source control setting. Detector(s) 12, such as occupancy, audio, or daylight sensors are connected to the switched mode power circuit 101 to be driven by the switched mode power circuit 101. In FIG. 12A, detector(s) 12 and sense circuitry 1261 and are on-board the luminaire 10. Sense circuitry 1261, such as application firmware, is operable to control detector(s) 12 and can drive the detector(s) 12, such as occupancy, audio, and photo sensor hardware. In some examples, the detector(s) 12 can include other types of optical-to-electrical transducer(s) 1451 as described in FIGS. 14-15, such as a photovoltaic cell. Thus, detector(s) 12 can be a power input in boost mode by operating in a reverse direction like the battery 13 for the emergency lighting application of the boost converter 910B of FIG. 9B.

Electrical load(s) 290A-C can communicate with the control block 103 via a separate link from the DC power line (e.g., second low voltage DC power signal 281A-C). However, the electrical load(s) 290A-C can also communicate back to the processor 1292 via the external/internal network communication interface(s) 15 back to the processor 1292. It is also feasible to provide communication support over the DC power line (e.g., second low voltage DC power signal 281A-B) from the switched mode power circuit 101 to the electrical load(s) 290A-B (e.g., light source 11 and/or detector(s) 12). For example, the switched mode power circuit 101 can provide a level-shifted voltage to the electrical load(s) 290A-B and in return the electrical load(s) 290A-B can level-shift current to the switched mode power circuit 101 for communication.

The microcontroller 204 may be one or several integrated circuits that incorporate a processor 1292 serving as the programmable central processing unit (CPU) of the microcontroller 204 as well as one or more memories, represented by memory 1293 (e.g., volatile or non-volatile). Control block 103 can include a field-programmable gate array (FPGA) and/or a digital signal processor (DSP) as an alternative or addition to the microcontroller 204. The memory 1293 is accessible to the processor 1292, and the memory or memories 1293 store executable programming for the CPU formed by processor 1292 as well as data for processing by or resulting from processing of the processor 1292. As shown, memory 1293 includes multi-stage driver system programming 1295 (which can be firmware) for configuring the switched mode power circuit 101 to provide a respective DC power signal 281A-B having at least one power parameter within a tolerance of a power configuration setting value of the electrical load(s) 290A-B (e.g., light source 11 or detector(s) 12). Alternatively or additionally to the microcontroller 204, the multi-stage driver system programming 1295 can be embodied in the FPGA and/or the DSP. Memory 1293 further includes lighting control/commissioning programming 1296 for both lighting control operations and commissioning, maintenance, and diagnostic operations of the lighting control system 1 of FIGS. 1A-B.

Memory 1293 like that shown in FIGS. 12-15 are for storing data and programming. In the example, the main memory 1293 may be a memory system include a flash memory (non-volatile or persistent storage) and a random access memory (RAM) (volatile storage). The RAM serves as short term storage for instructions and data being handled by the processor 1292, e.g., as a working data processing memory. The flash memory typically provides longer term storage.

Of course, other storage devices or configurations may be added to or substituted for those in the example. Such other storage devices may be implemented using any type of storage medium having computer or processor readable instructions or programming stored therein and may include, for example, any or all of the tangible memory of the computers, processors or the like, or associated modules.

Figure 12B:
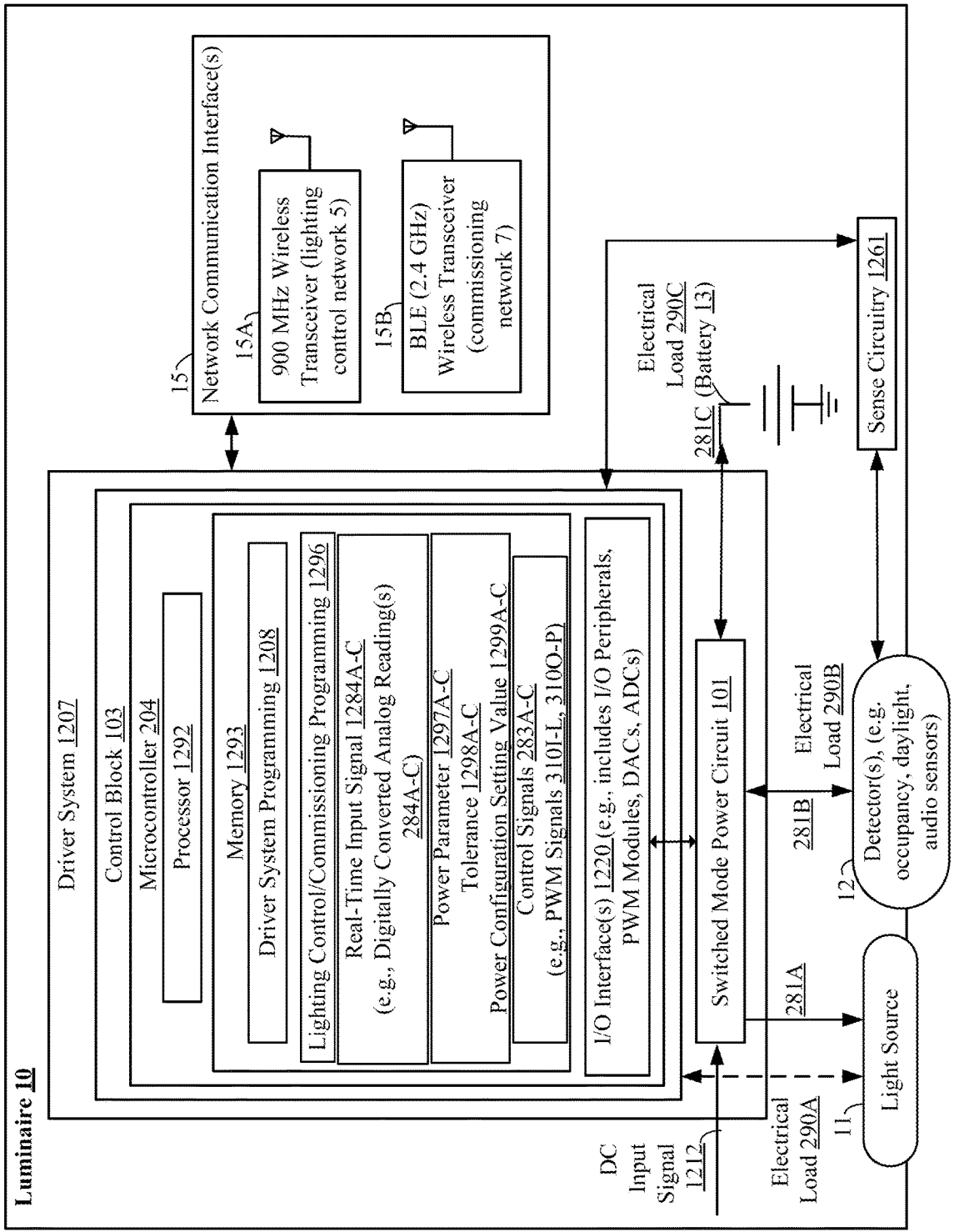
FIG. 12B is a block diagram of a luminaire supported by a driver system for a DC-DC converter application to ensure compatibility with various types of electrical load(s), such as light source(s), detector(s), and a battery.
Figure 13A:
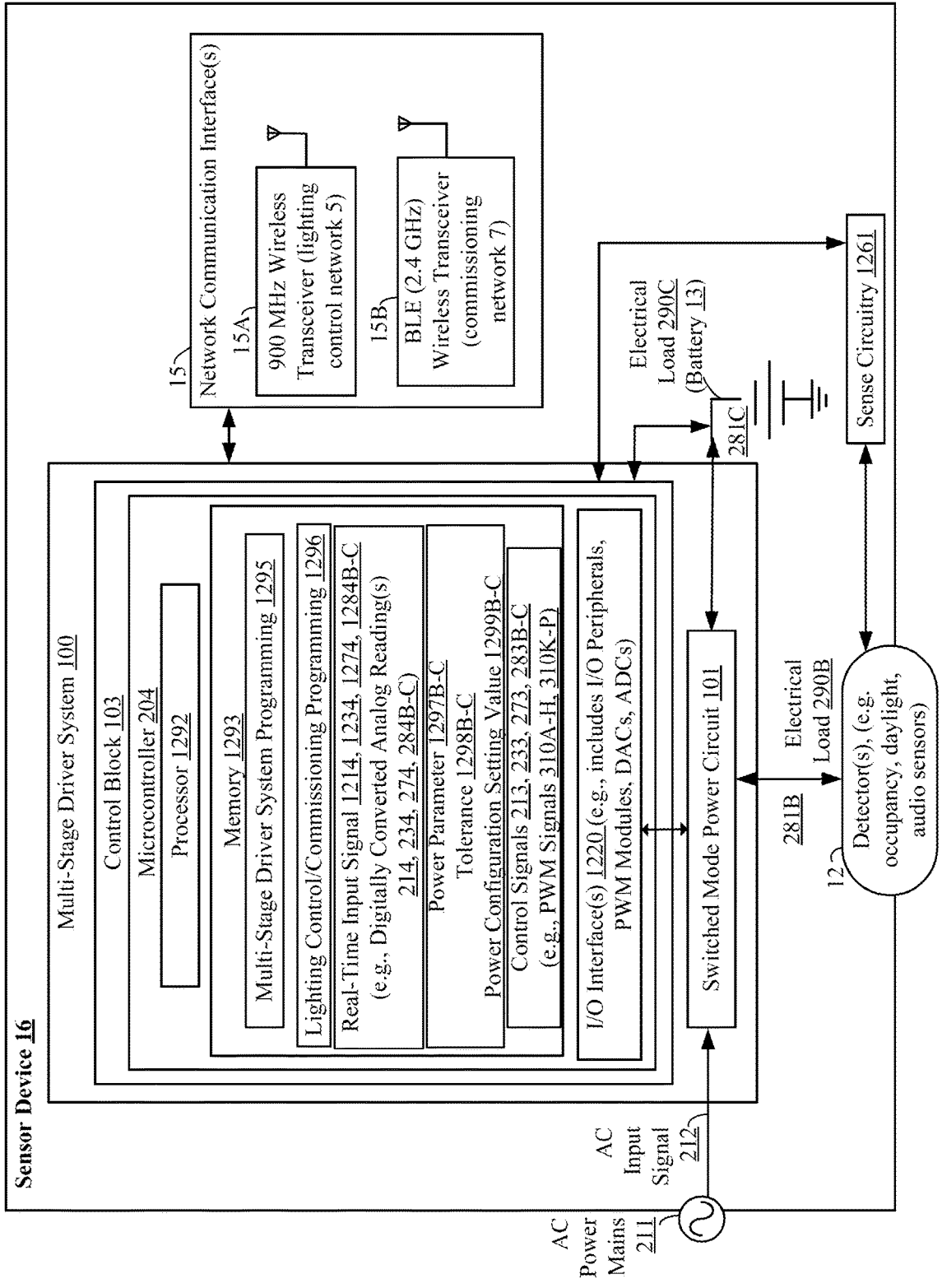
FIG. 13A is a block diagram of a standalone sensor device that communicates via the lighting control system of FIGS. 1A-B and is supported by the multi-stage driver system to ensure compatibility with various types of electrical load(s), such as detector(s) and a battery.
Figure 13B:
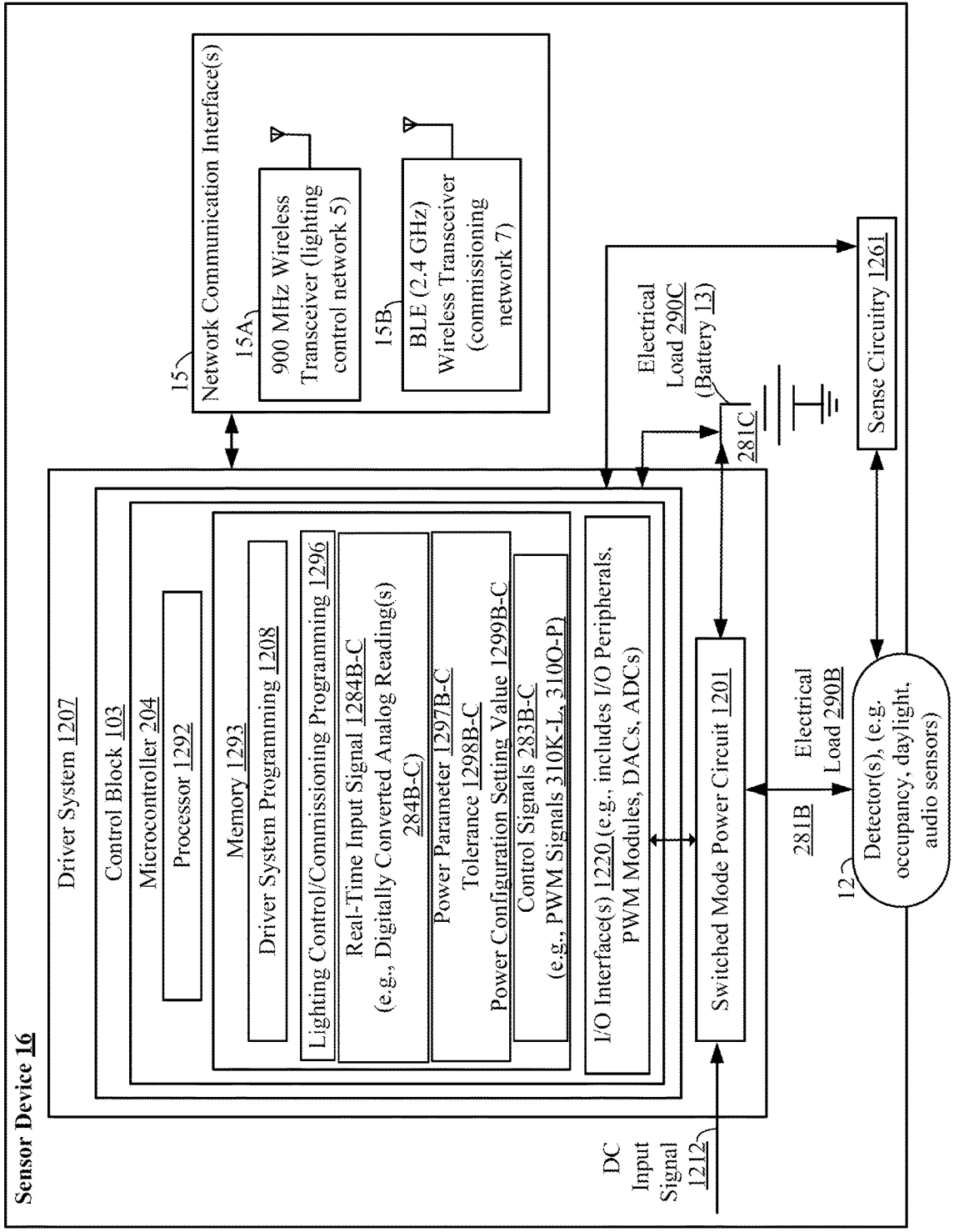
FIG. 13B is a block diagram of a standalone sensor device supported by a driver system for a DC-DC converter application to ensure compatibility with various types of electrical load(s), such as detector(s) and a battery.

The instructions, programming, or application(s) may be firmware or software used to implement any other device functions associated with the multi-stage driver system 100, including the luminaire 10 of FIGS. 12A-B and sensor device 16 of FIGS. 13A-B. Program aspects of the technology may be thought of as "products" or "articles of manufacture" typically in the form of executable code or process instructions and/or associated data that is stored on or embodied in a type of machine or processor readable medium (e.g., transitory or non-transitory), such as memory 1293, or a memory of a computer used to download or otherwise install such programming into the control block 103 of the multi-stage driver system 100, or a transportable storage device or a communications medium for carrying program for installation in the multi-stage driver system 100.

The microcontroller 204 may be thought of as a small computer or computer like device formed on a single chip for digital signal processing. Such devices are often used as the configurable control elements embedded in special purpose devices rather than in a computer or other general purpose device. A variety of available MCU chips, for example, may be used as the microcontroller 204.

The microcontroller 204 in this example also includes I/O interface(s) 1220, which includes I/O peripherals, such as, PWM modules, digital-to-analog converter(s) (DACs), and analog-to-digital converter(s) (ADCs). Most, if not all, of the I/O interface(s) 1220 can be implemented as separate integrated chips that digitally communicate to the processor 1292. I/O interfaces 1220 are coupled to both a high voltage region 205 and a low voltage region 260 of the switched module power circuit 101. I/O interface(s) 1220 receive at least one real-time input signal, such as analog readings (e.g., voltage or current) 214, 234, 274, 284A-C, from a high voltage region 205 or a low voltage region 260 of the switched mode power circuit 101 and to provide at least one control signal 213, 233, 283A-C to the high voltage region 205 or the low voltage region 260. I/O interface(s) 1220, for example, convey analog readings (e.g., voltage or current) 214, 234, 274, 284A-C fed from the high voltage region 205 and the low voltage region 260 of the switched mode power circuit 101 and produce a digital voltage or current value that is supplied to the processor 1292 of microcontroller 204 for processing. I/O interface(s) 1220 also convey at least one control signal, such as driver control signals 213, 233, 283 (e.g., PWM signals 310A-L) back to the high voltage region 205 and the low voltage region 260, respectively.

Detector(s) 12 include an in-fixture daylight sensor, an occupancy sensor, an audio sensor, a temperature sensor, or other environmental sensor. Detector(s) 12 may be based on Acuity Brands Lighting's commercially available xPoint® Wireless ES7 product. Lighting control/commissioning programming 1296, such as application firmware, drives the in-fixture occupancy, audio, and photo sensor hardware. Changes to light a source control setting of the light source 11 and communications in the lighting control network 5 occur when lighting control/commissioning programming 1296 of luminaire 10 detects state changes in the detector(s) 12, such as occupancy, daylight, and audio sensors.

As shown, luminaire 10 includes a light source 11 and the switched mode power circuit 101 is coupled to the light source 11 and is configured to control light source 11 operation via the switched mode power circuit 101 based on the light source control setting and within with a tolerance of a power configuration setting value of the light source 11 and detector(s) 12. Multi-stage driver system programming 1295 configures the switched mode power circuit 101 to provide a respective low voltage DC power signal 281A-C having at least one power parameter 1297A-C within a tolerance 1298A-C of a power configuration setting value 1299A-C of the electrical load 290A-C (e.g., light source 11, detector(s) 12, and battery 13). Multi-stage driver system programming 1295 responds to the at least one real-time input signal 1214, 1234, 1274, 1284A-C, which can be digitally converted analog readings (e.g., voltage or current) 214, 234, 274, 284A-C, from the high voltage region 205 or the low voltage region 260 to adjust operation of the high voltage region 205 or the low voltage region 260 via the at least one driver control signal 213, 233, 273, 283, such as PWM signals 310A-P.

In the example of FIG. 12A, a multi-stage driver system 100 includes a switched mode power circuit 101 for providing a direct current (DC) power signal to an electrical load 290A-C. The switched mode power circuit 101 provides a second low voltage DC power signal 281A to electrical load 290A (light source 11). Switched mode power circuit 101 provides a second low voltage DC power signal 281B to electrical load 290B (detector(s) 12). Switched mode power circuit 101 provides a second low voltage DC power signal 281C to electrical load 290C (battery 13). The switched mode power circuit 101 includes a high voltage region 205, a low voltage region 260, and an isolation barrier 240 coupled between the high voltage region 205 and the low voltage region 260.

Multi-stage driver system 100 includes a control block 103 coupled to control operations of the switched mode power circuit 101. The control block 103 includes at least one microcontroller 204 having a processor 1292, a memory 1293, and interfaces 1220 coupled to the high voltage region 205 and the low voltage region 260. The interfaces 1220 are coupled to receive at least one real-time input signal 1214, 1234, 1274, 1284A-C from the high voltage region 205 or the low voltage region 260 and to provide at least one control signal 213, 233, 273, 283A-C to the high voltage region 205 or the low voltage region 260. The at least one control signal 213, 233, 273, 283A-C can include PWM signals 310A-P to control respective FETs 308-P. As shown in FIG. 12A, the real-time input signals 1214, 1234, 1274, 1284-C are digitally converted from the respective analog reading(s) 214, 234, 274, 284A-C taken from the switched mode power circuit 101.

The at least one microcontroller 204 includes multi-stage driver system programming 1295 stored in the memory 1293 for execution by the processor 1292. Execution of the multi-stage driver system programming 1295 by the processor 1292 configures the multi-stage driver system 100 to implement the following functions, including functions to control operation of the high voltage region 205 or the low voltage region 260. First, the multi-stage driver system 100 configures the switched mode power circuit 101 to provide the DC power signal 281A-C having at least one power parameter 1297A-C within a tolerance 1298A-C of a power configuration setting value 1299A-C of the electrical load 290A-C. Second, the multi-stage driver system 100 responds to the at least one real-time input signal 1214, 1234, 1274, 1284A-C from the high voltage region 205 or the low voltage region 260 to adjust operation of the high voltage region 205 or the low voltage region 260 via the at least one control signal 213, 233, 273, 283A-C.

In a first example of adjusting operation, the interfaces 1220 are coupled to receive the at least one real-time input signal 1214, 1234 from the high voltage region 205. Execution of the multi-stage driver system programming 1295 by the processor 1292 configures the multi-stage driver system 100 to implement functions, including functions to control operation of the high voltage region 205 to respond to the at least one real-time input signal 1214, 1234 from the high voltage region 205 to adjust operation of the high voltage region 205 via the at least one control signal 213, 233, 273, 283A-C.

In a second example of adjusting operation, the interfaces 1220 are coupled to receive the at least one real-time input signal 1274, 1284A-C from the low voltage region 260. Execution of the multi-stage driver system programming 1295 by the processor 1292 configures the multi-stage driver system 100 to implement functions, including functions to control operation of the high voltage region 205 to respond to the at least one real-time input signal 1274, 1284A-C from the low voltage region 260 to adjust operation of the high voltage region 205 via the at least one control signal 213, 233, 273, 283A-C. In the first and second examples, first control signal 213 of the switched rectifier 210 and second control signal 233 of the switched bridge circuit 230 can adjust operation of the high voltage region 205.

In a third example of adjusting operation, the interfaces 1220 are coupled to receive the at least one real-time input signal 1214, 1234 from the high voltage region 205. Execution of the multi-stage driver system programming 1295 by the processor 1292 configures the multi-stage driver system 100 to implement functions, including functions to control operation of the low voltage region 260 to respond to the at least one real-time input signal 1214, 1234 from the high voltage region 205 to adjust operation of the low voltage region 260 via the at least one control signal 213, 233, 273, 283A-C.

In a fourth example of adjusting operation, the interfaces 1220 are coupled to receive the at least one real-time input signal 1274, 1284A-C from the low voltage region 260. Execution of the multi-stage driver system programming 1295 by the processor 1292 configures the multi-stage driver system 100 to implement functions, including functions to control operation of the low voltage region 260 to respond to the at least one real-time input signal 1274, 1284A-C from the low voltage region 260 to adjust operation of the low voltage region 260 via the at least one control signal 213, 233, 273, 283A-C. In the third and fourth examples, first control signal 213 of the switched rectifier 210 and second control signal 233 of the switched bridge circuit 230 can adjust operation of the low voltage region 260 because the adjustments to the high voltage region 205 are propagated downstream to the low voltage region 260. Moreover, sixth control signal 273 of rectification circuit 270 and the third, fourth, and fifth control signals 283A-C of respective switched converter circuits 280-C can adjust operation of the low voltage region 260.

The at least one power parameter 1297A-C or the power configuration setting value 1299A-C corresponds to at least one of a voltage (V), a current (amperes), a constant voltage configuration, a constant current configuration, or a modulation scheme of the high voltage region 205 or the low voltage region 260. The tolerance 1298-C means that the at least one power parameter 1297A-C need not be absolutely the same as the power configuration setting value 1299A-C, just kept within some suitable range ±5% or ±10% of the power configuration setting value 1299A-C. For example, in the case of the luminaire 10, the power configuration setting value 1299A for the power parameter 1297A is a value suitable for driving the light source 11 (e.g., LED) of the luminaire 10. The power configuration setting value 1299C for the power parameter 1297C is a value suitable for driving the battery 13 of the luminaire 10.

The function to respond to the at least one real-time input signal 1214, 1234, 1274, 1284A-C from the high voltage region 205 or the low voltage region 260 to adjust operation of the high voltage region 205 or the low voltage region 260 via the at least one control signal 213, 233, 273, 283A-C includes: optimizing performance of the switched mode power circuit 101 while maintaining the at least one power parameter 1297A-C of the DC power signal 281A-C within the tolerance 1298A-C of the power configuration setting value 1299A-C of the electrical load 290A-C.

In a first example of optimizing performance, the at least one real-time input signal 1214 includes a reading of an AC input signal 212. The at least one control signal 213, 233, 273, 283A-C includes a pulse width modulation (PWM) gate drive output 310A-P. The function of optimizing performance of the switched mode power circuit 101 while maintaining the at least one power parameter 1297A-C of the DC power signal (e.g., second low voltage DC power signal 281A-C) within the tolerance 1298A-C of the power configuration setting value 1299A-C of the electrical load 290A-C includes: based on the AC input signal 212 reading, controlling the PWM gate drive output 310A-H to at least two wide-bandgap FETs 308A-H of the high voltage region 205 to efficiently tune a bus voltage (e.g., high voltage DC signal 216) of a high voltage DC bus 313 of the high voltage region 205.

In a second example of optimizing performance, the at least one real-time input signal 1284A includes a reading of output current 421A to the electrical load 290A (e.g., light source 11) from a switched converter circuit 280A of the low voltage region 260. The at least one control signal 283A includes a pulse width modulation (PWM) gate drive output 310I-J. The function of optimizing performance of the switched mode power circuit 101 while maintaining the at least one power parameter 1297A of the DC power signal (e.g., second low voltage DC power signal 281A) within the tolerance 1298A of the power configuration setting value 1299A of the electrical load 290A (e.g., light source 11) includes: based on the electric load output current reading 421A, controlling the PWM gate drive output 310I-J to at least two wide-bandgap FETs 308I-J of the low voltage region 260 to maintain a constant current configuration.

In a third example of optimizing performance, the at least one real-time input signal 1284B includes a reading of output voltage 422B to the electrical load 290B (e.g., detector(s) 12) from a switched converter circuit 280B of the low voltage region 260. The at least one control signal 283B includes a pulse width modulation (PWM) gate drive output 310K-L. The function of optimizing performance of the switched mode power circuit 101 while maintaining the at least one power parameter 1297B of the DC power signal (e.g., second low voltage DC power signal 281B) within the tolerance 1298B of the power configuration setting value 1299B of the electrical load 290B (e.g., detector(s) 12) includes: based on the electric load output voltage reading 422B, controlling the PWM gate drive output 310K-L to at least two wide-bandgap FETs 308K-L of the low voltage region 260 to maintain a constant voltage configuration.

In a fourth example of optimizing performance, the at least one real-time input signal 1274 includes a reading of a bus voltage (e.g., first low voltage DC power signal 275) of a low voltage DC bus 354 of the low voltage region 260. The at least one control signal 213, 233 includes a pulse width modulation (PWM) gate drive output 310A-H. The function of optimizing performance of the switched mode power circuit 101 while maintaining the at least one power parameter 1297A-C of the DC power signal (e.g., second low voltage DC power signal 281A-C) within the tolerance 1298A-C of the power configuration setting value 1299A-C of the electrical load 290A-C includes: based on the reading of the bus voltage reading (e.g., first low voltage DC power signal 275), controlling the PWM gate drive output 310A-H to at least two wide-bandgap FETs 308A-H of the high voltage region 205 to efficiently tune a high voltage signal (e.g., high voltage DC signal 216 or high voltage bidirectional pulse train signal 217) of the high voltage region 205.

In a fifth example of optimizing performance, the at least one real-time input signal 1284A-C includes a reading of input current 415A-C to a switched converter circuit 280A-C of the low voltage region 260. The at least one control signal 283A-C includes a pulse width modulation (PWM) gate drive output 310I-L, 310O-P for switched converter circuits 280A-C. The function of optimizing performance of the switched mode power circuit 101 while maintaining the at least one power parameter 1297A-C of the DC power signal (e.g., second low voltage DC power signal 281A-C) within the tolerance 1298A-C of the power configuration setting value 1299A-C of the electrical load 290A-C includes: based on the reading of the input current 415A-C to the switched converter circuit 280A-C, controlling the PWM gate drive output 310A-H to at least two wide-bandgap FETs 308A-H of the high voltage region 205 to efficiently tune a high voltage signal (e.g., high voltage DC signal 216 or high voltage bidirectional pulse train signal 217) of the high voltage region 205.

The power parameter 1297A-C can be calculated. In one example, the at least one real-time input signal 1214 includes a reading of an AC input signal 212 waveform. The function to respond to the at least one real-time input signal 1214 from the high voltage region 205 or the low voltage region 260 to adjust operation of the high voltage region 205 or the low voltage region 260 via the at least one control signal 213, 233, 273, 283A-C includes: based on the AC input signal 212 waveform, calculating the at least one power parameter 1297A-C.

For electrical load 290A (e.g., light source 11), the at least one power parameter 1297A can include a dimming characteristic for the electrical load 290A (e.g., light source 11). The function to respond to the at least one real-time input signal 1214 from the high voltage region 205 or the low voltage region 260 to adjust operation of the high voltage region 205 or the low voltage region 260 via the at least one control signal 213, 233, 273, 283A further includes: controlling operation of the high voltage region 205 or the low voltage region 260 via the at least one control signal 213, 233, 273, 283A based on the dimming characteristic. The function of calculating the at least one power parameter 1297A including the dimming characteristic includes: selecting a dimming profile or curve based on the AC input signal 212 waveform, adjusting the at least one control signal 213, 233, 273, 283A in response to the dimming profile or curve, and controlling operation of the high voltage region 205 or the low voltage region 260 via the at least one control signal 213, 233, 273, 283A. The control block 103 can implement the function to calculate the at least one power parameter 1297A including the dimming characteristic in a high voltage region microcontroller 204A.

As shown in FIG. 12A, the luminaire 10 comprises the multi-stage driver system 100 and a network communication interface 15 coupled to the at least one microcontroller 204 of the control block 103. When the luminaire 10 is incorporated into the lighting control system 1 of FIGS. 1A-B, execution of the multi-stage driver system programming 1295 by the processor 1292 configures the luminaire 10 to implement functions for power monitoring. For example, execution of the multi-stage driver system programming 1295 by the processor 1292 configures the luminaire 10 to transmit, via the network communication interface 15, the at least one power parameter 1297A-C to an external computing device (e.g., gateway 50 or off-premises computing devices 60, 65). The at least one power parameter 1297A-C can be utilized for: (i) brownout condition detection, (ii) dirty power condition detection for health monitoring or diagnostics of the multi-stage driver system 100, (iii) other irregular power condition, (iv) general power monitoring, or (v) phase-cut dimming.

As described in FIGS. 9A-B, the function to respond to the at least one real-time input signal 1214, 1234, 1274, 1284A-C from the high voltage region 205 or the low voltage region 260 to adjust operation of the high voltage region 205 or the low voltage region 260 via the at least one control signal 213, 233, 273, 283A-C can include: changing the switched mode power circuit 101 from running in a first operating mode to a second operating mode. For example if the electrical load 290C is a battery 13, the first operating mode changes at least one switched converter circuit 280C of the low voltage region 260 to operate in a buck mode (e.g., 910A) for battery charging as shown in FIG. 9A. The second operating mode changes the at least one switched converter circuit 280C of the low voltage region 260 to operate in a boost converter mode (e.g., 910B) for emergency lighting as shown in FIG. 9B.

As shown in FIG. 10, the control block 103 can include a high voltage region microcontroller 204A coupled to the high voltage region 205 to control operations of the high voltage region 205 and a low voltage region microcontroller 204B coupled to the low voltage region 260 to control operations of the low voltage region 260. Control block 103 can further include a communication module 1010 coupled to the low voltage region microcontroller 204B. Control block 103 can further include a digital isolator 1005 to provide communication between the high voltage region microcontroller 204A and the low voltage region microcontroller 204B of the at least one real-time input signal 1214, 1234, 1274, 1284A-C. The digital isolator 1005 includes a digital data interface coupled to the communication module 1010 to pass data to the high voltage region microcontroller 204A from the communication module 1010 via the low voltage region microcontroller 204B. The digital isolator 1005 communicates the at least one real-time input signal 1214, 1234 from the high voltage region microcontroller 204A to the low voltage region microcontroller 204B to enable the low voltage region microcontroller 204B to respond via the at least one control signal 273, 283A-C. Alternatively or additionally, the digital isolator 1005 communicates the at least one real-time input signal 1274, 1284A-C from the low voltage region microcontroller 204B to the high voltage region microcontroller 204A to enable the high voltage region microcontroller 204A to respond via the at least one control signal 213, 233.

To enable the multi-stage driver system 100 to be compatible with different types of lighting control protocols (e.g., UART, 0-10V dimming protocol e.g., using PWM, DALI, DMX, VLC, wireless, etc.) in the high voltage region 205 and/or the low voltage region 260, the control block 103 can include a digital isolator 1005 comprising a digital data interface passed through a capacitive isolator or an optical isolator. The high voltage region 205 can include a first communication module 1010A. The high voltage region microcontroller 204A is coupled to the first communication module 1010A for a first lighting control protocol. The low voltage region microcontroller 204B is coupled to a second communication module 1010B for a second lighting control protocol different than the first lighting control protocol. For example, the first lighting control protocol is for a digital addressable lighting interface (DALI) protocol or a 0-10 volt (V) dimming protocol. The second lighting control protocol is for a universal asynchronous receiver/transmitter (UART) protocol.

FIG. 13A is a block diagram of a standalone sensor device 16 that communicates via the lighting control system of FIGS. 1A-B and is supported by the multi-stage driver system 100 to ensure compatibility with various types of electrical load(s) 290B-C, such as detector(s) 12 and a battery 13. The circuitry, hardware, and software of sensor device 16 shown is similar to the luminaire 10 of FIG. 12. However, sensor device 16 is a standalone sensor device that includes detector(s) 12 like the luminaire 10, but sensor device 16 does not include a light source 11.

Hence, main memory 1293 of sensor device 16 is shown as including the multi-stage driver system programming 1295 and at least one real-time input signal 1214, 1234, 1274, 1284B (for detector(s) 12, but not light source 11), which can be digitally converted analog readings (e.g., voltage or current) 214, 234, 274, 284B (for detector(s) 12, but not light source 11), from the high voltage region 205 or the low voltage region 260. When multi-stage driver system programming 1295 is executed by the processor 1292, the sensor device 16 adjusts operation of the high voltage region 205 or the low voltage region 260 via the at least one driver control signal 213, 233, 283, such as PWM signals 310A-H, 310K-L (for detector(s) 12, but not light source 11). Main memory 1293 further includes lighting control/commissioning programming 1296 like the luminaire 10.

FIG. 12B is a block diagram of a luminaire 10 supported by a driver system 1207 for a DC-DC converter application to ensure compatibility with various types of electrical load(s) 290A-C, such as light source(s) 11, detector(s) 12, and a battery 13. FIG. 13B is a block diagram of a standalone sensor device 16 supported by a driver system 1207 for a DC-DC converter application to ensure compatibility with various types of electrical load(s) 290B-C, such as detector(s) 12 and a battery 13.

In the example of FIGS. 12B and 13B, for a programmable DC-DC converter application, a driver system 1207 includes a switched mode power circuit 101 for providing a DC power signal to an electrical load 290A-C. When used for the programmable DC-DC converter application, the switched mode power circuit 101 of the driver system 100 of FIGS. 12B and 13B does not need to include the high voltage region 205, isolation barrier 240, and rectification stage(s) (e.g., the rectification circuit 270). For the DC-DC converter application, control block 103 also does not need to include the high voltage region microcontroller 204A. Hence, the switched mode power circuit 101 of the driver system 1207 of FIGS. 12B and 13B includes a low voltage region 260 and is shown as coupled to receive a DC input signal 1212. In the example of FIGS. 12B and 13B, the DC input signal 1212 can be the first low voltage DC power signal 275. The low voltage region 260 can include a plurality of switched converter circuits 280A-C, which are coupled to receive the DC input signal 1212. The switched mode power circuit 101 provides a second low voltage DC power signal 281A to electrical load 290A (light source 11). Switched mode power circuit 101 provides a second low voltage DC power signal 281B to electrical load 290B (detector(s) 12). Switched mode power circuit 101 provides a second low voltage DC power signal 281C to electrical load 290C (battery 13).

Driver system 1207 includes a control block 103 coupled to control operations of the switched mode power circuit 101. The control block 103 includes at least one microcontroller 204 having a processor 1292, a memory 1293, and interfaces 1220 coupled to the low voltage region 260. The interfaces 1220 are coupled to receive at least one real-time input signal 1284A-C from the low voltage region 260 and to provide at least one control signal 283A-C to the low voltage region 260. The at least one control signal 283A-C can include PWM signals 310I-L, 3100-P to control respective FETs 308I-L, 3080-P. As shown in FIG. 12B, the real-time input signals 1284-C are digitally converted from the respective analog reading(s) 284A-C taken from the switched mode power circuit 101.

The at least one microcontroller 204 includes driver system programming 1208 stored in the memory 1293 for execution by the processor 1292. Execution of the driver system programming 1208 by the processor 1292 configures the driver system 1207 to implement the following functions, including functions to control operation of the low voltage region 260. First, the driver system 1207 configures the switched mode power circuit 101 to provide the DC power signal 281A-C having at least one power parameter 1297A-C within a tolerance 1298A-C of a power configuration setting value 1299A-C of the electrical load 290A-C. Second, the driver system 1207 responds to the at least one real-time input signal 1284A-C from the low voltage region 260 to adjust operation of the low voltage region 260 via the at least one control signal 283A-C.

In a first example of adjusting operation, the interfaces 1220 are coupled to receive the at least one real-time input signal 1284A-C from the low voltage region 260. Execution of the driver system programming 1208 by the processor 1292 configures the driver system 1207 to implement functions, including functions to control operation of the low voltage region 260 to respond to the at least one real-time input signal 1284A-C from the low voltage region 260 to adjust operation of the low voltage region 260 via the at least one control signal 283A-C.

The at least one power parameter 1297A-C or the power configuration setting value 1299A-C corresponds to at least one of a voltage (V), a current (amperes), a constant voltage configuration, a constant current configuration, or a modulation scheme of the low voltage region 260. The tolerance 1298-C means that the at least one power parameter 1297A-C need not be absolutely the same as the power configuration setting value 1299A-C, just kept within some suitable range ±5% or ±10% of the power configuration setting value 1299A-C. For example, in the case of the luminaire 10, the power configuration setting value 1299A for the power parameter 1297A is a value suitable for driving the light source 11 (e.g., LED) of the luminaire 10. The power configuration setting value 1299C for the power parameter 1297C is a value suitable for driving the battery 13 of the luminaire 10.

The function to respond to the at least one real-time input signal 1284A-C from the low voltage region 260 to adjust operation of the low voltage region 260 via the at least one control signal 283A-C includes: optimizing performance of the switched mode power circuit 101 while maintaining the at least one power parameter 1297A-C of the DC power signal 281A-C within the tolerance 1298A-C of the power configuration setting value 1299A-C of the electrical load 290A-C.

In a first example of optimizing performance, the at least one real-time input signal 1284A includes a reading of output current 421A to the electrical load 290A (e.g., light source 11) from a switched converter circuit 280A of the low voltage region 260. The at least one control signal 283A includes a pulse width modulation (PWM) gate drive output 310I-J. The function of optimizing performance of the switched mode power circuit 101 while maintaining the at least one power parameter 1297A of the DC power signal (e.g., second low voltage DC power signal 281A) within the tolerance 1298A of the power configuration setting value 1299A of the electrical load 290A (e.g., light source 11) includes: based on the electric load output current reading 421A, controlling the PWM gate drive output 310I-J to at least two wide-bandgap FETs 308I-J of the low voltage region 260 to maintain a constant current configuration.

In a second example of optimizing performance, the at least one real-time input signal 1284B includes a reading of output voltage 422B to the electrical load 290B (e.g., detector(s) 12) from a switched converter circuit 280B of the low voltage region 260. The at least one control signal 283B includes a pulse width modulation (PWM) gate drive output 310K-L. The function of optimizing performance of the switched mode power circuit 101 while maintaining the at least one power parameter 1297B of the DC power signal (e.g., second low voltage DC power signal 281B) within the tolerance 1298B of the power configuration setting value 1299B of the electrical load 290B (e.g., detector(s) 12) includes: based on the electric load output voltage reading 422B, controlling the PWM gate drive output 310K-L to at least two wide-bandgap FETs 308K-L of the low voltage region 260 to maintain a constant voltage configuration.

As shown in FIG. 12B, the luminaire 10 comprises the driver system 1207 and a network communication interface 15 coupled to the at least one microcontroller 204 of the control block 103. When the luminaire 10 is incorporated into the lighting control system 1 of FIGS. 1A-B, execution of the driver system programming 1208 by the processor 1292 configures the luminaire 10 to implement functions for power monitoring. For example, execution of the driver system programming 1208 by the processor 1292 configures the luminaire 10 to transmit, via the network communication interface 15, the at least one power parameter 1297A-C to an external computing device (e.g., gateway 50 or off-premises computing devices 60, 65). The at least one power parameter 1297A-C can be utilized for: (i) brownout condition detection, (ii) dirty power condition detection for health monitoring or diagnostics of the driver system 100, (iii) other irregular power condition, or (iv) general power monitoring.

As described in FIGS. 9A-B, the function to respond to the at least one real-time input signal 1284A-C from the low voltage region 260 to adjust operation of the low voltage region 260 via the at least one control signal 283A-C can include: changing the switched mode power circuit 101 from running in a first operating mode to a second operating mode. For example if the electrical load 290C is a battery 13, the first operating mode changes at least one switched converter circuit 280C of the low voltage region 260 to operate in a buck mode (e.g., 910A) for battery charging as shown in FIG. 9A. The second operating mode changes the at least one switched converter circuit 280C of the low voltage region 260 to operate in a boost converter mode (e.g., 910B) for emergency lighting as shown in FIG. 9B.

As shown in FIG. 10, the control block 103 can include a low voltage region microcontroller 204B coupled to the low voltage region 260 to control operations of the low voltage region 260. Control block 103 can further include a communication module 1010 coupled to the low voltage region microcontroller 204B.

To enable the driver system 1207 to be compatible with different types of lighting control protocols (e.g., UART, 0-10V dimming protocol e.g., using PWM, DALI, DMX, VLC, wireless, etc.), the low voltage region microcontroller 204B is coupled to a first communication module 1010A for a first lighting control protocol. The low voltage region microcontroller 204B is coupled to a second communication module 1010B for a second lighting control protocol different than the first lighting control protocol. For example, the first lighting control protocol is for a digital addressable lighting interface (DALI) protocol or a 0-10 volt (V) dimming protocol. The second lighting control protocol is for a universal asynchronous receiver/transmitter (UART) protocol.

Figure 14:
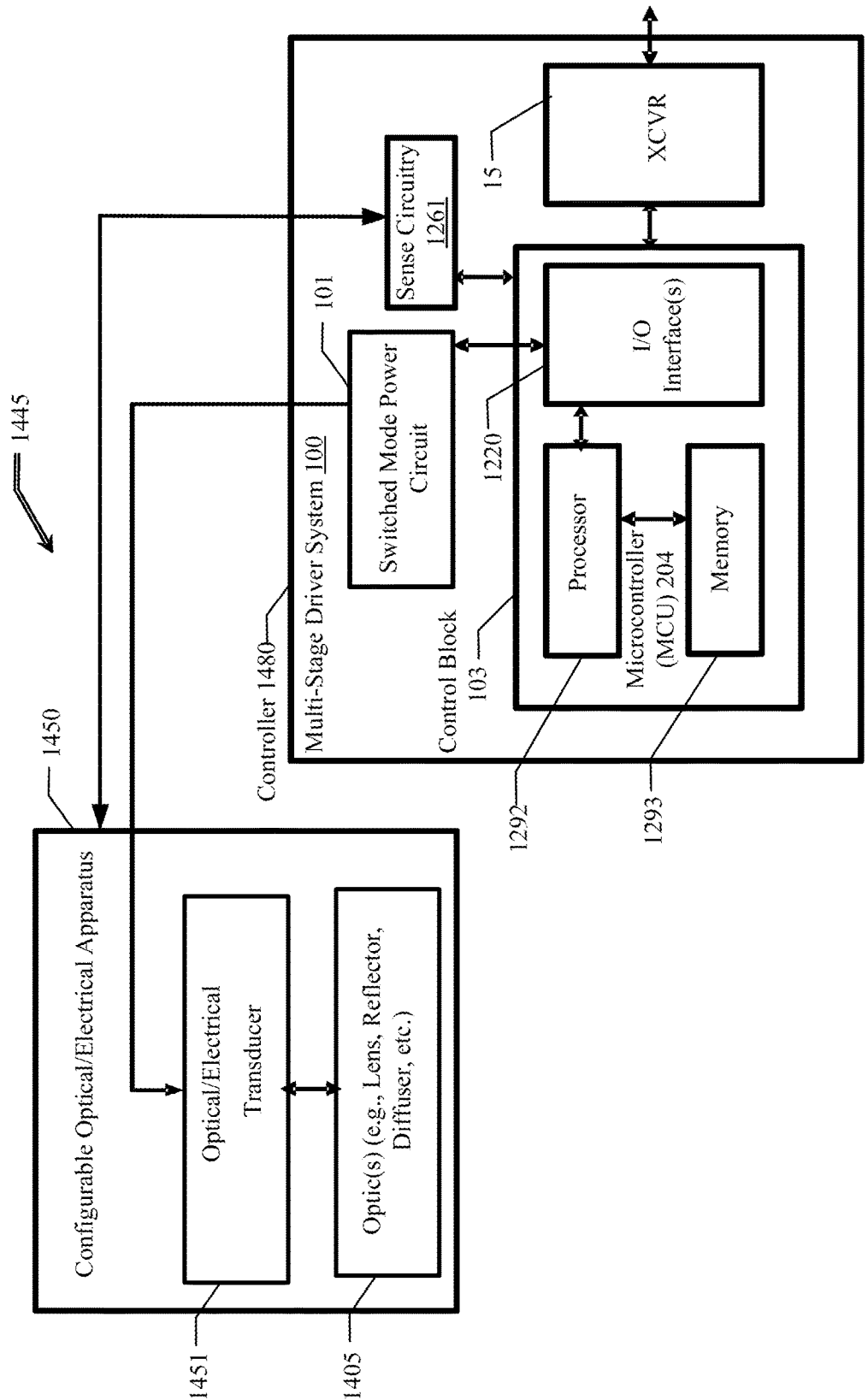
FIG. 14 is a simplified functional block diagram of a system, which includes a configurable optical/electrical apparatus and a controller.

FIG. 14 is a simplified functional block diagram of a system 1445, which includes a configurable optical/electrical apparatus 1450 and a controller 1480. The configurable optical/electrical apparatus 1450 combines an optic (e.g., including an optical lens, reflector, diffuser, etc.) 1405 with an optical/electrical transducer 1451. Although associated circuitry may be provided in the apparatus 1450, the example shows circuitry in the multi-stage driver system 100, which may be somewhat separate from or even remote from the configurable optical/electrical apparatus 1450.

An optical/electrical transducer 1451 is a device that converts between forms of optical and electrical energy, for example, from optical energy to an electrical signal or from electrical energy to an optical output. Examples of optical-to-electrical transducers include various sensors or detectors, photovoltaic devices and the like to be individually activated for outputting the respective electrical signal in response to light. Optical-to-electrical transducers discussed herein are responsive to light, and the light may be visible light, ultraviolet light, infrared, near infrared or light in other portions of the optical spectrum.

Examples of electrical-to-optical transducers include various light emitters, although the emitted light may be in the visible spectrum or in other wavelength ranges. Suitable light generation sources for use as the transducer 1451 include various conventional lamps, such as incandescent; solid-state devices, e.g., one or more light emitting diodes (LEDs) of various types, such as planar LEDs, micro LEDs, micro organic LEDs, LEDs on gallium nitride (GaN) substrates, micro nanowire or nanorod LEDs, photo pumped quantum dot (QD) LEDs, micro plasmonic LED, micro resonant-cavity (RC) LEDs, and micro photonic crystal LEDs; as well as other sources such as micro super luminescent Diodes (SLD) and micro laser diodes. Of course, these light generation technologies are given by way of non-limiting examples, and other light generation technologies may be used to implement the transducer 1451. For example, it should be understood that non-micro versions of the foregoing light generation sources can be used.

When optical/electrical transducer 1451 is a light source, the light source may use a single emitter to generate light or may combine light from some number of emitters that generate the light. A lamp or 'light bulb' is an example of a single source. An LED light engine may use a single output for a single source but typically combines light from multiple LED type emitters within the single light engine. Many types of light sources provide an illumination light output that generally appears uniform to an observer, although there may be some color or intensity striations, e.g. along an edge of a combined light output. For purposes of the present examples, however, the appearance of the light source output may not be strictly uniform across the output area or aperture of the source. For example, although the source may use individual emitters or groups of individual emitters to produce the light generated by the overall source; depending on the arrangement of the emitters and any associated mixer or diffuser, the light output may be relatively uniform across the aperture or may appear pixelated to an observer viewing the output aperture. The individual emitters or groups of emitters may be separately controllable, for example to control intensity or color characteristics of the source output. As such, the light source used as an emitter type of optical/electrical transducer 1451 may or may not be pixelated for control purposes. The optic(s) 1405 are controlled to selectively optically change or spatially (optically) modulate the light distribution output from the transducer and thus from the apparatus 1450. The optic(s) 1405 may support controlled beam steering, controlled beam shaping or a combination of controlled beam steering and shaping.

Figure 15:
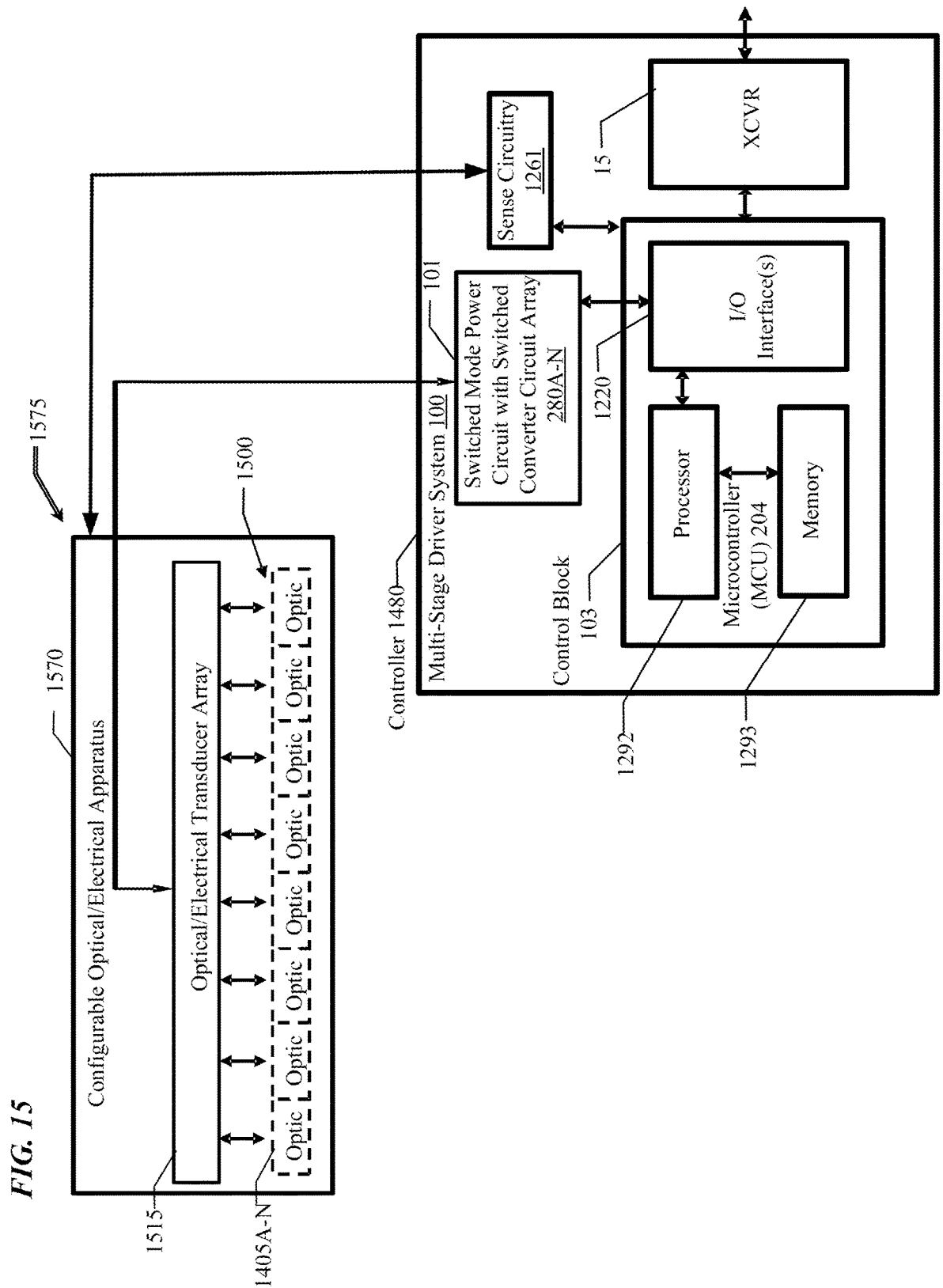
FIG. 15 is a simplified functional block diagram of a system combining an optical/electrical transducer array of multiple optical/electrical transducers like that described with one or more optics (combined in a configurable optical/electrical apparatus.

In another example, optical transducer 1451 is an optical-to-electrical converter, that is to say, a light sensor or detector or a photovoltaic device. The optical-to-electrical converter can communicate back to the controller 1480 via a separate control line to the sense circuitry 1261 as shown in FIGS. 14-15. In addition, power and a downlink are provided to the optical-to-electrical converter by the switched mode power circuit 101 and the wireless comunication interface (XCVR) 15, respectively. Alternatively or additionally, the optical transducer 1451 can communicate back to the processor 1292 via an external/internal transceiver 15 to the processor 1292. The overall apparatus 1450 in such a case may be configured as an imager, other light responsive sensor, light responsive power source, or the like. The light detector may be an array of light detectors, a photo-detector such as a photodiode, or a photovoltaic device, depending on the desired function of optical/electrical apparatus 1450. Other suitable light detectors for use as optical/electrical transducer 1451 include charge-coupled device (CCD) arrays, complementary metal-oxide-semiconductor (CMOS) arrays, photomultipliers, image intensifiers, phototransistors, photo resistors, thermal imagers, and micro-electromechanical systems (MEMS) imagers. Nonetheless, virtually any detector of light may be used as the transducer 1451 in an optical-to-electrical arrangement of apparatus 1450. Suitable light detectors will be known to one of ordinary skill in the art from the description herein. The optic(s) 1404 is controlled to selectively optically change or spatially (optically) modulate the field of view of light coming into the apparatus 1450 for delivery to transducer 1451. The optic(s) 1405 may support controlled beam steering, controlled beam shaping or a combination of controlled beam steering and shaping, with respect to light from a field of intended view for the particular optical-to-electrical application of the apparatus 1450.

While light source examples and light detector examples are described separately, it will be understood that both types of optical/electrical transducers 1451 may be present in a single optical apparatus 1450 and/or some optical transducers can serve both input and output functions (e.g. some LEDs can be multiplexed between the emitting operation and a light detection operation). Such a combined arrangement or operation, for example, may advantageously provide capabilities to reconfigure the light output distribution in accordance with a desired light detection pattern.

A transducer 1451, such as a light emitter or a light detector, often connects to corresponding electrical circuitry to operate the particular type of transducer, e.g., a controller 1480 to supply power to an emitter or sense circuitry 1261 to process an output signal from a detector (and provide power to the detector if necessary). Hence, to operate the transducer 1451, the controller 1480 is depicted as including a multi-stage driver system 100, which includes a control block 103 and a switched mode power circuit 101, and the corresponding sense circuitry 1261. The type of separate sense circuitry 1261 would depend on the type of transducer 1451.

The control block 103 includes a processor 1292, one or more digital storage media, data and programming in the storage and appropriate input/output circuitry. Although other processor based architectures (e.g., FPGA and DSP) may be used (another example is described later regarding FIG. 15), the example of control block 103 utilizes a microcontroller 204 or Micro-Control Unit (MCU), which implements the control logic for the control block 103 and thus of the system 1445. For example, the microcontroller 204 implements the logic for control of operations of the associated optical/electrical apparatus 1450. Although shown as controlling only one such apparatus 1450, the microcontroller 204 may control a number of such apparatuses 1450.

The microcontroller 204 may be a integrated circuit (IC) device that incorporates a processor 1492 serving as the programmable central processing unit (CPU) of the microcontroller 204 as well as one or more memories, represented by memory 1293 in the drawing. The memory 1293 is accessible to the processor 1292, and the memory or memories 1293 store executable programming for the CPU formed by processor 1292 as well as data for processing by or resulting from processing of the processor 1292, as described previously including the multi-stage driver system programming 1295 and driver system programming 1208. The microcontroller 204 may be thought of as a small computer or computer like device formed on a single chip. Such devices are often used as the configurable control elements embedded in special purpose devices rather than in a computer or other general purpose device. A variety of available microcontroller 204 chips, for example, may be used as the microcontroller 204 in the control block 103 of system 1445.

The microcontroller 204 in this example also includes various input and output (I/O) interface(s) 1220 shown in FIG. 14. The I/O interfaces 1220, for example, support a control output and/or input to the switched mode power circuit 101 (for the optical/electrical transducer 1451). The I/O interface(s) 1220 also support input/output communications with one or more electronic devices, which may be connected to or incorporated in the system 1445 (e.g. to provide a user interface not shown) or which may be remote.

Controller 1480 also includes network communication interface(s) 15, which can be at least one transceiver (XCVR) coupled to the processor 1292 (and possibly to the memory 1293) via an I/O output interface 1220 of the microcontroller 204. Although shown separately, the transceiver 15 may be implemented in circuitry on the same chip as the elements of the microcontroller 204. Although the drawing shows only one transceiver 15, controller 1480 may include any number of transceivers, for example, to support additional communication protocols and/or provide communication over different communication media or channels.

The transceiver 15 supports communication with other control or processing equipment, for example, with a remote user interface device and/or with a host computer of a building control and automation system (BCAS), such as the gateway 50 of FIGS. 1A-B. The transceiver 15 may also support system communication with a variety of other equipment of other parties having access to the system 1445 in an overall/networked system encompassing a number of similar systems 1445, e.g. for access to each system 1445 by equipment of a manufacturer for maintenance or access to an on-line server for downloading of programming instructions or configuration data for setting aspects of sensing or lighting operation of the associated optical/electrical apparatus(s) 1450. The circuitry of the transceiver 15 may support such communication(s) over any available medium, such as wire(s), cable, optical fiber, free-space optical link or radio frequency (RF) link.

FIG. 15 is a simplified functional block diagram of a system 1575 combining an optical/electrical transducer array 1515 of multiple optical/electrical transducers 1451A-N like that described with one or more optics 1405A-N (combined in a configurable optical/electrical apparatus 1570). The drawing also depicts an example of associated circuitry, which is implemented in a controller 1480. The optics 1405A-N are used to provide selectively controllable beam steering and/or beam shaping for any of a variety of types of optical/electrical transducers 1451A-N, including both light detectors and light emitters. The controller 1480 may be included in the apparatus 1570, or the controller 1480 may be somewhat separate from or even remote from the configurable optical/electrical apparatus 1570.

The optical/electrical transducer 1451 may be any transducer device of the types discussed above, although the transducer 1451 is configured to operate with an array 1500 of optics 1405A-N. Although the transducer 1451 may be a single device, e.g. a single relatively large light source, in many examples, transducer 1451 is an array of emitters and/or lighting input responsive devices (e.g. detectors or photovoltaic devices). In a luminaire example using the apparatus 1570, the transducer 1451 might include an array of high intensity LED light emitters, where each one of the emitters is coupled to one or more of the optic(s) 1405A-N of the array 1500. In a detector example using the apparatus 1570, the transducer 1451 might include a complementary metal-oxide-semiconductor (CMOS) image sensor, a charge-coupled device (CCD) image sensor or other image detector array like any of those used in digital cameras. Each actual detector at a pixel of the image sensor array could be coupled to one or more of the optics 1405A-N of the array 1500.

Transducer 1451, such as a light emitter or a light detector, connects to corresponding electrical circuitry to operate the particular type of transducer, e.g., the controller 1480 supplies power to each emitter of an emitter array and senses to process output signals from the detectors (and provide power to the detectors if/when necessary). Hence, to operate the transducer 1451, the controller 1480 includes the multi-stage driver system 100. Multi-stage driver system 100 includes the control block 103. Controller 1480 may further include separate sense circuitry 1261. The type of sense circuitry 1261 would depend on the type of transducer 1451, e.g. the the particular type of image sensor array.

The control block 103 also includes a processor 1292, which in this example, is implemented by a microprocessor. The microprocessor 1292 is programmed to implement control and other processing functions of a central processing unit (CPU) of the controller 1480. The microprocessor 1292, for example, may be based on any known or available microprocessor architecture, such as a Reduced Instruction Set Computing (RISC) using ARM architecture, as commonly used today in mobile devices and other portable electronic devices. Of course, other microprocessor circuitry may be used to form the CPU of the controller 1480. Although the illustrated example includes only one microprocessor 1292, for convenience, a controller 1480 may use a multi-processor architecture.

The controller 1480 also includes one or more digital storage media, represented by the memory 1293, for storage of data and programming. The storage media represented by the memory 1293 may include volatile and/or non-volatile semiconductor memory, any suitable type of magnetic or optical storage media, etc. The microprocessor 1292 implements the control logic for the controller 1480 and thus of the system 1575, based on executable instructions of the programming (e.g., multi-stage driver system programming 1295, driver system programming 1208, and lighting control/commissioning programming 1296), which in the example is stored in the memory 1293. The executable instructions may be firmware or software instructions, to configure the microprocessor 1292 to perform lighting control operations or light detection operations, etc. Based on execution of the program instructions, the microprocessor 1292, for example, implements the logic for control of operations of the transducer 1451 and the transducer array 1500, in the associated optical/electrical apparatus 1570. Although shown as controlling only one such apparatus 1570, the microprocessor 1292 and thus the control block 103 and switched mode power circuit 100 may include any number of switched converter circuits 280A-N to control a number of such apparatuses 1570 (e.g., electrical loads 290A-N).

Although shown in simplified block form, the architecture of controller 1480 may be similar to that of any of a variety of types of types of other smart electronic devices, such as an architecture for a personal computer or an architecture for a mobile terminal device. The processor 1292 of the microcontroller 204 (FIGS. 12-15) are examples of processors that may be used to control the luminaires 10A-C, sensor device 16, and control or respond to outputs of any associated optical/electrical transducer(s) 1451. As used herein, a processor is a hardware circuit having elements structured and arranged to perform one or more processing functions, typically various data processing functions. Although discrete logic components could be used, the examples utilize components forming a programmable central processing unit (CPU). A processor 1292 for example includes or is part of one or more integrated circuit (IC) chips incorporating the electronic elements to perform the functions of the CPU.

The processor 1292 executes programming or instructions to configure the system 1445 or 1575 to perform various operations, for example, in accordance with instructions or programming executable by processor(s) 1292. For example, such operations may include various general operations (e.g., a clock function, recording and logging operational status and/or failure information) as well as various system-specific operations (e.g. controlling beam steering and beam shaping of input or output light, operation of the transducer(s) and the like) of an optical/electrical apparatus 1450 or 1570 incorporating one or more of the optics 1405A-N in an optic array 1500 and associated transducer(s) 1451. For example, such operations may include operations related to the multi-stage driver system programming 1295, driver system programming 1208, and lighting control/commissioning programming 1296. Although a processor 1292 may be configured by use of hardwired logic, typical processors in lighting devices are general processing circuits configured by execution of programming, e.g. instructions and any associated setting data from the memories shown or from other included storage media and/or received from remote storage media.

Any of the steps or functionality of the programming of the multi-stage driver system 100, described herein for the control block 103, including the processor 1292 and the memory 1293 can be embodied in programming or applications, for example, the multi-stage driver system programming 1295 and driver system programming 1208, e.g., of the luminaire 10 and sensor device 16 of FIGS. 12A-B and 13A-B, as described previously. This also includes, for example, lighting control/commissioning programming 1296 of the luminaires 10A-C, sensor device 16, and other devices of the wireless lighting control system 1 of FIGS. 1A-B. According to some embodiments, "function," "functions," "application," "applications," "instruction," "instructions," or "programming" are program(s) that execute functions defined in the programs. Various firmware or programming languages can be employed to create one or more of the applications, structured in a variety of manners, such as object-oriented programming languages (e.g., Objective-C, Java, or C++), procedural programming languages (e.g., C or assembly language). In a specific example, a third party application (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating systems. In this example, the third party application can invoke API calls provided by the operating system to facilitate functionality described herein.

Hence, a machine-readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims. It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

The invention claimed is:

1. A driver system, comprising:
 a switched mode power circuit for providing a direct current (DC) power signal to an electrical load, the switched mode power circuit including a low voltage region; and
 a control block coupled to control operations of the switched mode power circuit and including interfaces coupled to the low voltage region, wherein:
  the interfaces are coupled to receive at least one input signal from the low voltage region and to provide at least one control signal to the low voltage region;
  the control block configures the driver system to control operation of the low voltage region to:
   configure the switched mode power circuit to provide the DC power signal having at least one power parameter within a tolerance of a power configuration setting value of the electrical load; and
   respond to the at least one input signal from the low voltage region to adjust operation of the low voltage region via the at least one control signal.

2. The driver system of claim 1, wherein:
 the low voltage region includes a plurality of switched converter circuits.

3. The driver system of claim 1, wherein:
the interfaces are coupled to receive the at least one input signal from the low voltage region; and
the control block configures the driver system to control operation of the low voltage region to respond to the at least one input signal from the low voltage region to adjust operation of the low voltage region via the at least one control signal.

4. The driver system of claim 1, wherein the at least one power parameter or the power configuration setting value corresponds to at least one of a voltage (V), a current (amperes), a constant voltage configuration, a constant current configuration, or a modulation scheme of the low voltage region.

5. The driver system of claim 1, wherein:
responding to the at least one input signal from the low voltage region to adjust operation of the low voltage region via the at least one control signal includes:
optimizing performance of the switched mode power circuit while maintaining the at least one power parameter of the DC power signal within the tolerance of the power configuration setting value of the electrical load.

6. The driver system of claim 5, wherein:
the at least one input signal includes a reading of output current to the electrical load from a switched converter circuit of the low voltage region;
the at least one control signal includes a pulse width modulation (PWM) gate drive output; and
the optimizing performance of the switched mode power circuit while maintaining the at least one power parameter of the DC power signal within the tolerance of the power configuration setting value of the electrical load includes:
based on the electric load output current reading, controlling the PWM gate drive output to at least two wide-bandgap FETs of the low voltage region to maintain a constant current configuration.

7. The driver system of claim 5, wherein:
the at least one input signal includes a reading of output voltage to the electrical load from a switched converter circuit of the low voltage region;
the at least one control signal includes a pulse width modulation (PWM) gate drive output; and
the optimizing performance of the switched mode power circuit while maintaining the at least one power parameter of the DC power signal within the tolerance of the power configuration setting value of the electrical load includes:
based on the electric load output voltage reading, controlling the PWM gate drive output to at least two wide-bandgap FETs of the low voltage region to maintain a constant voltage configuration.

8. A luminaire, comprising:
the driver system of claim 1; and
a network communication interface coupled to the control block, wherein the control block configures the luminaire to:
transmit, via the network communication interface, the at least one power parameter to an external computing device for: (i) brownout condition detection, (ii) dirty power condition detection for health monitoring or diagnostics of the driver system, (iii) other irregular power condition, or (iv) general power monitoring.

9. The driver system of claim 1, wherein the responding to the at least one input signal from the low voltage region to adjust operation of the low voltage region via the at least one control signal includes:
changing the switched mode power circuit from running in a first operating mode to a second operating mode.

10. The driver system of claim 9, wherein:
the first operating mode changes at least one switched converter circuit of the low voltage region to operate in a buck mode for battery charging; and
the second operating mode changes the at least one switched converter circuit of the low voltage region to operate in a boost converter mode for emergency lighting.

11. The driver system of claim 1, wherein the control block includes:
a low voltage region microcontroller coupled to the low voltage region to control operations of the low voltage region; and
a communication module coupled to the low voltage region microcontroller.

12. The driver system of claim 11, wherein:
the low voltage region microcontroller is coupled to a first communication module for a first lighting control protocol.

13. The driver system of claim 12, wherein:
the low voltage region microcontroller is coupled to a second communication module for a second lighting control protocol different than the first lighting control protocol.

14. The driver system of claim 13, wherein:
the first lighting control protocol is for a digital addressable lighting interface (DALI) protocol or a 0-10 volt (V) dimming protocol; and
the second lighting control protocol is for a universal asynchronous receiver/transmitter (UART) protocol.

15. A multi-stage driver system, comprising:
a switched mode power circuit for providing a direct current (DC) power signal to an electrical load, the switched mode power circuit including a high voltage region, a low voltage region, and an isolation barrier coupled between the high voltage region and the low voltage region; and
a control block coupled to control operations of the switched mode power circuit and including interfaces coupled to the high voltage region and the low voltage region, wherein:
the interfaces are coupled to receive at least one input signal from the high voltage region or the low voltage region and to provide at least one control signal to the high voltage region or the low voltage region;
at least one microcontroller configures the multi-stage driver system to control operation of the high voltage region or the low voltage region to:
configure the switched mode power circuit to provide the DC power signal having at least one power parameter within a tolerance of a power configuration setting value of the electrical load; and
respond to the at least one input signal from the high voltage region or the low voltage region to adjust operation of the high voltage region or the low voltage region via the at least one control signal.

16. The multi-stage driver system of claim 15, wherein:
the interfaces are coupled to receive the at least one input signal from the high voltage region; and the control block configures the multi-stage driver system to control operation of the high voltage region to respond to the at least one input signal from the high voltage region to adjust operation of the high voltage region via the at least one control signal.

17. The multi-stage driver system of claim 15, wherein:
the interfaces are coupled to receive the at least one input signal from the low voltage region; and
the control block configures the multi-stage driver system to implement functions, including functions to control operation of the high voltage region to respond to the at least one input signal from the low voltage region to adjust operation of the high voltage region via the at least one control signal.

18. The multi-stage driver system of claim 15, wherein:
the interfaces are coupled to receive the at least one input signal from the high voltage region; and
the control block configures the multi-stage driver system to control operation of the low voltage region to respond to the at least one input signal from the high voltage region to adjust operation of the low voltage region via the at least one control signal.

19. The multi-stage driver system of claim 15, wherein:
the interfaces are coupled to receive the at least one input signal from the low voltage region; and
the control block configures the multi-stage driver system to control operation of the low voltage region to respond to the at least one input signal from the low voltage region to adjust operation of the low voltage region via the at least one control signal.

20. The multi-stage driver system of claim 15, wherein the at least one power parameter or
the power configuration setting value corresponds to at least one of a voltage (V), a current (amperes), a constant voltage configuration, a constant current configuration, or a modulation scheme of the high voltage region or the low voltage region.

* * * * *

UNITED STATES PATENT AND TRADEMARK OFFICE
CERTIFICATE OF CORRECTION

| | | |
|---|---|---|
| PATENT NO. | : 12,155,315 B2 | Page 1 of 1 |
| APPLICATION NO. | : 18/090011 | |
| DATED | : November 26, 2024 | |
| INVENTOR(S) | : Gregory Malone | |

It is certified that error appears in the above-identified patent and that said Letters Patent is hereby corrected as shown below:

On the Title Page

Column 1, Item (73) Assignee: ABL IP HOLDING INC, Conyers, GA (US) should read as follows:
- (73) Assignee: ABL IP HOLDING LLC, Conyers, GA (US) -

Signed and Sealed this
Thirteenth Day of May, 2025

Coke Morgan Stewart
*Acting Director of the United States Patent and Trademark Office*